United States Patent
Olson et al.

(10) Patent No.: US 8,417,961 B2
(45) Date of Patent: Apr. 9, 2013

(54) APPARATUS AND METHOD FOR IMPLEMENTING INSTRUCTION SUPPORT FOR PERFORMING A CYCLIC REDUNDANCY CHECK (CRC)

(75) Inventors: Christopher H. Olson, Austin, TX (US); Gregory F. Grohoski, Bee Cave, TX (US); Lawrence A. Spracklen, Boulder Creek, CA (US)

(73) Assignee: Oracle International Corporation, Redwood City, CA (US)

( * ) Notice: Subject to any disclaimer, the term of this patent is extended or adjusted under 35 U.S.C. 154(b) by 471 days.

(21) Appl. No.: 12/725,243

(22) Filed: Mar. 16, 2010

(65) Prior Publication Data

US 2011/0231636 A1 Sep. 22, 2011

(51) Int. Cl.
*G06F 11/30* (2006.01)
(52) U.S. Cl. ......... 713/187; 713/189; 713/190; 712/200
(58) Field of Classification Search .......... 713/187, 713/189, 190; 714/807; 712/32, 200, 208, 712/222
See application file for complete search history.

(56) References Cited

U.S. PATENT DOCUMENTS

| | | | |
|---|---|---|---|
| 4,467,444 A | 8/1984 | Harmon, Jr. et al. | |
| 4,991,133 A | 2/1991 | Davis et al. | |
| 6,192,491 B1 | 2/2001 | Cashman et al. | |
| 6,754,870 B2 | 6/2004 | Yoshida et al. | |
| 6,836,869 B1 | 12/2004 | Wyland | |
| 7,437,538 B1* | 10/2008 | Brooks et al. | 712/214 |
| 7,620,821 B1* | 11/2009 | Grohoski et al. | 713/189 |
| 7,711,955 B1* | 5/2010 | Olson et al. | 713/168 |
| 8,125,243 B1* | 2/2012 | Wright | 326/41 |
| 2010/0250964 A1* | 9/2010 | Olson et al. | 713/190 |
| 2010/0250965 A1* | 9/2010 | Olson et al. | 713/190 |
| 2010/0250966 A1* | 9/2010 | Olson et al. | 713/190 |
| 2011/0087985 A1* | 4/2011 | Buchanan et al. | 715/771 |

OTHER PUBLICATIONS

D. Sheinwald, J. Satran, P. Thaler, V. Cavanna, "Internet Protocol Small Computer System Interface (ISCSI) Cyclic Redundancy Check (CRC) / Checksum Considerations," The Internet Society, 2002, 23 pages.

\* cited by examiner

*Primary Examiner* — Krisna Lim

(57) ABSTRACT

Techniques relating to a processor including instruction support for implementing a cyclic redundancy check (CRC) operation. The processor may issue, for execution, programmer-selectable instructions from a defined instruction set architecture (ISA). The processor may include a cryptographic unit configured to receive instructions that include a first instance of a cyclic redundancy check (CRC) instruction defined within the ISA, where the first instance of the CRC instruction is executable by the cryptographic unit to perform a first CRC operation on a set of data that produces a checksum value. In one embodiment, the cryptographic unit is configured to generate the checksum value using a generator polynomial of 0x11EDC6F41. In some embodiments, the first instance of the CRC instruction specifies an initial value to be used in performing the first CRC operation, the set of data, and a storage location in which the cryptographic unit is configured to store the checksum value produced by the first CRC operation.

15 Claims, 12 Drawing Sheets

*Cipher State 1012*

Rows / Columns

| Cycle | 1 | 2 | 3 | 4 | 5 | 6 | 7 |
|---|---|---|---|---|---|---|---|
| Stage 0 | EROUND 01 | EROUND 23 | | EROUND 01_LAST | EROUND 23_LAST | | |
| Stage 1 | | EROUND 01 | EROUND 23 | | EROUND 01_LAST | EROUND 23_LAST | ... |
| Stage 2 | | | EROUND 01 | EROUND 23 | | EROUND 01_LAST | EROUND 23_LAST |

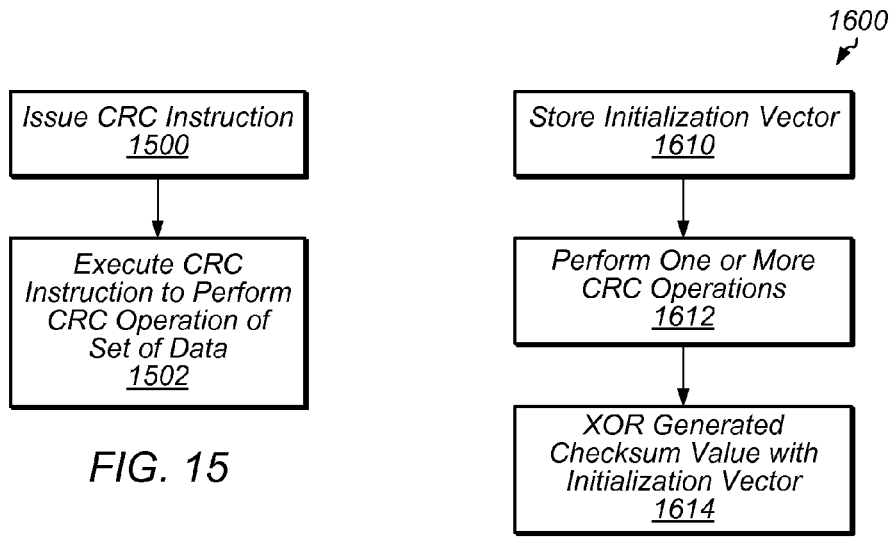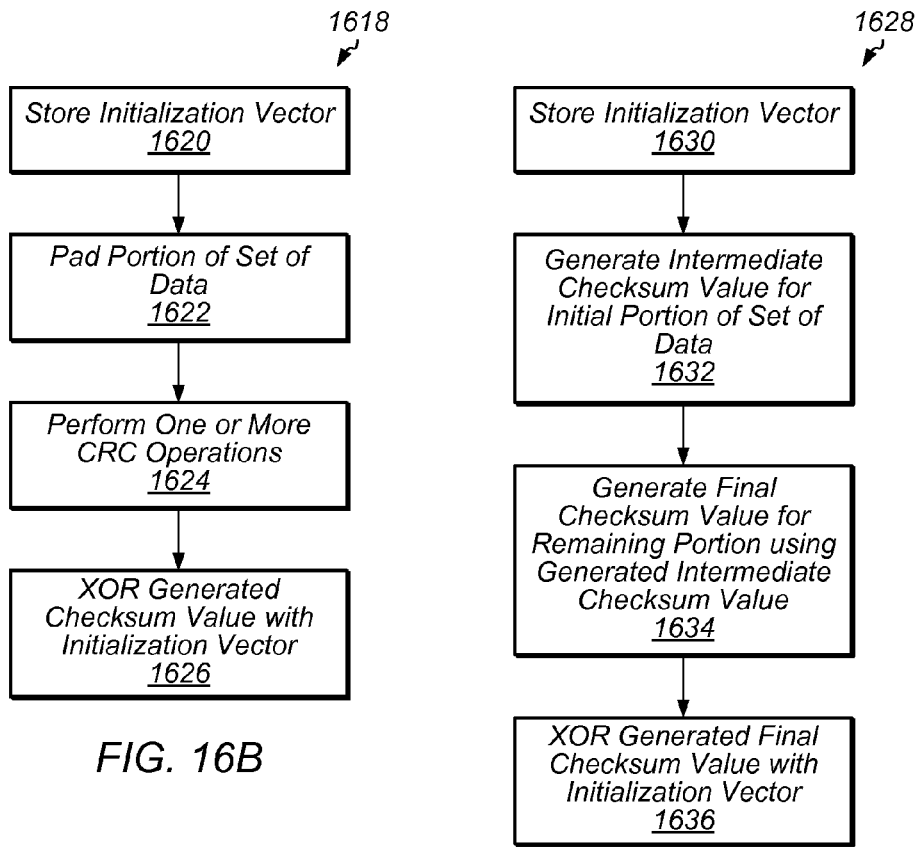

APPARATUS AND METHOD FOR IMPLEMENTING INSTRUCTION SUPPORT FOR PERFORMING A CYCLIC REDUNDANCY CHECK (CRC)

BACKGROUND

1. Technical Field

This disclosure relates to computer processors and, more particularly, to implementation of cyclical redundancy checks within such processors.

2. Description of the Related Art

Securing transactions and communications against tampering, interception and unauthorized use has become a problem of increasing significance as new forms of electronic commerce and communication proliferate. For example, many businesses provide customers with Internet-based purchasing mechanisms, such as web pages via which customers may convey order and payment details. Such details often include sensitive information, such as credit card numbers, that might be subject to fraudulent use if intercepted by a third party.

To provide a measure of security for sensitive data, cryptographic algorithms have been developed that may allow encryption of sensitive information before it is conveyed over an insecure channel. The information may then be decrypted and used by the receiver. However, as the performance of generally available computer technology continues to increase (e.g., due to development of faster microprocessors), less sophisticated cryptographic algorithms become increasingly vulnerable to compromise or attack.

More sophisticated cryptographic algorithms are continually evolving to meet the threat posed by new types of attacks. However, as cryptographic algorithms become increasingly powerful, they often become computationally more complex to implement, potentially adding overhead to secure transactions and consequently reducing their performance.

SUMMARY

Techniques and structures are disclosed herein that allow a processor to provide instruction support for performing a cyclic redundancy check. In one embodiment, a processor is disclosed. The processor includes a control unit configured to issue instructions for execution, where the instructions are programmer-selectable from a defined instruction set architecture (ISA). The processor further includes a cryptographic unit configured to receive instructions issued by the control unit, where the received instructions include a first instance of a cyclic redundancy check (CRC) instruction defined within the ISA. The cryptographic unit is configured to perform a first CRC operation on at least a portion of a set of data in response to receiving the first instance of the CRC instruction, where the first CRC operation uses a generator polynomial to produce a checksum value from the at least a portion of the set of data.

In another embodiment, a method is disclosed. The method includes a control unit of a processor issuing instructions for execution, where the instructions are within an instruction set architecture (ISA) for the processor, where the ISA includes a cyclic redundancy check (CRC) instruction that is executable to perform a CRC operation on at least a portion of a message using a generator polynomial. The method further includes a cryptographic unit of the processor receiving one or more instructions for execution, including a first instance of the cyclic redundancy check (CRC) instruction defined within the ISA. The method still further includes the cryptographic unit executing the first instance of the CRC instruction, where the executing includes performing a CRC operation on the at least a portion of the message to generate a corresponding checksum value.

In another embodiment, a computer-readable storage medium having program instructions stored thereon that are executable by a processor is disclosed. The program instructions include a first instance of a CRC instruction defined within an instruction set architecture (ISA) of the processor, where the first instance of the CRC instruction is executable by the processor to perform a first CRC operation that uses a generator polynomial to produce a first checksum value from at least a portion of an input message.

BRIEF DESCRIPTION OF THE DRAWINGS

FIG. 15 is a flow diagram describing the operation of one embodiment of a processor configured to provide instruction-level support for performing a cyclic redundancy check (CRC).

FIGS. 16A-C are flow diagrams illustrating embodiments of methods for generating a checksum value from a set of data.

Figure 1:
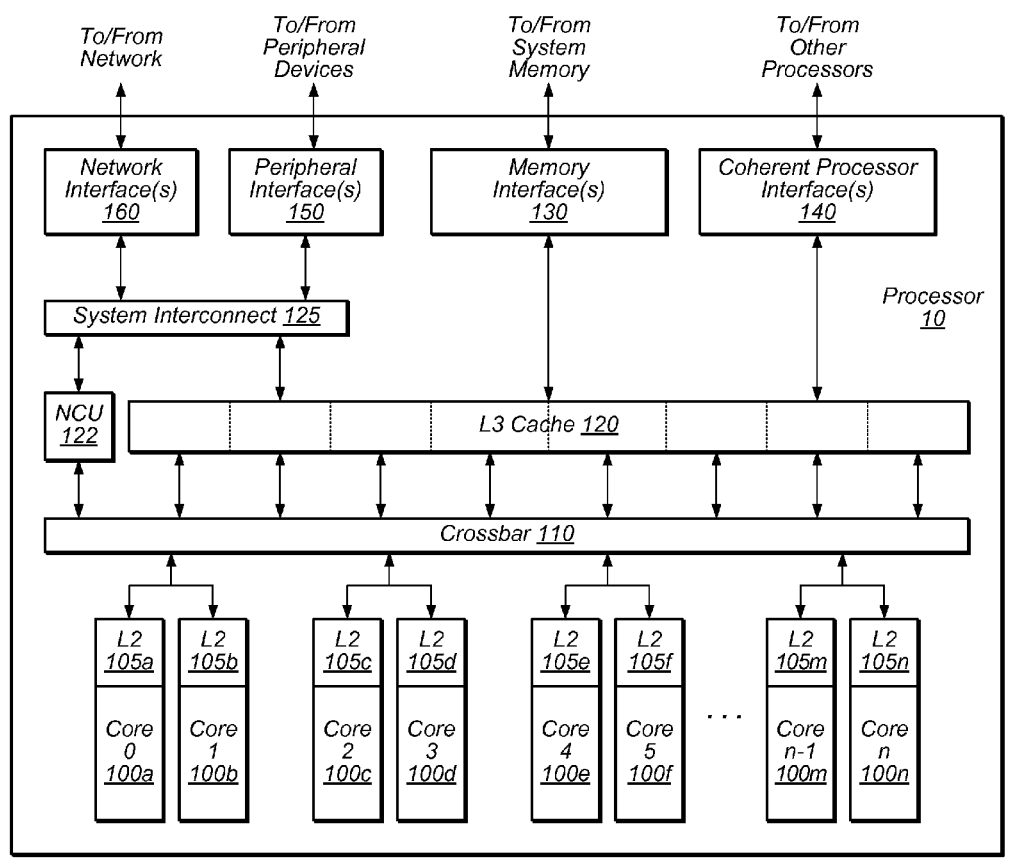
FIG. 1 is a block diagram illustrating one embodiment of a multithreaded processor.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

In the following discussion, hardware support for various types of instructions that are specific to particular cipher algorithms is explored. First, an overview is provided of one type of multithreaded processor in which cipher-specific instruction support may be provided. Next, particular embodiments of cipher-specific instruction support are described with respect to the DES cipher, the Kasumi cipher, the Camellia cipher, the AES cipher, and CRC. Finally, an exemplary system embodiment including a processor that may implement instruction-level support for various ciphers is discussed.

Overview of Multithreaded Processor Architecture

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the descriptions of FIG. 2 and FIG. 3, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PC1 Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
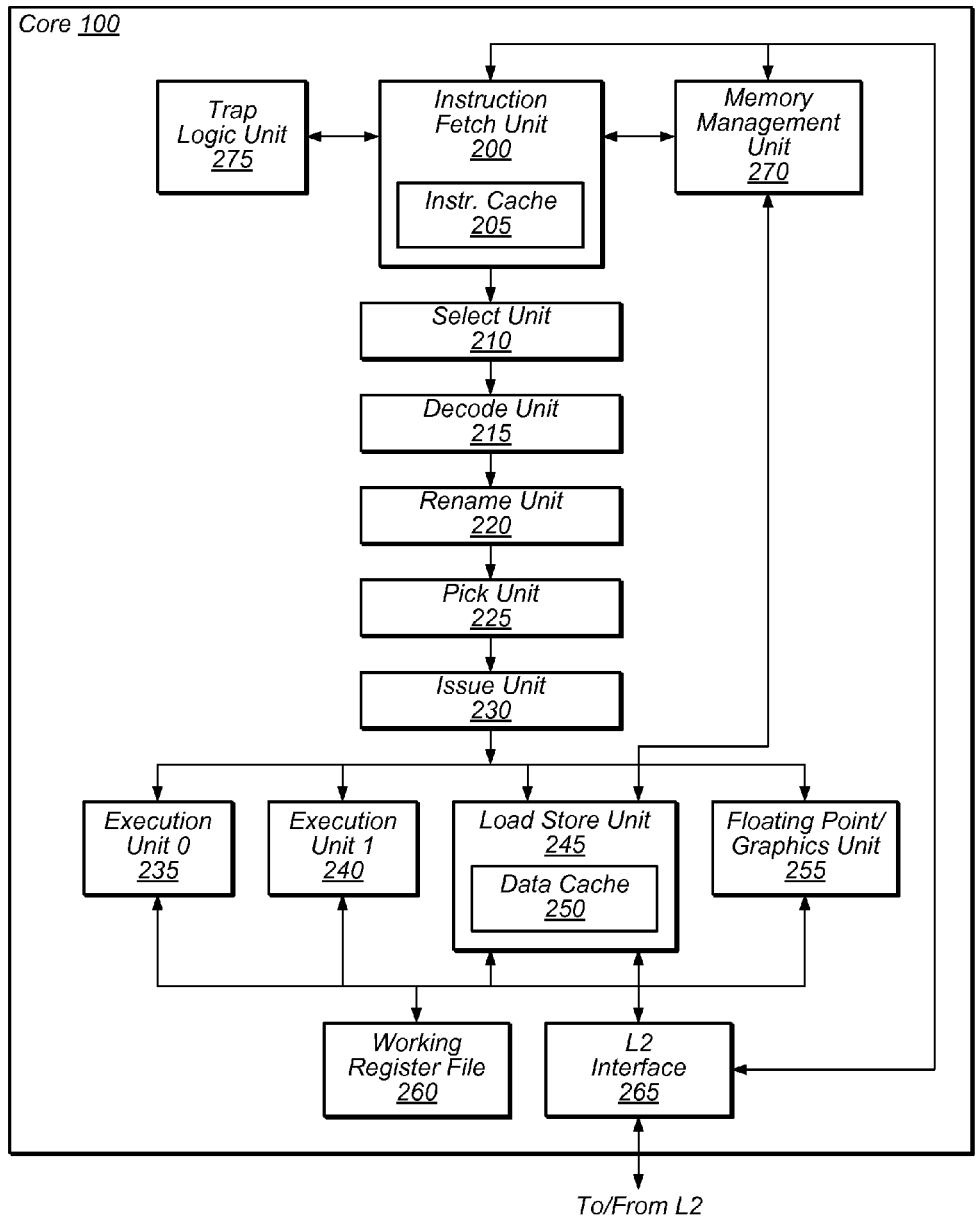
FIG. 2 is a block diagram illustrating one embodiment of a processor core configured to perform fine-grained multithreading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-

240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions.

In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking LSU 245 may also include hardware configured to support atomic load-store instructions, memory-related exception detection, and read and write access to special-purpose registers (e.g., control registers).

Floating-point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requestors. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may be not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Cipher Algorithm Execution

Figure 3:
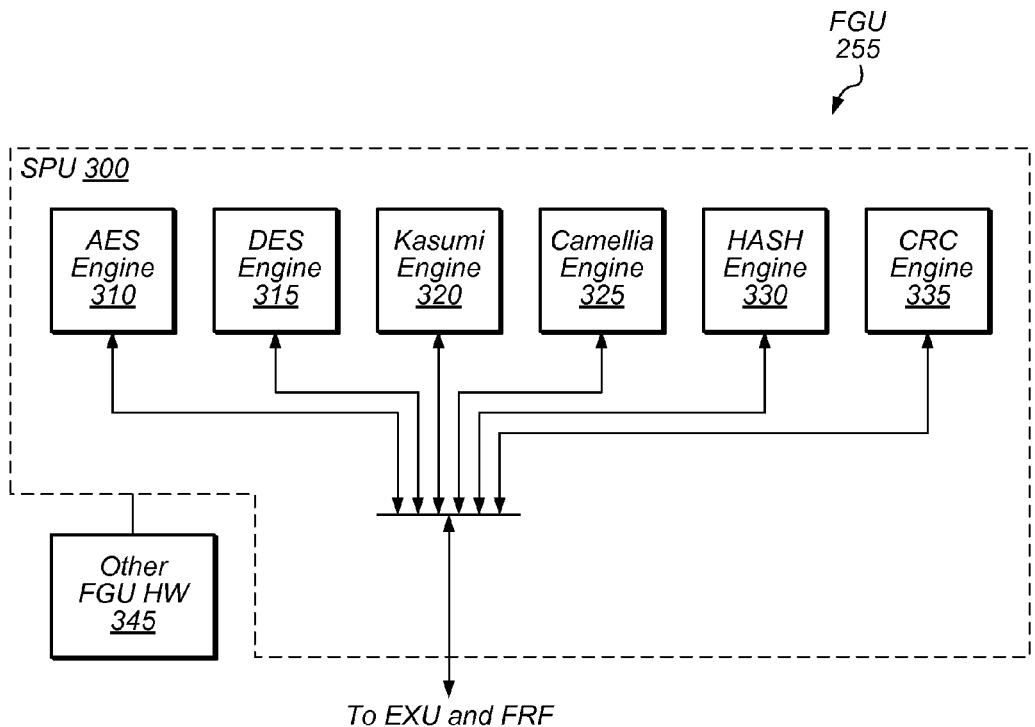
FIG. 3 is a block diagram illustrating one embodiment of a floating-point graphics unit including a cryptographic unit configured to implement block cipher algorithms.

As noted above, in some embodiments FGU 255 may be configured to support cryptographic operations including encryption/decryption and hashing algorithms using coprocessing hardware. More particularly, as shown in FIG. 3, an embodiment of FGU 255 includes a stream processing unit (SPU) 300 and various other FGU hardware 345. For example, in the illustrated embodiment, the SPU 300 includes the following encryption/decryption engines: AES engine 310, DES Engine 315, Kasumi engine 320, and Camellia engine 325. The SPU 300 also includes Hash engine 330 and cyclic redundancy check (CRC) engine 335. It is noted that SPU 300 may be alternately referred to as a cryptographic unit (although it is noted that SPU 300 may also implement non-cryptographic algorithms in addition to or instead of cryptographic algorithms). It is also noted that in other embodiments of SPU 300, other numbers of engines may be used to implement additional/different or fewer cryptographic and Hash algorithms.

As noted above and described in greater detail below, the ISA may include specific programmer visible instructions that may allow software to directly control the engines within SPU 300. As such, the other FGU hardware 345 may include logic to decode and/or route the encryption/decryption and hashing instructions or their corresponding operations to the corresponding engines.

The above-mentioned encryption/decryption algorithms may be referred to as block cipher algorithms. Generally speaking, a block cipher algorithm is a class of cryptographic algorithm in which multiple bits of a message may be encrypted and/or decrypted as a group, in contrast to stream cipher algorithms in which a character of a message may be individually encrypted/decrypted before progressing to another character.

Instruction Support for the Data Encryption Standard (DES) Cipher

As shown in FIG. 3, in one embodiment, SPU 300 may include DES engine 315. In one embodiment, DES engine 315 may be configured to execute instructions that implement various portions of a block cipher algorithm that is compliant with the Data Encryption Standard, as defined by Federal Information Processing Standards (FIPS) Publication 46-3 (also referred to herein as the "DES cipher"). These instructions may be defined within the ISA implemented by processor 10, such that processor 10 may be configured to provide specific instruction-level support for the DES cipher. As described in greater detail below, in such an implementation, a user of processor 10 may be able to specify a smaller number of instructions to implement the DES cipher than would be required for an ISA that lacked DES instruction-level support. In turn, this may result in more compact code and/or faster cipher execution.

In the following discussion, the general operation of the DES cipher is first described. Examples of particular DES instructions that DES engine 315 may execute to implement the DES cipher are then discussed, including code examples that implement such instructions.

DES Key Expansion and Cipher

Generally speaking, the DES cipher is a block cipher that provides for the encryption and decryption of a 64-bit block of input data under the control of a 64-bit input key to produce a 64-bit block of output data. During operation, the DES cipher expands the 64-bit key into a set of 16 56-bit cipher keys (also referred to as a "key schedule"). To encrypt the input data block, the DES cipher first applies an initial permutation (IP) operation to the input data block, followed by 16 "rounds" or iterations of the cipher using the 16 keys of the key schedule. Finally, the DES cipher applies an inverse initial permutation operation (IIP) to the result of the final round to generate the encrypted data block. To perform decryption, the DES cipher applies same sequence of an IP operation and 16 cipher rounds followed by an IIP operation, but using the 16 keys of the key schedule in an inverse order relative to encryption.

To generate the key schedule from the 64-bit input key, the DES cipher applies a sequence of permutation and bitwise rotate operations to the input key. In the following discussion, consistent with the notation employed in FIPS 46-3, the most significant bit of a 64-bit data word is denoted bit 1, while the least significant bit is denoted bit 64. Although the input key is defined to be 64 bits wide, the DES cipher only employs 56 bits of the input key, omitting every eighth bit. In some implementations, the omitted bits may instead be used as parity bits to detect parity errors in the corresponding bytes of the input key.

The key expansion function "Permuted Choice One" (PC1) is defined to produce a 56-bit output as a permutation of a 64-bit input, according to the following mapping:

| 57 | 49 | 41 | 33 | 25 | 17 | 9  |
|----|----|----|----|----|----|----|
| 1  | 58 | 50 | 42 | 34 | 26 | 18 |
| 10 | 2  | 59 | 51 | 43 | 35 | 27 |
| 19 | 11 | 3  | 60 | 52 | 44 | 36 |
| 63 | 55 | 47 | 39 | 31 | 23 | 15 |
| 7  | 62 | 54 | 46 | 38 | 30 | 22 |
| 14 | 6  | 61 | 53 | 45 | 37 | 29 |
| 21 | 13 | 5  | 28 | 20 | 12 | 4  | where the uppermost row denotes the bits of the input that correspond to bits 1:7 of the output, the second row denotes the bits of the input that correspond to bits 8:14 of the output, and so forth. Thus, according to the function PC1, the most significant bit of the output (i.e., bit 1) corresponds to bit 57 of the input, while the least significant bit of the output (bit 56) corresponds to bit 4 of the input.

The key expansion function "Permuted Choice Two" (PC2) is defined to produce a 48-bit output as a permutation of a 56-bit input, according to the following mapping:

| 14 | 17 | 11 | 24 | 1  | 5  | 3  | 28 |
|----|----|----|----|----|----|----|----|
| 15 | 6  | 21 | 10 | 23 | 19 | 12 | 4  |
| 26 | 8  | 16 | 7  | 27 | 20 | 13 | 2  |
| 41 | 52 | 31 | 37 | 47 | 55 | 30 | 40 |
| 51 | 45 | 33 | 48 | 44 | 49 | 39 | 56 |
| 34 | 53 | 46 | 42 | 50 | 36 | 29 | 32 | where, in a manner similar to PC1, the leftmost entry of the uppermost row denotes the most significant bit of the output (bit 1), while the rightmost entry of the lowermost row denotes the least significant bit of the output (bit 48). (It will be assumed that the ordering convention described above with respect to the PC1 and PC2 mappings will be applicable to all other DES cipher permutations described below, unless otherwise noted.)

Given the foregoing definitions of PC1 and PC2, the DES cipher key schedule may be generated according to the following pseudocode, where the notation {A, B} indicates the bitwise concatenation of bit fields A and B, and the input key is defined as key[1:64]:

```
key_pc1[1:56] = PC1(key[1:64]);
c0[1:28]  = key_pc1[1:28]; d0[1:28]  = key_pc1[29:56];
c1[1:28]  = {c0[2:28], c0[1]}; d1[1:28]  = {d0[2:28], d0[1]};
key1[1:48]  = PC2({c1[1:28], d1[1:28]});
c2[1:28]  = {c1[3:28], c1[1:2]}; d2[1:28]  = {d1[3:28], d1[1:2]};
key2[1:48]  = PC2({c2[1:28], d2[1:28]});
c3[1:28]  = {c2[3:28], c2[1:2]}; d3[1:28]  = {d2[3:28], d2[1:2]};
key3[1:48]  = PC2({c3[1:28], d3[1:28]});
c4[1:28]  = {c3[3:28], c3[1:2]}; d4[1:28]  = {d3[3:28], d3[1:2]};
key4[1:48]  = PC2({c4[1:28], d4[1:28]});
c5[1:28]  = {c4[3:28], c4[1:2]}; d5[1:28]  = {d4[3:28], d4[1:2]};
key5[1:48]  = PC2({c5[1:28], d5[1:28]});
c6[1:28]  = {c5[3:28], c5[1:2]}; d6[1:28]  = {d5[3:28], d5[1:2]};
key6[1:48]  = PC2({c6[1:28], d6[1:28]});
c7[1:28]  = {c6[3:28], c6[1:2]}; d7[1:28]  = {d6[3:28], d6[1:2]};
key7[1:48]  = PC2({c7[1:28], d7[1:28]});
c8[1:28]  = {c7[3:28], c7[1:2]}; d8[1:28]  = {d7[3:28], d7[1:2]};
key8[1:48]  = PC2({c8[1:28], d8[1:28]});
c9[1:28]  = {c8[2:28], c8[1]}; d9[1:28]  = {d8[2:28], d8[1]};
key9[1:48]  = PC2({c9[1:28], d9[1:28]});
c10[1:28]  = {c9[3:28], c9[1:2]}; d10[1:28]  = {d9[3:28], d9[1:2]};
key10[1:48]  = PC2({c10[1:28], d10[1:28]});
c11[1:28]  = {c10[3:28], c10[1:2]}; d11[1:28]  = {d10[3:28], d10[1:2]};
key11[1:48]  = PC2({c11[1:28], d11[1:28]});
c12[1:28]  = {c11[3:28], c11[1:2]}; d12[1:28]  = {d11[3:28], d11[1:2]};
key12[1:48]  = PC2({c12[1:28], d12[1:28]});
c13[1:28]  = {c12[3:28], c12[1:2]}; d13[1:28]  = {d12[3:28], d12[1:2]};
key13[1:48]  = PC2({c13[1:28], d13[1:28]});
c14[1:28]  = {c13[3:28], c13[1:2]}; d14[1:28]  = {d13[3:28], d13[1:2]};
key14[1:48]  = PC2({c14[1:28], d14[1:28]});
c15[1:28]  = {c14[3:28], c14[1:2]}; d15[1:28]  = {d14[3:28], d14[1:2]};
key15[1:48]  = PC2({c15[1:28], d15[1:28]});
c16[1:28]  = {c15[2:28], c15[1]}; d16[1:28]  = {d15[2:28], d15[1]};
key16[1:48]  = PC2({c16[1:28], d16[1:28]});
```

As seen above, the input key is first transformed by the PC1 function, and then split into two 28-bit halves c0 and d0, which are referred to as a c/d pair. Successive c/d pairs are generated by rotating the previous c/d pairs by either one or two bit positions. Applying the PC2 function to each c/d pair yields a corresponding key of the key schedule, denoted key1 through key16. It is noted that application of the PC2 function to a c/d pair to generate a particular key is dependent only on the c/d pair for the particular key; that is, once the c/d pair is known, the PC2 function may be applied at any time prior to actual use of the particular key within the DES cipher round.

In some instances, each of the DES cipher c/d pairs shown above may be referred to as an intermediate value or precursor to its respectively corresponding cipher key. Each given intermediate value (i.e., each c/d pair) has the property that when the PC2 function of the DES cipher is applied to the given intermediate value, a corresponding cipher key of the DES cipher key schedule is generated. As noted below, the point at which the PC2 function is applied to generate a cipher key may vary in various implementations of processor 10.

The DES cipher makes use of several distinct permutation operations, each of which is now summarized. The initial permutation operation IP maps a 64-bit input to a 64-bit output as follows:

| 58 | 50 | 42 | 34 | 26 | 18 | 10 | 2 |
|----|----|----|----|----|----|----|---|
| 60 | 52 | 44 | 36 | 28 | 20 | 12 | 4 |
| 62 | 54 | 46 | 38 | 30 | 22 | 14 | 6 |
| 64 | 56 | 48 | 40 | 32 | 24 | 16 | 8 |
| 57 | 49 | 41 | 33 | 25 | 17 | 9  | 1 |
| 59 | 51 | 43 | 35 | 27 | 19 | 11 | 3 |
| 61 | 53 | 45 | 37 | 29 | 21 | 13 | 5 |
| 63 | 55 | 47 | 39 | 31 | 23 | 15 | 7 |

The inverse initial permutation operation IIP maps a 64-bit input to a 64-bit output as follows:

| 40 | 8 | 48 | 16 | 56 | 24 | 64 | 32 |
|----|---|----|----|----|----|----|----|
| 39 | 7 | 47 | 15 | 55 | 23 | 63 | 31 |
| 38 | 6 | 46 | 14 | 54 | 22 | 62 | 30 |
| 37 | 5 | 45 | 13 | 53 | 21 | 61 | 29 |
| 36 | 4 | 44 | 12 | 52 | 20 | 60 | 28 |
| 35 | 3 | 43 | 11 | 51 | 19 | 59 | 27 |
| 34 | 2 | 42 | 10 | 50 | 18 | 58 | 26 |
| 33 | 1 | 41 | 9  | 49 | 17 | 57 | 25 |

The DES Expansion Permutation operation maps a 32-bit input to a 48-bit output as follows:

| 32 | 1  | 2  | 3  | 4  | 5  |
|----|----|----|----|----|----|
| 4  | 5  | 6  | 7  | 8  | 9  |
| 8  | 9  | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1  |

The DES Permutation Function operation maps a 32-bit input to a 32-bit output as follows:

| 16 | 7  | 20 | 21 | 29 | 12 | 28 | 17 |
|----|----|----|----|----|----|----|----|
| 1  | 15 | 23 | 26 | 5  | 18 | 31 | 10 |

| 2  | 8  | 24 | 14 | 32 | 27 | 3 | 9  |
|----|----|----|----|----|----|---|----|
| 19 | 13 | 30 | 6  | 22 | 11 | 4 | 25 |

Additionally, the DES cipher employs eight substitution functions denoted here as "sbox1" through "sbox8." Each of these substitution functions takes a six-bit input value $B[1:6]$ and produces a four-bit output value $S[1:4]$, in the following fashion. Each substitution function is depicted as an arrangement of four rows of sixteen columns. To produce the output S for a given input B, bits $B[1]$ and $B[6]$ are decoded to select one of the four rows, and bits $B[2:5]$ are decoded to select one of the sixteen columns. The value indicated at the intersection of the selected row and column is then produced as the output $S[1:4]$. The individual substitution functions are arranged as follows (represented in decimal format):

sbox1:

| 14 | 4  | 13 | 1 | 2  | 15 | 11 | 8  | 3  | 10 | 6  | 12 | 5  | 9  | 0  | 7  |
|----|----|----|---|----|----|----|----|----|----|----|----|----|----|----|----|
| 0  | 15 | 7  | 4 | 14 | 2  | 13 | 1  | 10 | 6  | 12 | 11 | 9  | 5  | 3  | 8  |
| 4  | 1  | 14 | 8 | 13 | 6  | 2  | 11 | 15 | 12 | 9  | 7  | 3  | 10 | 5  | 0  |
| 15 | 12 | 8  | 2 | 4  | 9  | 1  | 7  | 5  | 11 | 3  | 14 | 10 | 0  | 6  | 13 | sbox2:

| 15 | 1  | 8  | 14 | 6  | 11 | 3  | 4  | 9  | 7  | 2  | 13 | 12 | 0  | 5  | 10 |
|----|----|----|----|----|----|----|----|----|----|----|----|----|----|----|----|
| 3  | 13 | 4  | 7  | 15 | 2  | 8  | 14 | 12 | 0  | 1  | 10 | 6  | 9  | 11 | 5  |
| 0  | 14 | 7  | 11 | 10 | 4  | 13 | 1  | 5  | 8  | 12 | 6  | 9  | 3  | 2  | 15 |
| 13 | 8  | 10 | 1  | 3  | 15 | 4  | 2  | 11 | 6  | 7  | 12 | 0  | 5  | 14 | 9  | sbox3:

| 10 | 0  | 9  | 14 | 6  | 3  | 15 | 5  | 1  | 13 | 12 | 7  | 11 | 4  | 2  | 8  |
|----|----|----|----|----|----|----|----|----|----|----|----|----|----|----|----|
| 13 | 7  | 0  | 9  | 3  | 4  | 6  | 10 | 2  | 8  | 5  | 14 | 12 | 11 | 15 | 1  |
| 13 | 6  | 4  | 9  | 8  | 15 | 3  | 0  | 11 | 1  | 2  | 12 | 5  | 10 | 14 | 7  |
| 1  | 10 | 13 | 0  | 6  | 9  | 8  | 7  | 4  | 15 | 14 | 3  | 11 | 5  | 2  | 12 | sbox4:

| 7  | 13 | 14 | 3 | 0  | 6  | 9  | 10 | 1  | 2 | 8  | 5  | 11 | 12 | 4  | 15 |
|----|----|----|---|----|----|----|----|----|---|----|----|----|----|----|----|
| 13 | 8  | 11 | 5 | 6  | 15 | 0  | 3  | 4  | 7 | 2  | 12 | 1  | 10 | 14 | 9  |
| 10 | 6  | 9  | 0 | 12 | 11 | 7  | 13 | 15 | 1 | 3  | 14 | 5  | 2  | 8  | 4  |
| 3  | 15 | 0  | 6 | 10 | 1  | 13 | 8  | 9  | 4 | 5  | 11 | 12 | 7  | 2  | 14 | sbox5:

| 2  | 12 | 4  | 1  | 7  | 10 | 11 | 6  | 8  | 5  | 3  | 15 | 13 | 0  | 14 | 9  |
|----|----|----|----|----|----|----|----|----|----|----|----|----|----|----|----|
| 14 | 11 | 2  | 12 | 4  | 7  | 13 | 1  | 5  | 0  | 15 | 10 | 3  | 9  | 8  | 6  |
| 4  | 2  | 1  | 11 | 10 | 13 | 7  | 8  | 15 | 9  | 12 | 5  | 6  | 3  | 0  | 14 |
| 11 | 8  | 12 | 7  | 1  | 14 | 2  | 13 | 6  | 15 | 0  | 9  | 10 | 4  | 5  | 3  |

| sbox6: | | | | | | | | | | | | | | | |
|---|---|---|---|---|---|---|---|---|---|---|---|---|---|---|---|
| 12 | 1 | 10 | 15 | 9 | 2 | 6 | 8 | 0 | 13 | 3 | 4 | 14 | 7 | 5 | 11 |
| 10 | 15 | 4 | 2 | 7 | 12 | 9 | 5 | 6 | 1 | 13 | 14 | 0 | 11 | 3 | 8 |
| 9 | 14 | 15 | 5 | 2 | 8 | 12 | 3 | 7 | 0 | 4 | 10 | 1 | 13 | 11 | 6 |
| 4 | 3 | 2 | 12 | 9 | 5 | 15 | 10 | 11 | 14 | 1 | 7 | 6 | 0 | 8 | 13 |

| sbox7: | | | | | | | | | | | | | | | |
|---|---|---|---|---|---|---|---|---|---|---|---|---|---|---|---|
| 4 | 11 | 2 | 14 | 15 | 0 | 8 | 13 | 3 | 12 | 9 | 7 | 5 | 10 | 6 | 1 |
| 13 | 0 | 11 | 7 | 4 | 9 | 1 | 10 | 14 | 3 | 5 | 12 | 2 | 15 | 8 | 6 |
| 1 | 4 | 11 | 13 | 12 | 3 | 7 | 14 | 10 | 15 | 6 | 8 | 0 | 5 | 9 | 2 |
| 6 | 11 | 13 | 8 | 1 | 4 | 10 | 7 | 9 | 5 | 0 | 15 | 14 | 2 | 3 | 12 |

| sbox8: | | | | | | | | | | | | | | | |
|---|---|---|---|---|---|---|---|---|---|---|---|---|---|---|---|
| 13 | 2 | 8 | 4 | 6 | 15 | 11 | 1 | 10 | 9 | 3 | 14 | 5 | 0 | 12 | 7 |
| 1 | 15 | 13 | 8 | 10 | 3 | 7 | 4 | 12 | 5 | 6 | 11 | 0 | 14 | 9 | 2 |
| 7 | 11 | 4 | 1 | 9 | 12 | 14 | 2 | 0 | 6 | 10 | 13 | 15 | 3 | 5 | 8 |
| 2 | 1 | 14 | 7 | 4 | 10 | 8 | 13 | 15 | 12 | 9 | 0 | 3 | 5 | 6 | 11 |

Having defined the various operations employed by the DES cipher, the operation of the cipher itself may be given by the following pseudocode:

```
// Define the 64-bit plain text input as      : pt[1:64]
// Define the 64-bit cipher text output as    : ct[1:64]
// Expanded keys are numbered key_1 to key_16.
// Apply the Initial Permutation operation
pt_ip[1:64]       = Initial_Permutation(pt[1:64]);
i                 = 1;
L_i[1:32]         = pt_ip[1:32];
R_i[1:32]         = pt_ip[33:64];
// Perform 16 rounds
For i = 1 to 16
  Begin
    // Apply PC2 transform here if it was not applied
    // during key expansion
    PC2_key_i[1:48]       = PC2(key_i[1:48]);
    R_e_i[1:48]           = Expansion_Permutation
                            (R_i[1:32]);
    R_e_key_i[1:48]       = R_e_i[1:48]
                            xor PC2_key_i[1:48];
    R_e_key_sb_i[1:4]     = sbox1(R_e_key_i[1:6]);
    R_e_key_sb_i[5:8]     = sbox2(R_e_key_i[7:12]);
    R_e_key_sb_i[9:12]    = sbox3(R_e_key_i[13:18]);
    R_e_key_sb_i[13:16]   = sbox4(R_e_key_i[19:24]);
    R_e_key_sb_i[17:20]   = sbox5(R_e_key_i[25:30]);
    R_e_key_sb_i[21:24]   = sbox6(R_e_key_i[31:36]);
    R_e_key_sb_i[25:28]   = sbox7(R_e_key_i[37:42]);
    R_e_key_sb_i[29:32]   = sbox8(R_e_key_i[43:48]);
    R_e_key_sb_p_i[1:32]= Permutation_Function
                            (R_e_key_sb_i[1:32]);
    R_i+1[1:32]           = L_i[1:32] xor
                            R_e_key_sb_p_i[1:32];
    L_i+1[1:32]           = R_i[1:32];
  End
// Apply the Inverse Initial Permutation operation
ct[1:64] = Inverse_Initial_Permutation({R_16[1:32],L_16[1:32]});
```

As seen above, the input 64-bit block is first transformed by the IP operation, and then divided into 32-bit left and right halves L_1 and R_1. During each of the 16 DES cipher rounds, the Expansion Permutation operation is applied to right half R_i to generate a 48-bit value, which is then combined with the key (selected from the generated key schedule) that corresponds to the current round. The 8 sbox operations are then applied in parallel to produce a 32-bit result to which the Permutation Function operation is then applied. The right half R_i+1 for the next round is then generated by combining the left half L_i of the current round with the result of the Permutation Function operation. The left half L_i+1 for the next round is simply the right half R_i of the current round (essentially, right half R_i shifted left by 32 bits). After the sixteenth round is complete, the IIP operation is applied to the concatenation of R_16 and L_16 to produce the 64-bit encrypted output block.

As noted above with respect to key expansion, the PC2 function may be applied to a c/d pair either after the c/d pair is generated during key expansion, or before the key is first utilized during the cipher round. The above pseudocode reflects the latter choice. However, in an embodiment where the PC2 function was applied during key expansion, it would be omitted from the cipher round.

DES Engine Instruction Support

In some embodiments, the DES key expansion and cipher functionality described above may be implemented by standard arithmetic and logical instructions that may be provided by a processor's ISA. For example, the various permutation operations may be implemented by successively masking input bits (e.g., using a logical AND instruction), shifting the masked bits to their corresponding output positions (e.g., using logical shift or rotate instructions), and combining the shifted bits into the permuted result (e.g., using a logical OR instruction). Similarly, the sbox substitution operations may be implemented as a sequence of conditional compare instructions, or as a lookup table in memory accessed via load instructions.

However, implementing the DES cipher using general-purpose ISA instructions may require numerous instructions as well as a substantial number of cycles to execute those instructions, diminishing cipher performance. By contrast, in one embodiment, DES engine 315 may be configured to provide support for certain ISA instructions that are particular to the DES cipher, such that execution of individual ones of the DES-specific instructions results in DES engine 315 performing entire corresponding portions of the DES cipher. Thus, for at least some embodiments of DES engine 315, executing the individual DES-specific instructions to implement the DES cipher may accomplish more of the work of the DES cipher per instruction than in the case of using general-purpose ISA instructions configured to perform the DES cipher.

Figure 4:
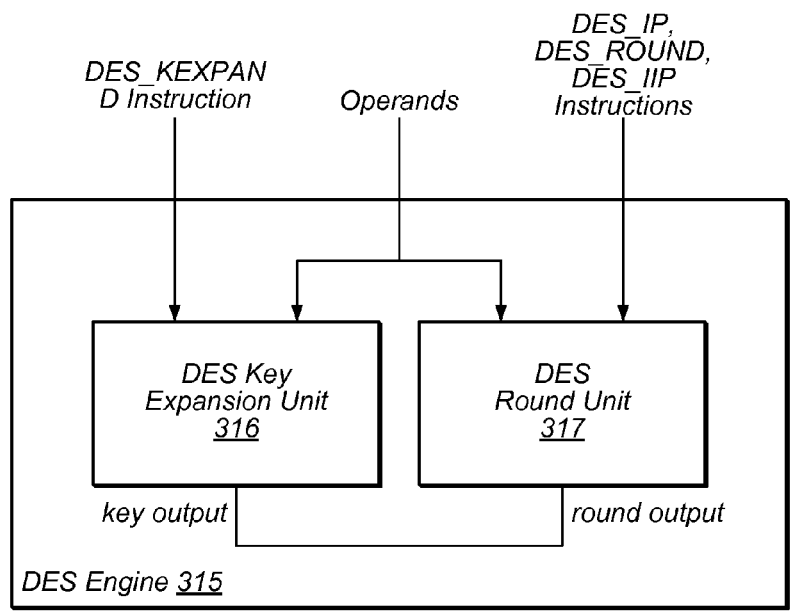
FIG. 4 is a block diagram of one embodiment of a cryptographic engine configured to execute instructions to implement the Data Encryption Standard (DES) block cipher algorithm.

One such embodiment of DES engine 315 is illustrated in FIG. 4, where DES engine 315 is shown to include DES key expansion unit 316 and DES round unit 317. In various embodiments, the outputs of these units may be combined to form the output of DES engine 315, for example through the use of muxes (not shown). It is noted that this partitioning of DES cipher functionality within DES engine 315 is merely one example chosen to facilitate exposition. Other configurations of DES engine 315 are possible and contemplated in which logic may be differently partitioned to implement support for DES-specific instructions, including instructions that differ from those described below.

In one embodiment, DES key expansion unit 316 may be configured to execute a DES key expansion instruction defined within the ISA of processor 10 and denoted with the instruction mnemonic DES_KEXPAND (though any suitable mnemonic may be employed). In various embodiments, DES key expansion unit 316 may directly decode the DES_KEXPAND instruction from opcode bits sent from upstream pipeline stages, or may receive an already-decoded or partially-decoded signal indicative of the occurrence of a DES_KEXPAND instruction.

There are various possibilities for the specific behavior of the DES_KEXPAND instruction, which may exhibit a range of tradeoffs between the hardware complexity of DES key expansion unit 316 and the relative performance of key expansion (in terms of the numbers of instances of the DES_KEXPAND instruction required to generate the complete key schedule, as well as the extent to which the instances minimize dependencies among each other and thus reduce execution latency). To review the DES key expansion discussed above, in order to generate a schedule of 16 keys, the PC1 function is first applied to the input key, which is split into halves c0 and d0. Successive c/d pairs are generated by rotating the previous c/d pairs by either one or two bit positions, and application of the PC2 function to each c/d pair yields a corresponding key of the key schedule. It is noted that once pair c0/d0 is generated, each successive c/d pair may be generated as a shift function relative to the immediately preceding c/d pair, as an absolute shift function of the c0/d0 pair, or as a shift function relative to any preceding c/d pair (not necessarily the immediately preceding pair). This is partially illustrated in the following shift schedule:

binations are also possible. For example, the c6/d6 pair may be generated as a shift of the c4/d4 pair by four bits, of the c3/d3 pair by six bits, of the c2/d2 pair by seven bits, or of the c1/d1 pair by eight bits.

The properties illustrated by this shift schedule provide several possible implementations for the DES_KEXPAND instruction. Preliminarily, it is noted that in various embodiments, the DES_KEXPAND instruction may be implemented with different programmer-selectable modes of operation. For example, one of the instruction's operands may be defined as a programmer-selectable constant or immediate value that designates the desired mode of the DES_KEXPAND instruction, or as the identifier of an architectural register that contains an indication of the desired mode. When decoded by DES key expansion unit 316, each of the modes may result in a different defined behavior. The number of different modes to be supported by DES key expansion unit 316 may affect the overall hardware complexity of that unit, as discussed below.

Also, as noted previously, application of the PC2 function to the intermediate c/d value to generate the final cipher key may either be performed during DES key expansion, or during the execution of a DES round, prior to the cipher key's use. In embodiments where the DES_KEXPAND instruction applies the PC2 function, the output generated by executing the DES_KEXPAND instruction may include one or more of the cipher keys themselves in a form ready for immediate use by the DES cipher round. In other embodiments, the DES_KEXPAND instruction may not apply the PC2 function to the intermediate c/d pair. Instead, the PC2 function may be deferred to the DES_ROUND instruction discussed below, or implemented as part of a different instruction or a dedicated instruction. In such embodiments, the output generated by executing the DES_KEXPAND instruction may include one or more intermediate values (i.e., c/d pairs) that, upon application of the PC2 function, yield corresponding ones of the cipher keys.

In one embodiment, the DES key expansion unit 316 may be configured to support two selectable modes of operation of the DES_KEXPAND instruction: one that applies the PC1 operation to the initial input key, and one that implements a one-bit shift operation. For example, DES key expansion unit 316 may implement the appropriate combinatorial logic (e.g., logic gates and/or state elements) needed to implement the PC1 operation as well as the one-bit shift operation, as well as logic (e.g., a multiplexor or "mux") configured to select the result specified by the indicated mode of the instruction. As indicated in the shift schedule above, the maximum total shift that is required is 28 bits, which may be achieved through repeated application of the one-bit shift mode of this embodi-

| | Round # | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Relative shift | 1 | 1 | 2 | 2 | 2 | 2 | 2 | 2 | 1 | 2 | 2 | 2 | 2 | 2 | 2 | 1 |
| Total shift | 1 | 2 | 4 | 6 | 8 | 10 | 12 | 14 | 15 | 17 | 19 | 21 | 23 | 25 | 27 | 28 |

As this shift schedule shows, the shift required to produce the c/d pair for a given round may be specified as a shift of one or two bit positions of the c/d pair for the immediately preceding round (shown as the "relative shift" row), or as a shift of a cumulative total of bit positions of the c0/d0 pair (shown as the "total shift" row). A large number of intermediate comment of DES_KEXPAND. This embodiment may require little hardware complexity, though it may create serial dependencies among each of the DES_KEXPAND instructions, which may increase execution latency.

In another embodiment, DES key expansion unit 316 may be configured to support a two-bit shift mode of operation of the DES_KEXPAND instruction in addition to the one-bit shift and PC1 modes of operation described above. For example, DES key expansion unit 316 may include an additional port on a shift mux to support two-bit as well as one-bit shifts. As reflected in the shift schedule above, because some keys require a two-bit shift, explicitly providing support for this shift mode may reduce the total number of DES_KEXPAND instructions required to completely generate the key schedule. In one variant, DES key expansion unit 316 may be configured to combine the PC1 operation with a one-bit shift, such that a one-bit shift occurs when the PC1 mode of operation is selected.

As the shift schedule indicates, the c/d pair for each key may be generated as an independent function of the c0/d0 pair, according to the 16 distinct shift operations reflected in the "total shift" row of the shift schedule. Correspondingly, in one embodiment, DES key expansion unit 316 may be configured to implement support for each of these 16 shift operations, in addition to the PC1 operation, as distinct modes of operation of the DES_KEXPAND instruction. For example, DES key expansion unit 316 may include a shift mux having 16 ports corresponding respectively to the 16 different shift modes, as well as logic configured to perform the PC1 operation. Because each shift mode of this embodiment is dependent upon the same c0/d0 source, implementing each shift mode separately may eliminate dependencies among the DES_KEXPAND instructions, which may reduce the latency of performing DES key expansion, at the cost of increased hardware complexity.

One embodiment of DES key expansion unit 316 may represent an intermediate choice between hardware complexity and reduced dependencies among DES_KEXPAND instructions. In this embodiment, DES key expansion unit 316 may be configured to implement support for the PC1-plus-one-bit-shift mode of operation as well as one-bit, two-bit, and four-bit shift modes of operation of the DES_KEXPAND instruction. One example of SPARC assembly language code that reflects usage of this embodiment is as follows:

```
setx         vt_key, %g1, %l4
ldd          [%l4 + 0x000], %f0       !# Load 64-bit key
expand key:
des_kexpand  %f0 , 0, %f0             !# cd_1  == PC1 +   shift by 1
des_kexpand  %f0 , 1, %f2             !# cd_2  ==         shift by 1
des_kexpand  %f2 , 3, %f6             !# cd_4  ==         shift by 4
des_kexpand  %f2 , 2, %f4             !# cd_3  ==         shift by 2
des_kexpand  %f6 , 3, %f10            !# cd_6  ==         shift by 4
des_kexpand  %f6 , 2, %f8             !# cd_5  ==         shift by 2
des_kexpand  %f10, 3, %f14            !# cd_8  ==         shift by 4
des_kexpand  %f10, 2, %f12            !# cd_7  ==         shift by 2
des_kexpand  %f14, 1, %f16            !# cd_9  ==         shift by 1
des_kexpand  %f16, 3, %f20            !# cd_12 ==         shift by 4
des_kexpand  %f16, 2, %f18            !# cd_11 ==         shift by 2
des_kexpand  %f20, 3, %f24            !# cd_13 ==         shift by 4
des_kexpand  %f20, 2, %f22            !# cd_12 ==         shift by 2
des_kexpand  %f24, 3, %f28            !# cd_15 ==         shift by 4
des_kexpand  %f24, 2, %f26            !# cd_14 ==         shift by 2
des_kexpand  %f28, 1, %f30            !# cd_16 ==         shift by 1
```

In this example, the initial two instructions load the 64-bit DES cipher key into floating-point register % f0. The second operand of the DES_KEXPAND instruction is shown as a constant that specifies one of the four modes of operation. In one embodiment, DES key expansion unit 316 may be configured to execute the first DES_KEXPAND instruction to apply the PC1 operation as well as a one-bit shift to % f0 generate the first intermediate c/d value corresponding to the first key. DES key expansion unit 316 may be further configured to execute the remaining instructions to apply the various shift operations to the results of previous operations to generate the remaining intermediate c/d values corresponding to the remaining keys. It is noted that this code represents merely one example of how a DES_KEXPAND instruction may be employed, and that numerous other applications using other variants of the instruction are possible and contemplated. For example, in other embodiments, DES_KEXPAND may be implemented to generate DES cipher keys instead of intermediate values c/d, to use the integer register file instead of the floating-point register file, and/or to generate more than one intermediate value or key per invocation of the DES_KEXPAND instruction. Further, the DES_KEXPAND instruction may be implemented in any suitable ISA.

In one embodiment, DES round unit 317 may be configured to execute a DES initial permutation instruction, a DES round instruction, and a DES inverse initial permutation instruction, each defined within the ISA of processor 10 and respectively denoted with the instruction mnemonics DES_IP, DES_ROUND, and DES_IIP (though any suitable mnemonics may be employed). In various embodiments, DES round unit 317 may directly decode these instruction from opcode bits sent from upstream pipeline stages, or may receive already-decoded or partially-decoded signals indicative of the occurrence of any of these instructions. (In other embodiments, some or all of these instructions may be implemented by distinct units within DES engine 315 according to suitable combinations, or integrated into a single, monolithic unit.)

To implement the DES_IP and DES_IIP instructions, DES round unit 317 may include logic configured to respectively apply the IP and IIP operations discussed above to a 64-bit input operand. For example, the 64-bit permutations given by each of these operations may be implemented by a 64-bit, 2-port mux that selectively reorders the bits according to either operation.

To implement the DES_ROUND instruction, DES round unit 317 may include logic configured to perform the initial DES Expansion Permutation operation, the various sbox substitution operations, the DES Permutation Function operation, and the other ancillary operations described above with respect to the DES cipher pseudocode. For example, as with any of the other features implemented by DES engine 315, the various permutation and substitution operations of the DES cipher may be implemented through the use of appropriately configured muxes or combinatorial logic according to any suitable logic and/or circuit design methodology. In one embodiment, to implement the DES_ROUND instruction, DES round unit 317 may further include logic configured to apply the PC2 function to the entry of the key schedule generated by the DES_KEXPAND instruction.

From the DES cipher pseudocode given above, it is noted that each round i of the DES cipher takes as an input a 48-bit round key (key_i), which may or may not reflect application of the PC2 function. Each round also takes a 64-bit intermediate value (expressed as 32-bit left and right halves L_i and R_i), and produces as an output a 64-bit intermediate value for use by the next round or by the IIP operation (L_i+1 and R_i+1). In some embodiments, however, the ISA implemented by processor 10 may support up to three 64-bit input operands for an instruction such as DES_ROUND. In one such embodiment, the additional input operand may be employed to provide an additional round key (denoted key_i+1), and DES round unit 317 may be configured to perform two rounds of the DES cipher for each invocation of the DES_ROUND instruction. For example, in response to receiving a DES_ROUND instruction that specifies two consecutive 48-bit round keys key_i and key_i+1 as well as a 64-bit intermediate value {L_i, R_i}, DES round unit 317 may be configured to first compute {Li+1,R_i+1} using key_i and {L_i, R_i}, and then compute {Li+2,R_i+2} using the previously-determined {Li+1,R_i+1} and key_i+1. DES round unit 317 may then produce {Li+2,R_i+2} as the result of the DES_ROUND instruction to be written back. In some embodiments, producing two rounds of the DES cipher per invocation of the DES_ROUND instruction may improve overall cipher performance, although in other embodiments, it is contemplated that fewer or more rounds may be performed per DES_ROUND instruction.

One example of SPARC assembly language code that reflects usage of the DES_IP and DES_IIP instructions and the two-rounds-per-invocation embodiment of the DES_ROUND instruction discussed above is as follows:

```
!# Expanded keys in F0 thru F30
setx        vt_cleartext, %g1, %l4
ldd         [%l4 + 0x000], %f32        !# Load 64-bit cleartext
run_cipher:
des_ip      %f32,             %f32
des_round   %f0 , %f2 , %f32, %f32     !# Rounds  1 and  2
des_round   %f4 , %f6 , %f32, %f32     !# Rounds  3 and  4
des_round   %f8 , %f10, %f32, %f32     !# Rounds  5 and  6
des_round   %f12, %f14, %f32, %f32     !# Rounds  7 and  8
des_round   %f16, %f18, %f32, %f32     !# Rounds  9 and 10
des_round   %f20, %f22, %f32, %f32     !# Rounds 11 and 12
des_round   %f24, %f26, %f32, %f32     !# Rounds 13 and 14
des_round   %f28, %f30, %f32, %f32     !# Rounds 15 and 16
des_iip     %f32,             %f32
```

In this example, it is assumed that the DES key schedule has already been generated and stored within 64-bit floating-point registers %f0 through %f30. The first two instructions load the 64-bit input block to be encrypted into floating-point register %f32. DES round unit 317 may be configured to execute the DES_IP instruction to apply the IP operation to register %f32, and may be further configured to execute the DES_ROUND instructions using the specified keys from the key schedule (or intermediate values that are precursors to such keys) to compute one pair of DES rounds per instruction. Finally, DES round unit 317 may be configured to execute the DES_IIP instruction to apply the IIP operation to register %32, which then contains the 64-bit encrypted output block. It is noted that this code represents merely one example of how the DES_IP, DES_IIP, and DES_ROUND instructions may be employed, and that numerous other applications using other variants of these instructions are possible and contemplated. For example, in other embodiments, these instructions may be implemented to use the integer register file instead of the floating-point register file. Further, these instructions may be implemented in any suitable ISA.

As noted previously, the inverse DES cipher may be implemented by executing the same operations as for the DES cipher, but with an inverted key ordering. One example of SPARC assembly language code that reflects an implementation of the inverse DES cipher is shown below. The above remarks with respect to the DES cipher may apply equally to the inverse DES cipher.

```
!# Inverse cipher
!# Expanded keys in F0 thru F30
setx        vt_ciphertext, %g1, %l4
ldd         [%l4 + 0x000], %f32 !      # Load 64-bit ciphertext
run_cipher:
des_ip      %f32,             %f32
des_round   %f30, %f28, %f32, %f32     !# Rounds  1 and  2
des_round   %f26, %f24, %f32, %f32     !# Rounds  3 and  4
des_round   %f22, %f20, %f32, %f32     !# Rounds  5 and  6
des_round   %f18, %f16, %f32, %f32     !# Rounds  7 and  8
des_round   %f14, %f12, %f32, %f32     !# Rounds  9 and 10
des_round   %f10, %f8 , %f32, %f32     !# Rounds 11 and 12
des_round   %f6 , %f4 , %f32, %f32     !# Rounds 13 and 14
des_round   %f2 , %f0 , %f32, %f32     !# Rounds 15 and 16
des_iip     %f32,             %f32
```

It is noted that the FIPS 46-3 standard additionally defines the "triple DES" or 3DES cipher, which is implemented as three successive applications of the DES cipher on a data block (i.e., where the 64-bit encrypted result of one cipher application forms the 64-bit input to the next cipher application) using one, two, or three distinct 64-bit keys. Because the 3DES cipher is constructed through multiple applications of the DES cipher, the above-described DES instructions may also be employed to implement the 3DES cipher.

In some embodiments of DES engine 315, the various DES-specific instructions may each require multiple execution cycles to execute. Given that each DES_ROUND instruction depends on the result of the prior instruction, during processing of a single data block from a single thread, a new DES_ROUND instruction may not be able to be issued every cycle. However, in some such embodiments, DES engine 315 may be configured to support pipelined execution, such that multiple threads or multiple different data blocks may be concurrently executing within DES engine 315, which may increase the overall utilization of DES engine 315. For example, several different threads may concurrently share DES engine 315, where a new DES_ROUND instruction from a different thread may be issued as often as every execution cycle.

Figure 5A:
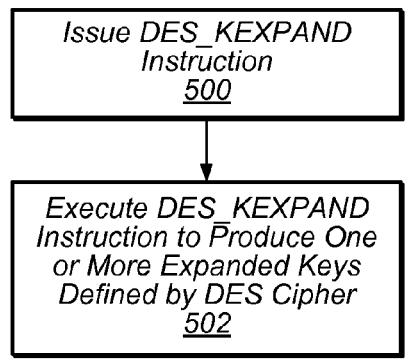
FIG. 5A is a flow diagram describing the operation of one embodiment of a processor configured to provide instruction-level support for DES key expansion.

FIG. 5A indicates one embodiment of a method of operation of a processor configured to provide instruction-level support for DES key expansion. Operation begins in block 500 where a DES_KEXPAND instruction, defined within the processor's ISA, is issued to a cryptographic unit for execution. For example, a programmer may specify the DES_KEXPAND instruction within an executable thread of code such that the instruction is fetched by instruction fetch unit 200 of processor 10, and ultimately issued by issue unit 230 to FGU 255 for execution.

In response to receiving the issued DES_KEXPAND instruction, the cryptographic unit executes the DES_KEXPAND instruction to produce one or more of the expanded keys defined by the DES cipher (block 502). For example, DES engine 315 within FGU 255 may be configured to execute the DES_KEXPAND instruction as previously described, which may include performing different types of operations according to the mode of the DES_KEXPAND instruction as specified by the instruction operands. In various embodiments, executing the DES_KEXPAND instruction may include reading instruction operands from a register file, an operand bypass unit, or another operand source, as well as writing a result to working storage or to another destination.

As noted previously, in some embodiments, execution of the DES_KEXPAND instruction may produce a value that, upon application of the PC2 operation, yields one of the expanded keys defined by the DES cipher. That is, the actual result of executing the DES_KEXPAND instruction may be an intermediate value or precursor to the final expanded key. In such embodiments, application of the PC2 operation may be incorporated into execution of another instruction, such as the DES_ROUND instruction.

Figure 5B:
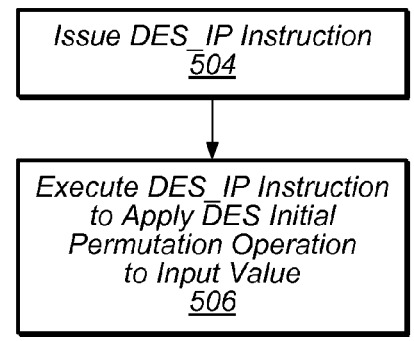
FIG. 5B is a flow diagram describing the operation of one embodiment of a processor configured to provide instruction-level support for the DES initial permutation operation.

FIG. 5B indicates one embodiment of a method of operation of a processor configured to provide instruction-level support for the DES Initial Permutation operation. Operation begins in block 504 where a DES_IP instruction, defined within the processor's ISA, is issued to a cryptographic unit for execution. For example, a programmer may specify the DES_IP instruction within an executable thread of code such that the instruction is fetched by instruction fetch unit 200 of processor 10, and ultimately issued by issue unit 230 to FGU 255 for execution.

In response to receiving the issued DES_IP instruction, the cryptographic unit executes the DES_IP instruction to apply the Initial Permutation operation to the specified input value (block 506). For example, DES engine 315 within FGU 255 may be configured to execute the DES_IP instruction as previously described. In various embodiments, executing the DES_IP instruction may include reading instruction operands from a register file, an operand bypass unit, or another operand source, as well as writing a result to working storage or to another destination.

Figure 5C:
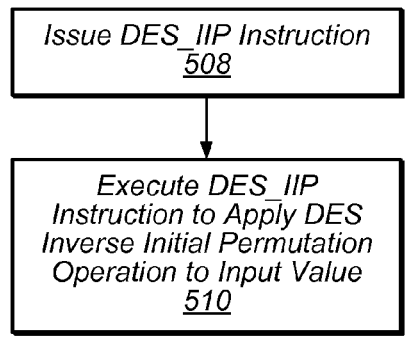
FIG. 5C is a flow diagram describing the operation of one embodiment of a processor configured to provide instruction-level support for the DES inverse initial permutation operation.

FIG. 5C indicates one embodiment of a method of operation of a processor configured to provide instruction-level support for the DES Inverse Initial Permutation operation. Operation begins in block 508 where a DES_IIP instruction, defined within the processor's ISA, is issued to a cryptographic unit for execution. For example, a programmer may specify the DES_IIP instruction within an executable thread of code such that the instruction is fetched by instruction fetch unit 200 of processor 10, and ultimately issued by issue unit 230 to FGU 255 for execution.

In response to receiving the issued DES_IIP instruction, the cryptographic unit executes the DES_IIP instruction to apply the Inverse Initial Permutation operation to the specified input value (block 510). For example, DES engine 315 within FGU 255 may be configured to execute the DES_IIP instruction as previously described. In various embodiments, executing the DES_IIP instruction may include reading instruction operands from a register file, an operand bypass unit, or another operand source, as well as writing a result to working storage or to another destination.

Figure 5D:
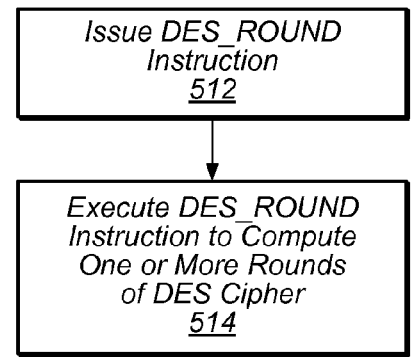
FIG. 5D is a flow diagram describing the operation of one embodiment of a processor configured to provide instruction-level support for DES encryption rounds.

FIG. 5D indicates one embodiment of a method of operation of a processor configured to provide instruction-level support for executing one or more rounds of the DES cipher. Operation begins in block 512 where a DES_ROUND instruction, defined within the processor's ISA, is issued to a cryptographic unit for execution. For example, a programmer may specify the DES_ROUND instruction within an executable thread of code such that the instruction is fetched by instruction fetch unit 200 of processor 10, and ultimately issued by issue unit 230 to FGU 255 for execution.

In response to receiving the issued DES_ROUND instruction, the cryptographic unit executes the DES_ROUND instruction to compute one or more rounds of the DES cipher (block 514). For example, DES engine 315 within FGU 255 may be configured to execute the DES_ROUND instruction as previously described. In various embodiments, executing the DES_ROUND instruction may include reading instruction operands from a register file, an operand bypass unit, or another operand source, as well as writing a result to working storage or to another destination.

Instruction Support for the Kasumi Cipher

As shown in FIG. 3, in one embodiment, SPU 300 may include Kasumi engine 320. In one embodiment, Kasumi engine 320 may be configured to execute instructions that implement various portions of a block cipher algorithm that is compliant with the Kasumi cipher standard, as defined by the $3^{rd}$ Generation Partnership Project (3GPP) Technical Specification TS 35.202 version 8.0.0 (also referred to herein as the "Kasumi cipher"). These instructions may be defined within the ISA implemented by processor 10, such that processor 10 may be configured to provide specific instruction-level support for the Kasumi cipher. As described in greater detail below, in such an implementation, a user of processor 10 may be able to specify a smaller number of instructions to implement the Kasumi cipher than would be required for an ISA that lacked Kasumi instruction-level support. In turn, this may result in more compact code and/or faster cipher execution.

In the following discussion, the general operation of the Kasumi cipher is first described. Examples of particular Kasumi instructions that Kasumi engine 320 may execute to implement the Kasumi cipher are then discussed, including code examples that implement such instructions.

Kasumi Key Expansion and Cipher

Generally speaking, the Kasumi cipher is a block cipher that provides for the encryption and decryption of a 64-bit block of input data under the control of a 128-bit input key to produce a 64-bit block of output data. During operation, the Kasumi cipher produces a key schedule of cipher keys from the 128-bit input key, and performs multiple cipher rounds on the input data block using the key schedule. Each cipher round performs a sequence of transformation operations described in greater detail below. In some embodiments, to perform decryption, the Kasumi cipher applies the same sequence of operations as for encryption, but using the keys of the key schedule in an inverse order relative to encryption.

The Kasumi cipher provides for a 128-bit input key K and 8 cipher rounds, where each round i uses a set of keys {KLi, KOi, KIi} that is derived for that round according to a key schedule. To generate the round keys from the input key K, the 128-bit key K is first subdivided into 8 16-bit subkeys denoted K1 . . . K8, where K1 and K8 correspond to the most and least significant 16 bits of K, respectively. A second set of subkeys denoted K1' . . . K8' is derived by respectively applying to subkeys K1 . . . K8 a corresponding one of the hexadecimal constants listed below, using an exclusive-OR (XOR) function.

C1 = 0x0123
C2 = 0x4567
C3 = 0x89AB
C4 = 0xCDEF
C5 = 0xFEDC
C6 = 0xBA98
C7 = 0x7654
C8 = 0x3210

Using these two sets of subkeys, the individual keys for each round are generated according to the following table, where the notation Kn<<<m denotes the logical left rotate function of subkey Kn by m bits:

|        | round |        |        |        |        |        |        |        |
|--------|-------|--------|--------|--------|--------|--------|--------|--------|
|        | 1     | 2      | 3      | 4      | 5      | 6      | 7      | 8      |
| KLi,1  | K1<<<1 | K2<<<1 | K3<<<1 | K4<<<1 | K5<<<1 | K6<<<1 | K7<<<1 | K8<<<1 |
| KLi,2  | K3'   | K4'    | K5'    | K6'    | K7'    | K8'    | K1'    | K2'    |
| KOi,1  | K2<<<5 | K3<<<5 | K4<<<5 | K5<<<5 | K6<<<5 | K7<<<5 | K8<<<5 | K1<<<5 |
| KOi,2  | K6<<<8 | K7<<<8 | K8<<<8 | K1<<<8 | K2<<<8 | K3<<<8 | K4<<<8 | K5<<<8 |
| KOi,3  | K7<<<13 | K8<<<13 | K1<<<13 | K2<<<13 | K3<<<13 | K4<<<13 | K5<<<13 | K6<<<13 |
| KIi,1  | K5'   | K6'    | K7'    | K8'    | K1'    | K2'    | K3'    | K4'    |
| KIi,2  | K4'   | K5'    | K6'    | K7'    | K8'    | K1'    | K2'    | K3'    |
| KIi,3  | K8'   | K1'    | K2'    | K3'    | K4'    | K5'    | K6'    | K7'    |

Each of subkeys KLi is a 32-bit value specified as a most significant 16-bit value KLi,1 and a least significant 16-bit value KLi,2. Each of subkeys KOi is a 48-bit value specified as a most significant 16-bit value KOi,1, a middle 16-bit value KOi,2, and a least significant 16-bit value KOi,3. Each of subkeys KIi is also a 48-bit value using nomenclature similar to that for subkeys KOi.

The Kasumi cipher proceeds by first dividing the input data block into two 32-bit sub-blocks denoted L0 (the most significant 32 bits) and R0 (the least significant 32 bits). The cipher then computes eight rounds I, where i proceeds from 1 to 8, and where each round outputs a pair {Li, Ri} as follows:

$$R(i) = L(i-1);$$
$$L(i) = R(i-1) \text{ XOR } f_i(L(i-1), RKi);$$

where XOR denotes the logical exclusive-OR function. The final cipher output is given as {L8, R8}.

The function $f_i(I, RKi)$ applies a round key RKi to a 32-bit input I to produce a 32-bit output O. The round key RKi may be further defined as the triplet of subkeys {KLi, KOi, KIi}. The behavior of function $f_i(\ )$ may be defined in terms of subfunctions in a round-dependent manner. For odd-numbered rounds 1, 3, 5, and 7, $f_j(\ )$ may be determined by first applying function FL( ) to input I, followed by applying function FO( ) to the result:

fi(I,RKi)=FO(FL(I, KLi), KOi, KIi)

For even-numbered rounds 2, 4, 6, and 8, the order of application of functions FL( ) and FO( ) is reversed:

fi(I,RKi)=FL(FO(I, KOi, KIi), KLi)

The FL( ) function takes a 32-bit subkey KLi, which is split into a most significant half KLi,1 and a least significant half KLi,2, as noted above. The FL( ) function also takes a 32-bit data input that is split into a most significant half L and a least significant half R. The FL( ) function produces a 32-bit output {L', R'} as follows:

$$R' = R \text{ XOR } ((L \text{ AND } KLi,1) <<< 1)$$
$$L' = L \text{ XOR } ((R' \text{ OR } KLi,2) <<< 1)$$

where XOR, AND, and OR denote corresponding Boolean operators.

The FO( ) function takes two 48-bit subkeys KOi and KIi, each split into three 16-bit portions KOi,1, KOi,2, KOi,3 and KIi,1, KIi,2, KIi,3, as noted above. The FO( ) function also takes a 32-bit data input that is split into a most significant half L0 and a least significant half R0. For an integer j ranging from 1 to 3, the FO( ) function computes the following:

$$R(j) = FI((L(j-1) \text{ XOR } KOi,j), KIi,j) \text{ XOR } R(j-1)$$
$$L(j) = R(j-1)$$

The FO( ) function ultimately returns a 32-bit output {L3, R3}.

As seen above, the FO( ) function is expressed in terms of another function FI( ). The FI( ) function operates on a 16-bit data input that is split into a 9-bit most significant portion L0 and a 7-bit least significant portion R0. The FI( ) function also takes a 16-bit subkey KIi,j, which is split into a 9-bit most significant portion KIi,j,1 and a 7-bit least significant portion KIi,j,2. The FI( ) function makes use of two substitution functions, S9 and S7, which respectively map a 9-bit input to a 9-bit output and a 7-bit input to a 7-bit output according to the following mappings, expressed as Boolean functions. In the following, "nk" denotes bit k of a nine-bit input value, and "sk" denotes bit k of a seven-bit input value. The symbol "^" denotes the logical XOR operator, and where two bit values appear adjacent to one another (e.g., n0n2), a logical AND operator is implied between the two values.

S9[8:0]
s9[0]= n0n2 ^ n3 ^ n2n5 ^ n5n6 ^ n0n7 ^ n1n7 ^ n2n7 ^ n4n8 ^ n5n8 ^ n7n8 ^ 1;
s9[1]= n1 ^ n0n1 ^ n2n3 ^ n0n4 ^ n1n4 ^ n0n5 ^ n3n5 ^ n6 ^ n1n7 ^ n2n7 ^ n5n8 ^ 1;
s9[2]= n1 ^ n0n3 ^ n3n4 ^ n0n5 ^ n2n6 ^ n3n6 ^ n5n6 ^ n4n7 ^ n5n7 ^ n6n7 ^ n8 ^ n0n8 ^ 1;
s9[3]= n0 ^ n1n2 ^ n0n3 ^ n2n4 ^ n5 ^ n0n6 ^ n1n6 ^ n4n7 ^ n0n8 ^ n1n8 ^ n7n8;
s9[4]= n0n1 ^ n1n3 ^ n4 ^ n0n5 ^ n3n6 ^ n0n7 ^ n6n7 ^ n1n8 ^ n2n8 ^ n3n8;
s9[5]= n2 ^ n1n4 ^ n4n5 ^ n0n6 ^ n1n6 ^ n3n7 ^ n4n7 ^ n6n7 ^ n5n8 ^ n6n8 ^ n7n8 ^ 1;
s9[6]= n0 ^ n2n3 ^ n1n5 ^ n2n5 ^ n4n5 ^ n3n6 ^ n4n6 ^ n5n6 ^ n7 ^ n1n8 ^ n3n8 ^ n5n8 ^ n7n8;
s9[7]= n0n1 ^ n0n2 ^ n1n2 ^ n3 ^ n0n3 ^ n2n3 ^ n4n5 ^ n2n6 ^ n3n6 ^ n2n7 ^ n5n7 ^ n8 ^ 1;
s9[8]= n0n1 ^ n2 ^ n1n2 ^ n3n4 ^ n1n5 ^ n2n5 ^ n1n6 ^ n4n6 ^ n7 ^ n2n8 ^ n3n8;
S7[6:0]

-continued

```
s7[0]= s1s3 ^ s4 ^ s0s1s4 ^ s5 ^ s2s5 ^ s3s4s5 ^ s6 ^ s0s6 ^ s1s6 ^ s3s6 ^
      s2s4s6 ^ s1s5s6 ^ s4s5s6;
s7[1]= s0s1 ^ s0s4 ^ s2s4 ^ s5 ^ s1s2s5 ^ s0s3s5 ^ s6 ^ s0s2s6 ^ s3s6 ^ s4s5s6 ^
      1;
s7[2]= s0 ^ s0s3 ^ s2s3 ^ s1s2s4 ^ s0s3s4 ^ s1s5 ^ s0s2s5 ^ s0s6 ^ s0s1s6 ^ s2s6 ^
      s4s6 ^ 1;
s7[3]= s1 ^ s0s1s2 ^ s1s4 ^ s3s4 ^ s0s5 ^ s0s1s5 ^ s2s3s5 ^ s1s4s5 ^ s2s6 ^
      s1s3s6;
s7[4]= s0s2 ^ s3 ^ s1s3 ^ s1s4 ^ s0s1s4 ^ s2s3s4 ^ s0s5 ^ s1s3s5 ^ s0s4s5 ^ s1s6 ^
      s3s6 ^ s0s3s6 ^ s5s6 ^ 1;
s7[5]= s2 ^ s0s2 ^ s0s3 ^ s1s2s3 ^ s0s2s4 ^ s0s5 ^ s2s5 ^ s4s5 ^ s1s6 ^
      s1s2s6 ^ s0s3s6 ^ s3s4s6 ^ s2s5s6 ^ 1;
s7[6]= s1s2 ^ s0s1s3 ^ s0s4 ^ s1s5 ^ s3s5 ^ s6 ^ s0s1s6 ^ s2s3s6 ^ s1s4s6 ^
      s0s5s6;
```

Using these definitions, the FI( ) function may be expressed as the following sequence of operations. Here, the notation ZE(X) denotes the conversion of a 7-bit value X to a 9-bit value by adding two zero bits to the most significant end of X (i.e., zero-extending X), and the notation TR( ) denotes the conversion of a 9-bit value Y to a 7-bit value by truncating the two most significant bits of Y.

| | |
|---|---|
| L1 = R0 | R1 = S9[L0] XOR ZE(R0) |
| L2 = R1 XOR KIi,j,2 | R2 = S7[L1] XOR TR(R1) XOR KIi,j,1 |
| L3 = R2 | R3 = S9[L2] XOR ZE(R2) |
| L4 = S7[L3] XOR TR(R3) | R4 = R3 |

Once these operations are complete, the FI( ) function returns the 16-bit result {L4, R4}.

To summarize, the Kasumi cipher employs a set of keys {KLi, KOi, Kli} generated for each of 8 rounds from a 128-bit input key. During each round, the cipher applies the functions FL( ) and FO( ), where FO( ) is further defined in terms of a function FI( ). During odd rounds, the general order of operations is to compute FL( ), followed by FO( ), followed by an XOR of the result with data from a prior round. During even rounds, the general order of operations is compute FO( ), followed by FL( ), followed by an XOR of the result with data from a prior round. For each application of FO( ), there are three sequences of an XOR operation, an FI( ) operation, and an XOR operation.

Kasumi Engine Instruction Support

In some embodiments, the Kasumi key expansion and cipher functionality described above may be implemented by standard arithmetic and logical instructions that may be provided by a processor's ISA. For example, the various functions FL( ), FO( ), and/or FI( ) may be implemented through successive applications of appropriate Boolean and shift instructions. Similarly, the substitution functions S9 and S7 may be implemented as a sequence of conditional compare instructions, or as a lookup table in memory accessed via load instructions.

However, implementing the Kasumi cipher using general-purpose ISA instructions may require numerous instructions as well as a substantial number of cycles to execute those instructions, diminishing cipher performance. By contrast, in one embodiment, Kasumi engine 320 may be configured to provide support for certain ISA instructions that are particular to the Kasumi cipher, such that execution of individual ones of the Kasumi-specific instructions results in Kasumi engine 320 performing entire corresponding portions of the Kasumi cipher. Thus, for at least some embodiments of Kasumi engine 320, executing the individual Kasumi-specific instructions to implement the Kasumi cipher may accomplish more of the work of the Kasumi cipher per instruction than in the case of using general-purpose ISA instructions configured to perform the Kasumi cipher.

Figure 6:
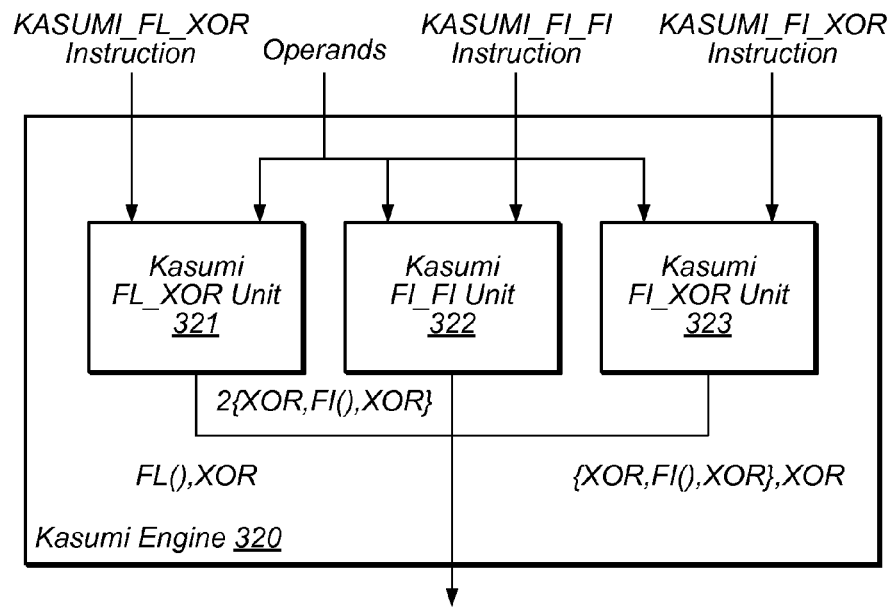
FIG. 6 is a block diagram illustrating one embodiment of a cryptographic engine configured to execute instructions to implement the Kasumi block cipher algorithm.

One such embodiment of Kasumi engine 320 is illustrated in FIG. 6, where Kasumi engine 320 is shown to include Kasumi FL_XOR unit 321, Kasumi FI_FI unit 322, and Kasumi FI_XOR unit 323. In various embodiments, the outputs of these units may be combined to form the output of Kasumi engine 320, for example through the use of muxes (not shown). It is noted that this partitioning of Kasumi cipher functionality within Kasumi engine 320 is merely one example chosen to facilitate exposition. Other configurations of Kasumi engine 320 are possible and contemplated in which logic may be differently partitioned to implement support for Kasumi-specific instructions, including instructions that differ from those described below.

As noted above, in one embodiment, the general sequence of operations of the Kasumi cipher may be represented FL( ), FO( ), XOR in the case of odd rounds, and FO( ), FL( ), XOR in the case of even rounds. Additionally, FO( ) may be represented as three repetitions of the sequence XOR, FI( ), XOR. Thus, for even rounds, the general sequence of operations of the overall cipher may be represented as FL( ), 3 {XOR, FI( ), XOR}, XOR, while for odd rounds, the sequence may be represented as 3 {XOR, FI( ), XOR}, FL( ), XOR. It is noted that for odd rounds, the FL( ) operation is followed by a final XOR operation, while for even rounds, it is the last XOR, FI( ), XOR sequence that is followed by a final XOR operation.

In one embodiment, Kasumi FL_XOR unit 321 may be configured to execute a Kasumi FL( )-operation instruction defined within the ISA of processor 10 and denoted with the instruction mnemonic KASUMI_FL_XOR (though any suitable mnemonic may be employed). In various embodiments, Kasumi FL_XOR unit 321 may directly decode the KASUMI_FL_XOR instruction from opcode bits sent from upstream pipeline stages, or may receive an already-decoded or partially-decoded signal indicative of the occurrence of a KASUMIL_FL_XOR instruction.

To execute the KASUMIL_FL_XOR instruction, in one embodiment, Kasumi FL_XOR unit 321 may be configured to receive a 32-bit data input operand as well as a 32-bit subkey operand corresponding to subkey KLi. Kasumi FL_XOR unit 321 may further include logic that is configured to implement the FL( ) operation on the data input and subkey. For example, Kasumi FL_XOR unit 321 may include appropriate combinatorial logic configured to implement the Boolean and shift operations (or their logical equivalents) specified for the FL( ) operation.

In one embodiment, to execute the KASUMIL_FL_XOR instruction, Kasumi FL_XOR unit 321 may further be configured to receive a third data input operand and to combine this third operand with the result of the FL( ) operation using an XOR operation. As noted above, for odd rounds of the cipher, the FL( ) operation result is XORed with data from an earlier round to form a portion of the result for the current round. Thus, to implement an odd round of the Kasumi cipher, the KASUMIL_FL_XOR instruction may be issued for execution with the prior round data specified as the third operand.

By contrast, to implement an even round of the Kasumi cipher where the FL( ) operation is not followed by a discrete XOR operation, the KASUMIL_FL_XOR instruction may be issued for execution with a zeroed-out third operand. Because the result of XORing any value with zero is the original value, this may essentially nullify the effect of the XOR when the KASUMIL_FL_XOR instruction is issued during even cipher rounds.

In the embodiment of FIG. 6, Kasumi engine 320 provides support for several different versions of Kasumi-specific FI( )-operation instructions defined within the ISA of processor 10. Kasumi FI_FI unit 322 and Kasumi FI_XOR unit 323 may be configured to execute KASUMI_FI_FI and KASUMI_FI_XOR instructions (or any other suitable mnemonic), respectively. As noted above with respect to Kasumi FL_XOR unit 321, these units may directly decode these instructions from opcode bits sent from upstream pipeline stages, or may receive an already-decoded or partially-decoded signal indicative of the occurrence of a particular instruction.

In one embodiment, to execute the KASUMIL_FI_FI instruction, Kasumi FI_FI unit 322 may be configured to implement the first two of the three sequences of XOR, FI( ), XOR operations specified by the Kasumi cipher. In this embodiment, Kasumi FI_FI unit 322 may be configured to receive a 32-bit data input operand as well as the subkeys KOi,1, KOi,2 and KIi,1, KIi,2. In various embodiments, the four 16-bit subkeys may be concatenated together as a single 64-bit operand or supplied to Kasumi FI_FI unit 322 as two distinct 32-bit operands. Kasumi FI_FI unit 322 may further include logic that is configured to implement the two sequences of XOR, FI( ), XOR operations on the data input and subkeys. For example, Kasumi FI_FI unit 322 may include appropriate combinatorial logic configured to implement the various XOR operations as well as the S9 and S7 substitution functions specified for the FI( ) operation.

In one embodiment, to execute the KASUMIL_FI_XOR instruction, Kasumi FI_XOR unit 323 may be configured to implement the final one of the three sequences of XOR, FI( ), XOR operations specified by the Kasumi cipher. In this embodiment, Kasumi FI_XOR unit 323 may be configured to receive a 32-bit data input operand as well as the subkeys KOi,3 and KIi,3. Kasumi FI_XOR unit 323 may further include logic that is configured to implement the final sequence of XOR, FI( ), XOR operations on the data input and subkeys. For example, Kasumi FI_XOR unit 323 may include appropriate combinatorial logic configured to implement the various XOR operations as well as the S9 and S7 substitution functions specified for the FI( ) operation. In some embodiments, Kasumi FI_XOR unit 323 and Kasumi FI_FI unit 322 may share some or all of their logic.

As noted above, for even cipher rounds, the final sequence of XOR, FI( ), XOR operations is followed by an XOR operation to combine the result with data from an earlier round to form a portion of the result for the current round. Correspondingly, to execute the KASUMIL_FI_XOR instruction, one embodiment of Kasumi FI_XOR unit 323 may further be configured to receive a third data input operand and to combine this third operand with the result of the final sequence of XOR, FI( ), XOR operations using an XOR operation. Thus, to implement an even round of the Kasumi cipher, the KASUMIL_FI_XOR instruction may be issued for execution with the prior round data specified as the third operand.

By contrast, to implement an odd round of the Kasumi cipher where the final sequence of XOR, FI( ), XOR operations is not followed by a discrete XOR operation, the KASUMIL_FI_XOR instruction may be issued for execution with a zeroed-out third operand. As noted above with respect to the KASUMIL_FL_XOR instruction, this may essentially nullify the effect of the XOR when the KASUMIL_FI_XOR instruction is issued during odd cipher rounds.

It is noted that the above discussion represents merely one possible definition of Kasumi-specific instructions and a corresponding configuration of Kasumi engine 320. Other embodiments representing different instruction definitions and underlying execution hardware are possible and contemplated. For example, while the KASUMIL_FL_XOR and KASUMIL_FI_XOR instructions explicitly provide for an XOR operation following the FL( ) or XOR, FI( ), XOR operations, in alternative embodiments, Kasumi engine 320 may be configured to implement certain operations alone or in combination with different operations. For example, in response to a KASUMI_FL or similar instruction, one embodiment of Kasumi engine 320 might be configured only to perform the FL( ) operation, leaving a subsequent XOR operation—if one is needed—to be implemented as part of another Kasumi-specific instruction or by a general purpose XOR instruction selected from the ISA of processor 10. Generically, instructions that implement at least one instance of the Kasumi FL( ) operation may be referred to as Kasumi FL( )-operation instructions, regardless of whatever other operations such instructions might perform. Similarly, instructions that implement at least one instance of the Kasumi FI( ) operation may be referred to as Kasumi FI( )-operation instructions, regardless of whatever other operations such instructions might perform.

Similarly, in response to a KASUMIL_FI or similar instruction, one embodiment of Kasumi engine 320 might be configured only to perform the FI( ) function alone, leaving the remaining XOR operations to be implemented by other instructions. Alternatively, instead of mapping the three sequences of XOR, FI( ), XOR operations onto two instructions as described above, one embodiment of Kasumi engine 320 might be configured to perform all three of these sequences in response to receiving a single KASUMIL_FI or similar instruction.

One example of SPARC assembly language code that reflects usage of the KASUMIL_FL_XOR, KASUMIL_FI_FI, and KASUMIL_FI_XOR instructions discussed above is as follows:

```
!#    @ vt_cleartext :    {32'h00000000,text[63:32]}
!#                        {32'h00000000,text[31:0] }
!# Expanded keys in F0 thru F46
setx              vt_cleartext, %g1, %l4
```

-continued

```
ldd         [%l4 + 0x000], %f52    !# LEFT
ldd         [%l4 + 0x008], %f54    !# RIGHT
fzero       %f56                   !# ZEROs
run_cipher:
kasumi_fl_xor   %f52, %f0 , %f56, %f58    !# Round 1   LEFT=f52; RIGHT=f54
kasumi_fi_fi    %f58, %f2 ,       %f58
kasumi_fi_xor   %f58, %f4 , %f54, %f54
kasumi_fi_fi    %f54, %f6 ,       %f58    !# Round 2   LEFT=f54; RIGHT=f52
kasumi_fi_xor   %f58, %f8 , %f56, %f58
kasumi_fl_xor   %f58, %f10, %f52, %f52
kasumi_fl_xor   %f52, %f12, %f56, %f58    !# Round 3   LEFT=f52; RIGHT=f54
kasumi_fi_fi    %f58, %f14,       %f58
kasumi_fi_xor   %f58, %f16, %f54, %f54
kasumi_fi_fi    %f54, %f18,       %f58    !# Round 4   LEFT=f54; RIGHT=f52
kasumi_fi_xor   %f58, %f20, %f56, %f58
kasumi_fl_xor   %f58, %f22, %f52, %f52
kasumi_fl_xor   %f52, %f24, %f56, %f58    !# Round 5   LEFT=f52; RIGHT=f54
kasumi_fi_fi    %f58, %f26,       %f58
kasumi_fi_xor   %f58, %f28, %f54, %f54
kasumi_fi_fi    %f54, %f30,       %f58    !# Round 6   LEFT=f54; RIGHT=f52
kasumi_fi_xor   %f58, %f32, %f56, %f58
kasumi_fl_xor   %f58, %f34, %f52, %f52
kasumi_fl_xor   %f52, %f36, %f56, %f58    !# Round 7   LEFT=f52; RIGHT=f54
kasumi_fi_fi    %f58, %f38,       %f58
kasumi_fi_xor   %f58, %f40, %f54, %f54
kasumi_fi_fi    %f54, %f42,       %f58    !# Round 8   LEFT=f54; RIGHT=f52
kasumi_fi_xor   %f58, %f44, %f56, %f58
kasumi_fl_xor   %f58, %f46, %f52, %f52
```

In this example, it is assumed that the Kasumi key schedule has already been generated and stored within 64-bit floating-point registers % f0 through % f46 (e.g., by a separately-executed set of instructions). The first group of instructions loads the left and right 32 bits of the 64-bit input block into registers % f52 and % f54, respectively, and initializes register % f56 to zero.

In the illustrated example, each of the eight rounds of the Kasumi cipher is implemented by one group of three instructions, where the group varies according to whether the round is odd or even. During the first round, Kasumi FL_XOR unit 321 may be configured to execute the KASUMIL_FL_XOR instruction, with the left half of the data input (in register % f52) specified as the first operand and the relevant first-round keys (in register % f0) specified as the second operand. Because the XOR function of the KASUMIL_FL_XOR instruction is not relevant during odd rounds, the third operand is set to zero (via register % f56). The output of the KASUMIL_FL_XOR instruction is temporarily stored in register % f58. Kasumi FI_FI unit 322, via execution of the KASUMIL_FI_FI instruction, may receive this result as its first operand, as well as the relevant first-round keys (in register % f2) specified as the second operand, and may store the result of the first two XOR, FI( ), XOR sequences in register % f58. Finally, Kasumi FI_XOR unit 323, via execution of the KASUMIL_FI_XOR instruction, may receive the result of the KASUMIL_FI_FI instruction via register % f58 as its first operand, as well as the relevant first-round keys (in register % f4) specified as the second operand. Additionally, the initial right-half data is provided (via register % f54) as the third operand, to be XORed with the result of the final XOR, FI( ), XOR sequence to produce the final result of the first round, which is stored in register % f54.

The second round proceeds in a similar fashion, though with the instructions executed in a different order to reflect the order of operations that applies to even rounds. It can be seen from the code that in this instance, the KASUMI_FI_XOR instruction is not the final instruction of the round, and thus its third operand is set to zero (via register % f56). Consistent with the Kasumi cipher, the left and right halves of the working data block are swapped after each round. Because these halves are stored in different registers in the illustrated example, the swap may be effected by simply exchanging which register is referenced. After the final round executes, the encrypted block is stored within registers % f52 and % f54. As noted above, decryption may be performed by executing the Kasumi cipher with a reversed key order relative to encryption.

It is noted that this code represents merely one example of how the KASUMIL_FL_XOR, KASUMIL_FI_FI, and KASUMI_FI_XOR instructions may be employed, and that numerous other applications using other variants of these instructions are possible and contemplated. For example, in other embodiments, these instructions may be implemented to use the integer register file instead of the floating-point register file. Further, these instructions may be implemented in any suitable ISA.

In some embodiments of Kasumi engine 320, the various Kasumi-specific instructions may each require multiple execution cycles to execute. Given that each instruction depends on the result of the prior instruction, during processing of a single data block from a single thread, a new Kasumi instruction may not be able to be issued every cycle. However, in some such embodiments, Kasumi engine 320 may be configured to support pipelined execution, such that multiple threads or multiple different data blocks may be concurrently executing within Kasumi engine 320, which may increase the overall utilization of Kasumi engine 320. For example, several different threads may concurrently share Kasumi engine 320, where a new KASUMIL_FL_XOR, KASUMIL_FI_FI, or KASUMI_FI_XOR instruction from a different thread may be issued as often as every execution cycle.

Figure 7A:
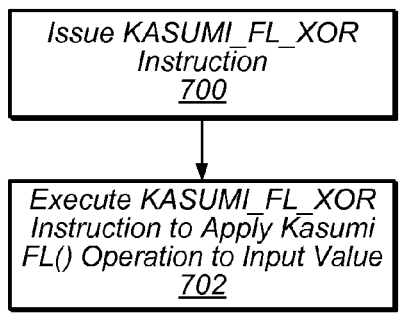
FIG. 7A is a flow diagram describing the operation of one embodiment of a processor configured to provide instruction-level support for the Kasumi FL( ) operation.

FIG. 7A indicates one embodiment of a method of operation of a processor configured to provide instruction-level support for the Kasumi FL( ) operation. Operation begins in block 700 where a KASUMIL_FL_XOR instruction, defined within the processor's ISA, is issued to a cryptographic unit for execution. For example, a programmer may specify the KASUMIL_FL_XOR instruction within an executable thread of code such that the instruction is fetched by instruction fetch unit 200 of processor 10, and ultimately issued by issue unit 230 to FGU 255 for execution.

In response to receiving the issued KASUMIL_FL_XOR instruction, the cryptographic unit executes the KASUMIL_FL_XOR instruction to apply the Kasumi FL( ) operation to the specified input value using specified keys (block 702). For example, Kasumi engine 320 within FGU 255 may be configured to execute the KASUMIL_FL_XOR instruction as previously described, which may include performing an additional XOR operation on the result of the FL( ) operation using a third specified operand. In various embodiments, executing the KASUMIL_FL_XOR instruction may include reading instruction operands from a register file, an operand bypass unit, or another operand source, as well as writing a result to working storage or to another destination.

Figure 7B:
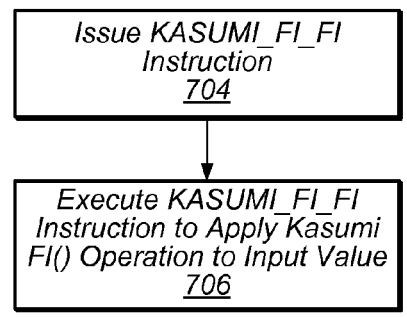
FIG. 7B is a flow diagram describing the operation of one embodiment of a processor configured to provide instruction-level support for one implementation of the Kasumi FI( ) operation.

FIG. 7B indicates one embodiment of a method of operation of a processor configured to provide instruction-level support for the Kasumi FI( ) operation. Operation begins in block 704 where a KASUMIL_FI_FI instruction, defined within the processor's ISA, is issued to a cryptographic unit for execution. For example, a programmer may specify the KASUMIL_FI_FI instruction within an executable thread of code such that the instruction is fetched by instruction fetch unit 200 of processor 10, and ultimately issued by issue unit 230 to FGU 255 for execution.

In response to receiving the issued KASUMIL_FI_FI instruction, the cryptographic unit executes the KASUMIL_FI_FI instruction to apply the Kasumi FI( ) operation to the specified input value (block 706). For example, Kasumi engine 320 within FGU 255 may be configured to execute the KASUMIL_FI_FI instruction as previously described, by performing the initial two applications of the XOR, FI( ), XOR sequence specified by the Kasumi cipher. In various embodiments, executing the KASUMIL_FI_FI instruction may include reading instruction operands from a register file, an operand bypass unit, or another operand source, as well as writing a result to working storage or to another destination.

Figure 7C:
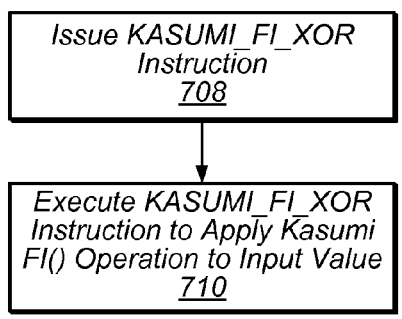
FIG. 7C is a flow diagram describing the operation of one embodiment of a processor configured to provide instruction-level support for another implementation of the Kasumi FI( ) operation.

FIG. 7C indicates another embodiment of a method of operation of a processor configured to provide instruction-level support for the Kasumi FI( ) operation. Operation begins in block 708 where a KASUMIL_FI_XOR instruction, defined within the processor's ISA, is issued to a cryptographic unit for execution. For example, a programmer may specify the KASUMIL_FI_XOR instruction within an executable thread of code such that the instruction is fetched by instruction fetch unit 200 of processor 10, and ultimately issued by issue unit 230 to FGU 255 for execution.

In response to receiving the issued KASUMIL_FI_XOR instruction, the cryptographic unit executes the KASUMIL_FI_XOR instruction to apply the Kasumi FI( ) operation to the specified input value (block 710). For example, Kasumi engine 320 within FGU 255 may be configured to execute the KASUMIL_FI_XOR instruction as previously described, which may include performing the third sequence of XOR, FI( ), XOR operations specified by the Kasumi cipher, as well as an additional XOR operation on the result of this third sequence using a third specified operand. In various embodiments, executing the KASUMIL_FI_XOR instruction may include reading instruction operands from a register file, an operand bypass unit, or another operand source, as well as writing a result to working storage or to another destination.

Instruction Support for the Camellia Cipher

As shown in FIG. 3, in one embodiment, SPU 300 may include Camellia engine 325. In one embodiment, Camellia engine 325 may be configured to execute instructions that implement various portions of a block cipher algorithm that is compliant with the Camellia cipher standard, as defined by the Internet Engineering Task Force (IETF) Request For Comments (RFC) 3713, entitled "A description of the Camellia encryption algorithm," and also referred to as "RFC 3713" or the "Camellia cipher." These instructions may be defined within the ISA implemented by processor 10, such that processor 10 may be configured to provide specific instruction-level support for the Camellia cipher. As described in greater detail below, in such an implementation, a user of processor 10 may be able to specify a smaller number of instructions to implement the Camellia cipher than would be required for an ISA that lacked Camellia instruction-level support. In turn, this may result in more compact code and/or faster cipher execution.

In the following discussion, the general operation of the Camellia cipher is first described. Examples of particular Camellia instructions that Camellia engine 325 may execute to implement the Camellia cipher are then discussed, including code examples that implement such instructions.

Camellia Key Expansion and Cipher

Generally speaking, the Camellia cipher is a block cipher that provides for the encryption and decryption of a 128-bit block of input data under the control of an input key that may be 128, 192, or 256 bits. During operation, the Camellia cipher produces a key schedule of cipher keys from the input key, and performs multiple cipher rounds on the input data block using the key schedule. Each cipher round performs a sequence of transformation operations described in greater detail below. In some embodiments, to perform decryption, the Camellia cipher applies same sequence of operations as for encryption, but using the keys of the key schedule in an inverse order relative to encryption.

Key schedule generation for the Camellia begins with generating two 128-bit values KL and KR from the input key K according to one of the following groups of operations, depending on whether K is 128, 192, or 256 bits wide. In contrast to the discussion of the DES cipher above, in the following discussion, the least significant bit of a multi-bit value is denoted bit 0. Also, in the following discussion, "<<n" denotes a logical left shift by n bits, ">>n" denotes a logical right shift by n bits, and "~" denotes the bitwise complement operator.

```
128-bit key K[127:0]:
    KL = K[127:0];
    KR = 0;
192-bit key K[191:0]:
    KL = K[191:64];
    KR = (K[63:0] << 64) OR ~(K[63:0]);
256-bit key K[255:0]:
    KL = K[255:128];
    KR = K[127:0];
```

Two additional 128-bit quantities, KA and KB, are generated from KL and KR as follows.

```
tmp1 = (KL XOR KR) >> 64;
tmp2 = (KL XOR KR) AND MASK64;
tmp2 = tmp2 XOR F(tmp1, Sigma1);
tmp1 = tmp1 XOR F(tmp2, Sigma2);
tmp1 = tmp1 XOR (KL >> 64);
tmp2 = tmp2 XOR (KL AND MASK64);
tmp2 = tmp2 XOR F(tmp1, Sigma3);
tmp1 = tmp1 XOR F(tmp2, Sigma4);
KA   = (tmp1 << 64) OR D2;
tmp1 = (KA XOR KR) >> 64;
tmp2 = (KA XOR KR) AND MASK64;
```

-continued

```
tmp2 = tmp2 XOR F(tmp1, Sigma5);
tmp1 = tmp1 XOR F(tmp2, Sigma6);
KB   = (tmp1 << 64) OR tmp2;
```

Here, tmp1 and tmp2 denote temporary variables. MASK64 denotes a 64-bit quantity consisting of all 1s. The F( ) operation is described in greater detail below. Sigma1 through Sigma6 denote 64-bit constants having the following values:

```
Sigma1 = 0xA09E667F3BCC908B;
Sigma2 = 0xB67AE8584CAA73B2;
Sigma3 = 0xC6EF372FE94F82BE;
Sigma4 = 0x54FF53A5F1D36F1C;
Sigma5 = 0x10E527FADE682D1D;
Sigma6 = 0xB05688C2B3E6C1FD;
```

A set of 64-bit subkeys may then be generated as a function of the 128-bit values KL, KR, KA, and KB. For 128-bit keys, there are 26 subkeys denoted kw1 . . . kw4, k1 . . . k18, and ke1 . . . ke4 and generated as follows. As before, "<<<n" denotes a logical left rotate by n bits.

```
kw1  = (KL <<<   0) >> 64;
kw2  = (KL <<<   0) AND MASK64;
k1   = (KA <<<   0) >> 64;
k2   = (KA <<<   0) AND MASK64;
k3   = (KL <<<  15) >> 64;
k4   = (KL <<<  15) AND MASK64;
k5   = (KA <<<  15) >> 64;
k6   = (KA <<<  15) AND MASK64;
ke1  = (KA <<<  30) >> 64;
ke2  = (KA <<<  30) AND MASK64;
k7   = (KL <<<  45) >> 64;
k8   = (KL <<<  45) AND MASK64;
k9   = (KA <<<  45) >> 64;
k10  = (KL <<<  60) AND MASK64;
k11  = (KA <<<  60) >> 64;
k12  = (KA <<<  60) AND MASK64;
ke3  = (KL <<<  77) >> 64;
ke4  = (KL <<<  77) AND MASK64;
k13  = (KL <<<  94) >> 64;
k14  = (KL <<<  94) AND MASK64;
k15  = (KA <<<  94) >> 64;
k16  = (KA <<<  94) AND MASK64;
k17  = (KL <<< 111) >> 64;
k18  = (KL <<< 111) AND MASK64;
kw3  = (KA <<< 111) >> 64;
kw4  = (KA <<< 111) AND MASK64;
```

For 192- and 256-bit keys, there are 34 subkeys denoted kw1 . . . kw4, k1 . . . k24, and ke1 . . . ke6 and generated as follows:

```
kw1  = (KL <<<   0) >> 64;
kw2  = (KL <<<   0) AND MASK64;
k1   = (KB <<<   0) >> 64;
k2   = (KB <<<   0) AND MASK64;
k3   = (KR <<<  15) >> 64;
k4   = (KR <<<  15) AND MASK64;
k5   = (KA <<<  15) >> 64;
k6   = (KA <<<  15) AND MASK64;
ke1  = (KR <<<  30) >> 64;
ke2  = (KR <<<  30) AND MASK64;
k7   = (KB <<<  30) >> 64;
k8   = (KB <<<  30) AND MASK64;
k9   = (KL <<<  45) >> 64;
k10  = (KL <<<  45) AND MASK64;
k11  = (KA <<<  45) >> 64;
k12  = (KA <<<  45) AND MASK64;
ke3  = (KL <<<  60) >> 64;
ke4  = (KL <<<  60) AND MASK64;
k13  = (KR <<<  60) >> 64;
k14  = (KR <<<  60) AND MASK64;
k15  = (KB <<<  60) >> 64;
k16  = (KB <<<  60) AND MASK64;
k17  = (KL <<<  77) >> 64;
k18  = (KL <<<  77) AND MASK64;
ke5  = (KA <<<  77) >> 64;
ke6  = (KA <<<  77) AND MASK64;
k19  = (KR <<<  94) >> 64;
k20  = (KR <<<  94) AND MASK64;
k21  = (KA <<<  94) >> 64;
k22  = (KA <<<  94) AND MASK64;
k23  = (KL <<< 111) >> 64;
k24  = (KL <<< 111) AND MASK64;
kw3  = (KB <<< 111) >> 64;
kw4  = (KB <<< 111) AND MASK64;
```

In the case of a 128-bit input key, the Camellia cipher may be represented by the following pseudocode, where M[127:0] denotes the input message and C[127:0] denotes the output ciphertext (i.e., the encrypted message):

```
L0 = M[127:64] xor kw1;        // Left half
R0 = M[63:0]   xor kw2;        // Right half
For i = 1 to 18
    begin
        L(i) = R(i−1) xor F( L(i−1), k(i));
        R(i) = L(i−1);
        If (r=6,12) then
            L(i) = FL( L(i), ke((2r/6)−1));
            R(i) = FLI( R(i), ke(2r/6));
    end
C[127:64] = R18 xor kw3;
C[63:0]   = L18 xor kw4;
```

Here, the input message is first combined with keys kw1 and kw2. Then, 18 rounds are performed using the 18 64-bit keys k1 . . . k18 from the key schedule. During the sixth and twelfth rounds, keys ke1 . . . ke4 are applied. Finally, the output ciphertext is derived by combining the result of the last round with keys kw3 and kw4. The F( ), FL( ) and FLI( ) operations will be described in greater detail below.

For 192-bit and 256-bit input keys, the Camellia cipher may be represented by the following pseudocode:

```
L0 = M[127:64] xor kw1;
R0 = M[63:0]   xor kw2;
For i = 1 to 24
    begin
        L(i) = R(i−1) xor F( L(i−1), k(i));
        R(i) = L(i−1);
        If (r=6,12,18) then
            L(i) = FL( L(i), ke((2r/6)−1));
            R(i) = FLI( R(i), ke(2r/6));
    end
C[127:64] = R24 xor kw3;
C[63:0]   = L24 xor kw4;
```

Operation is similar to the case involving 128-bit keys. Here, the input message is first combined with keys kw1 and kw2. Then, 24 rounds are performed using the 24 64-bit keys k1 . . . k24 from the key schedule. During the sixth, twelfth, and eighteenth rounds, keys ke1 . . . ke6 are applied. Finally, the output ciphertext is derived by combining the result of the last round with keys kw3 and kw4.

As noted previously, decryption may be performed using the same operations as encryption, but with an inverted key order. That is, where keys kw1 . . . kw4, k1 . . . k18/k24, and ke1 . . . ke4/ke6 are used for encryption in the above pseudocode, keys kw4 . . . kw1, k18/k24 . . . k1, ke4/ke6 . . . ke1 may be substituted to effect decryption.

As seen above, the Camellia F( ) operation is applied during each cipher round. It receives 64-bit input data F_IN as well as a 64-bit subkey KI, and produces a 64-bit result F_OUT according to the following pseudocode:

```
F(F_IN, KI)
begin
    x   =   F_IN xor KI;
    t1  =   x >> 56;
    t2  =   (x >> 48) and MASK8;
    t3  =   (x >> 40) and MASK8;
    t4  =   (x >> 32) and MASK8;
    t5  =   (x >> 24) and MASK8;
    t6  =   (x >> 16) and MASK8;
    t7  =   (x >>  8) and MASK8;
    t8  =   x         and MASK8;
    t1  =   SBOX1[t1];
    t2  =   SBOX2[t2];
    t3  =   SBOX3[t3];
    t4  =   SBOX4[t4];
    t5  =   SBOX2[t5];
    t6  =   SBOX3[t6];
    t7  =   SBOX4[t7];
    t8  =   SBOX1[t8];
    y1  =   t1 xor t3 xor t4 xor t6 xor t7 xor t8;
    y2  =   t1 xor t2 xor t4 xor t5 xor t7 xor t8;
    y3  =   t1 xor t2 xor t3 xor t5 xor t6 xor t8;
    y4  =   t2 xor t3 xor t4 xor t5 xor t6 xor t7;
    y5  =   t1 xor t2 xor t6 xor t7 xor t8;
    y6  =   t2 xor t3 xor t5 xor t7 xor t8;
    y7  =   t3 xor t4 xor t5 xor t6 xor t8;
    y8  =   t1 xor t4 xor t5 xor t6 xor t7;
    F_OUT =  (y1 << 56) or (y2 << 48) or (y3 << 40) or (y4 << 32)
          or (y5 << 24) or (y6 << 16) or (y7 <<  8) or y8;
end
```

Here, MASK8 denotes an 8-bit quantity consisting of all 1s. Each of SBOX1 through SBOX4 are substitution functions that produce an 8-bit output from an 8-bit input. The SBOX1 function is defined by the following table:

format). Each of SBOX2 through SBOX4 are defined in terms of the SBOX1 function as follows:

```
SBOX2[x] = SBOX1[x] <<< 1;
SBOX3[x] = SBOX1[x] <<< 7;
SBOX4[x] = SBOX1[x <<< 1];
```

The Camellia FL( ) and FLI( ) operations are applied during certain cipher rounds as noted above. The FL( ) operation receives 64-bit input data FL_IN as well as a 64-bit subkey KI, and produces a 64-bit result FL_OUT. (It is noted that the Camellia FL( ) operation is entirely distinct from the Kasumi FL( ) operation described above.) The FLI( ), operation receives 64-bit input data FLI_IN as well as a 64-bit subkey KI, and produces a 64-bit result FLI_OUT. FL( ) and FLI( ) respectively operate according to the following pseudocode:

```
FL(FL_IN, KI)
    begin
        x1 = FL_IN >> 32;
        x2 = FL_IN and MASK32;
        k1 = KI >> 32;
        k2 = KI and MASK32;
        x2 = x2 xor ((x1 and k1) <<< 1);
        x1 = x1 xor (x2 or k2);
        FL_OUT = (x1 << 32) or x2;
    end
FLI(FLI_IN, KI)
    begin
        var y1, y2 as 32-bit unsigned integer;
        var k1, k2 as 32-bit unsigned integer;
        y1 = FLINV_IN >> 32;
        y2 = FLINV_IN and MASK32;
        k1 = KI >> 32;
        k2 = KI and MASK32;
        y1 = y1 xor (y2 or k2);
        y2 = y2 xor ((y1 and k1) <<< 1);
        FLI_OUT = (y1 << 32) or y2;
    end
```

Camellia Engine Instruction Support

In some embodiments, the Camellia key expansion and cipher functionality described above may be implemented by

| SBOX1: | | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | a | b | c | d | e | f |
| 00: | 112 | 130 | 44 | 236 | 179 | 39 | 192 | 229 | 228 | 133 | 87 | 53 | 234 | 12 | 174 | 65 |
| 10: | 35 | 239 | 107 | 147 | 69 | 25 | 165 | 33 | 237 | 14 | 79 | 78 | 29 | 101 | 146 | 189 |
| 20: | 134 | 184 | 175 | 143 | 124 | 235 | 31 | 206 | 62 | 48 | 220 | 95 | 94 | 197 | 11 | 26 |
| 30: | 166 | 225 | 57 | 202 | 213 | 71 | 93 | 61 | 217 | 1 | 90 | 214 | 81 | 86 | 108 | 77 |
| 40: | 139 | 13 | 154 | 102 | 251 | 204 | 176 | 45 | 116 | 18 | 43 | 32 | 240 | 177 | 132 | 153 |
| 50: | 223 | 76 | 203 | 194 | 52 | 126 | 118 | 5 | 109 | 183 | 169 | 49 | 209 | 23 | 4 | 215 |
| 60: | 20 | 88 | 58 | 97 | 222 | 27 | 17 | 28 | 50 | 15 | 156 | 22 | 83 | 24 | 242 | 34 |
| 70: | 254 | 68 | 207 | 178 | 195 | 181 | 122 | 145 | 36 | 8 | 232 | 168 | 96 | 252 | 105 | 80 |
| 80: | 170 | 208 | 160 | 125 | 161 | 137 | 98 | 151 | 84 | 91 | 30 | 149 | 224 | 255 | 100 | 210 |
| 90: | 16 | 196 | 0 | 72 | 163 | 247 | 117 | 219 | 138 | 3 | 230 | 218 | 9 | 63 | 221 | 148 |
| a0: | 135 | 92 | 131 | 2 | 205 | 74 | 144 | 51 | 115 | 103 | 246 | 243 | 157 | 127 | 191 | 226 |
| b0: | 82 | 155 | 216 | 38 | 200 | 55 | 198 | 59 | 129 | 150 | 111 | 75 | 19 | 190 | 99 | 46 |
| c0: | 233 | 121 | 167 | 140 | 159 | 110 | 188 | 142 | 41 | 245 | 249 | 182 | 47 | 253 | 180 | 89 |
| d0: | 120 | 152 | 6 | 106 | 231 | 70 | 113 | 186 | 212 | 37 | 171 | 66 | 136 | 162 | 141 | 250 |
| e0: | 114 | 7 | 185 | 85 | 248 | 238 | 172 | 10 | 54 | 73 | 42 | 104 | 60 | 56 | 241 | 164 |
| f0: | 64 | 40 | 211 | 123 | 187 | 201 | 67 | 193 | 21 | 227 | 173 | 244 | 119 | 199 | 128 | 158 |

Here, the most significant four bits of the input to SBOX1 selects a row of the table, and the least significant four bits selects a column. The value at the intersection of the selected row and column is the output value (shown here in decimal standard arithmetic and logical instructions that may be provided by a processor's ISA. For example, the various functions F( ), FL( ), and/or FLI( ) may be implemented through successive applications of appropriate Boolean and shift instructions. Similarly, the substitution function SBOX1 may be implemented as a sequence of conditional compare instructions, or as a lookup table in memory accessed via load instructions.

However, implementing the Camellia cipher using general-purpose ISA instructions may require numerous instructions as well as a substantial number of cycles to execute those instructions, diminishing cipher performance. By contrast, in one embodiment, Camellia engine 325 may be configured to provide support for certain ISA instructions that are particular to the Camellia cipher, such that execution of individual ones of the Camellia-specific instructions results in Camellia engine 325 performing entire corresponding portions of the Camellia cipher. Thus, for at least some embodiments of Camellia engine 325, executing the individual Camellia-specific instructions to implement the Camellia cipher may accomplish more of the work of the Camellia cipher per instruction than in the case of using general-purpose ISA instructions configured to perform the Camellia cipher.

Figure 8:
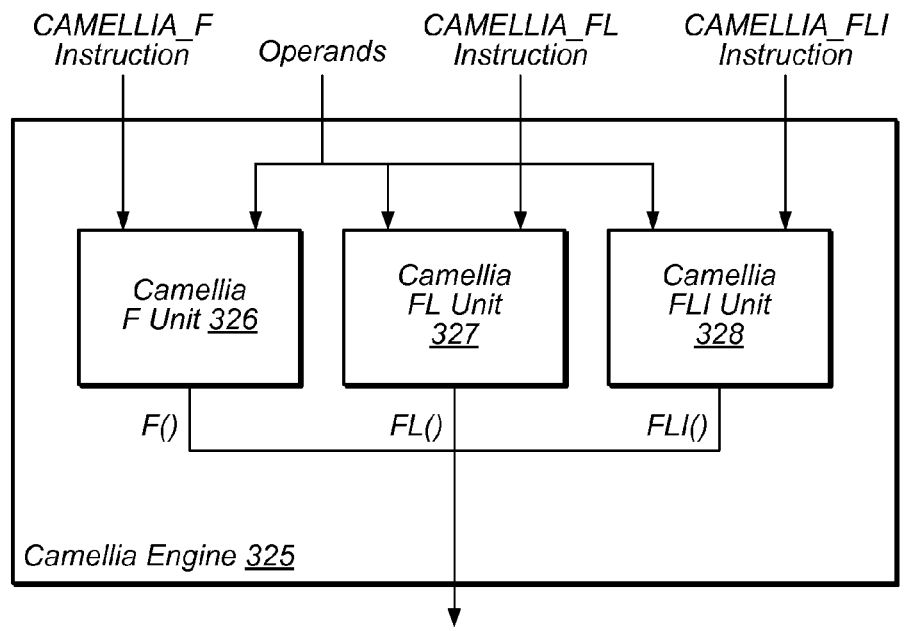
FIG. 8 is a block diagram illustrating one embodiment of a cryptographic engine configured to execute instructions to implement the Camellia block cipher algorithm.

One such embodiment of Camellia engine 325 is illustrated in FIG. 8, where Camellia engine 325 is shown to include Camellia F unit 326, Camellia FL unit 327, and Camellia FLI unit 328. In various embodiments, the outputs of these units may be combined to form the output of Camellia engine 325, for example through the use of muxes (not shown). It is noted that this partitioning of Camellia cipher functionality within Camellia engine 325 is merely one example chosen to facilitate exposition. Other configurations of Camellia engine 325 are possible and contemplated in which logic may be differently partitioned to implement support for Camellia-specific instructions, including instructions that differ from those described below.

In one embodiment, Camellia F unit 326 may be configured to execute a Camellia F( ) operation instruction defined within the ISA of processor 10 and denoted with the instruction mnemonic CAMELLIA_F (though any suitable mnemonic may be employed). In various embodiments, Camellia F unit 326 may directly decode the CAMELLIA_F instruction from opcode bits sent from upstream pipeline stages, or may receive an already-decoded or partially-decoded signal indicative of the occurrence of a CAMELLIA_F instruction.

To execute the CAMELLIA_F instruction, in one embodiment, Camellia F unit 326 may be configured to receive a 64-bit data input operand as well as a 64-bit subkey operand KI corresponding to the current round of the cipher. Camellia F unit 326 may further include logic that is configured to implement the F( ) operation on the data input and subkey. For example, Camellia F unit 326 may include appropriate combinatorial logic configured to implement the Boolean and shift operations (or their logical equivalents) specified for the F( ) operation, as well as combinatorial or other logic configured to implement the Camellia SBOX1, SBOX2, SBOX3, and SBOX4 substitution operations.

As reflected in the Camellia cipher pseudocode given above, the output of the F( ) function is combined with a portion of the data block from a previous round using an XOR operation. In one embodiment, to execute the CAMELLIA_F instruction, Camellia F unit 326 may further be configured to receive a third data input operand that corresponds to the data from the previous round, and to combine this third operand with the result of the F( ) operation using an XOR operation.

In one embodiment, Camellia FL unit 327 may be configured to execute a Camellia FL( ) operation instruction defined within the ISA of processor 10 and denoted with the instruction mnemonic CAMELLIA_FL (though any suitable mnemonic may be employed). In various embodiments, Camellia FL unit 327 may directly decode the CAMELLIA_FL_instruction from opcode bits sent from upstream pipeline stages, or may receive an already-decoded or partially-decoded signal indicative of the occurrence of a CAMELLIA_FL_instruction.

To execute the CAMELLIA_FL_instruction, in one embodiment, Camellia FL unit 327 may be configured to receive a 64-bit data input operand as well as a 64-bit subkey operand KI corresponding to the current round of the cipher. Camellia FL unit 327 may further include logic that is configured to implement the FL( ) operation on the data input and subkey. For example, Camellia FL unit 327 may include appropriate combinatorial logic configured to implement the Boolean and shift operations (or their logical equivalents) specified for the FL( ) operation.

In one embodiment, Camellia FLI unit 328 may be configured to execute a Camellia FLI( ), operation instruction defined within the ISA of processor 10 and denoted with the instruction mnemonic CAMELLIA_FLI (though any suitable mnemonic may be employed). In various embodiments, Camellia FLI unit 328 may directly decode the CAMELLIA_FLI instruction from opcode bits sent from upstream pipeline stages, or may receive an already-decoded or partially-decoded signal indicative of the occurrence of a CAMELLIA_FLI instruction.

To execute the CAMELLIA_FLI instruction, in one embodiment, Camellia FLI unit 328 may be configured to receive a 64-bit data input operand as well as a 64-bit subkey operand KI corresponding to the current round of the cipher. Camellia FLI unit 328 may further include logic that is configured to implement the FLI( ) operation on the data input and subkey. For example, Camellia FLI unit 328 may include appropriate combinatorial logic configured to implement the Boolean and shift operations (or their logical equivalents) specified for the FLI( ) operation.

One example of SPARC assembly language code that reflects usage of the CAMELLIA_F, CAMELLIA_FL, and CAMELLIA_FLI instructions discussed above to perform encryption using a 128-bit input key is as follows:

```
!# Expanded keys in F0 thru F50
setx        vt_cleartext, %g1, %l4
ldd         [%l4 + 0x000], %f54
ldd         [%l4 + 0x008], %f52
run_cipher:
fxor        %f0 ,   %f54,                   %f54   !# Pre-Whiten
fxor        %f2 ,   %f52,                   %f52
camellia_f  %f4 ,   %f52,   %f54,   %f52   !# Round 1   F 1
camellia_f  %f6 ,   %f54,   %f52,   %f54   !# Round 2   F 2
camellia_f  %f8 ,   %f52,   %f54,   %f52   !# Round 3   F 3
camellia_f  %f10,   %f54,   %f52,   %f54   !# Round 4   F 4
camellia_f  %f12,   %f52,   %f54,   %f52   !# Round 5   F 5
camellia_f  %f14,   %f54,   %f52,   %f54   !# Round 6   F 6
camellia_fl %f16,   %f54,                   %f54   !#                FL
camellia_fli %f18,  %f52,                   %f52   !#                FLI
camellia_f  %f20,   %f52,   %f54,   %f52   !# Round 7   F 1
camellia_f  %f22,   %f54,   %f52,   %f54   !# Round 8   F 2
camellia_f  %f24,   %f52,   %f54,   %f52   !# Round 9   F 3
camellia_f  %f26,   %f54,   %f52,   %f54   !# Round 10  F 4
camellia_f  %f28,   %f52,   %f54,   %f52   !# Round 11  F 5
camellia_f  %f30,   %f54,   %f52,   %f54   !# Round 12  F 6
camellia_fl %f32,   %f54,                   %f54   !#                FL
camellia_fli %f34,  %f52,                   %f52   !#                FLI
camellia_f  %f36,   %f52,   %f54,   %f52   !# Round 13  F 1
camellia_f  %f38,   %f54,   %f52,   %f54   !# Round 14  F 2
camellia_f  %f40,   %f52,   %f54,   %f52   !# Round 15  F 3
camellia_f  %f42,   %f54,   %f52,   %f54   !# Round 16  F 4
camellia_f  %f44,   %f52,   %f54,   %f52   !# Round 17  F 5
camellia_f  %f46,   %f54,   %f52,   %f54   !# Round 18  F 6
fxor        %f48,   %f52,                   %f52   !# Post-Whiten
fxor        %f50,   %f54,                   %f54
```

In this example, it is assumed that the Camellia key schedule has already been generated and stored within 64-bit floating-point registers % f0 through % f50 (e.g., by a separately-executed set of instructions). The first group of instructions loads the 128-bit input block into registers % f52 and % f54, and the FXOR instructions apply keys kw1 and kw2 to the input block.

In the illustrated example, each of the 18 rounds of the Camellia cipher is implemented by a corresponding instance of the CAMELLIA_F instruction, which may be executed by Camellia F unit 326. The first operand of the CAMELLIA_F instruction specifies the subkey input KI, and the second operand specifies the input data to the F( ) operation. The third operand specifies the prior round data that is to be XORed with the result of the F( ) operation. The fourth operand specifies the destination register for the result of the round. Consistent with the Camellia cipher, the left and right 64-bit halves of the 128-bit working data block are swapped after each round. Because these halves are stored in different registers in the illustrated example, the swap may be effected by simply exchanging which register is referenced, as shown in the above code.

After the sixth and twelfth rounds, the CAMELLIA_FL and CAMELLIA_FLI instructions are given, which may be respectively executed by Camellia FL unit 327 and Camellia FLI unit 328. For each of these instructions, the first operand specifies the subkey input KI, and the second operand specifies the input data to the FL( ) or FLI( ), operation. After the final round, the final group of FXOR instructions apply keys kw3 and kw4 to generate the resultant encrypted block.

One example of SPARC assembly language code that reflects usage of the CAMELLIA_F CAMELLIA_FL, and CAMELLIA_FLI instructions discussed above to perform encryption using a 192-bit or 256-bit input key is as follows:

```
!# Expanded keys in i0, i1, F0 thru F58, and i2, i3
setx        vt_cleartext, %g1, %l4
ldx         [%l4 + 0x000], %i6
ldx         [%l4 + 0x008], %i7
run_cipher:
xor         %i0, %i6, %i6              !# Pre-Whiten
xor         %i1, %i7, %i7
movxtod     %i6, %f62
movxtod     %i7, %f60
camellia_f   %f0 ,  %f60,  %f62,  %f60   !# Round 1    F 1
camellia_f   %f2 ,  %f62,  %f60,  %f62   !# Round 2    F 2
camellia_f   %f4 ,  %f60,  %f62,  %f60   !# Round 3    F 3
camellia_f   %f6 ,  %f62,  %f60,  %f62   !# Round 4    F 4
camellia_f   %f8 ,  %f60,  %f62,  %f60   !# Round 5    F 5
camellia_f   %f10,  %f62,  %f60,  %f62   !# Round 6    F 6
camellia_fl  %f12,  %f62,         %f62   !#                  FL
camellia_fli %f14,  %f60,         %f60   !#                  FLI
camellia_f   %f16,  %f60,  %f62,  %f60   !# Round 7    F 1
camellia_f   %f18,  %f62,  %f60,  %f62   !# Round 8    F 2
camellia_f   %f20,  %f60,  %f62,  %f60   !# Round 9    F 3
camellia_f   %f22,  %f62,  %f60,  %f62   !# Round 10   F 4
camellia_f   %f24,  %f60,  %f62,  %f60   !# Round 11   F 5
camellia_f   %f26,  %f62,  %f60,  %f62   !# Round 12   F 6
camellia_fl  %f28,  %f62,         %f62   !#                  FL
camellia_fli %f30,  %f60,         %f60   !#                  FLI
camellia_f   %f32,  %f60,  %f62,  %f60   !# Round 13   F 1
camellia_f   %f34,  %f62,  %f60,  %f62   !# Round 14   F 2
camellia_f   %f36,  %f60,  %f62,  %f60   !# Round 15   F 3
camellia_f   %f38,  %f62,  %f60,  %f62   !# Round 16   F 4
camellia_f   %f40,  %f60,  %f62,  %f60   !# Round 17   F 5
camellia_f   %f42,  %f62,  %f60,  %f62   !# Round 18   F 6
camellia_fl  %f44,  %f62,         %f62   !#                  FL
camellia_fli %f46,  %f60,         %f60   !#                  FLI
camellia_f   %f48,  %f60,  %f62,  %f60   !# Round 19   F 1
camellia_f   %f50,  %f62,  %f60,  %f62   !# Round 20   F 2
camellia_f   %f52,  %f60,  %f62,  %f60   !# Round 21   F 3
```

-continued
```
camellia_f   %f54,  %f62,  %f60,  %f62   !# Round 22   F 4
camellia_f   %f56,  %f60,  %f62,  %f60   !# Round 23   F 5
camellia_f   %f58,  %f62,  %f60,  %f62   !# Round 24   F 6
movdtox      %f60, %i6
movdtox      %f62, %i7
xor          %i2, %i6, %i6              !# Post-Whiten
xor          %i3, %i7, %i7
```

The operation of this code is largely similar to that discussed above for the 128-bit example. However, in this case, certain keys (e.g., kw1 through kw4) may be stored in the integer register file, and applied using integer XOR instructions rather than floating-point FXOR instructions. (Here, the result of the first two XOR instructions is moved to the floating-point register file for use during cipher rounds, while the result of the last cipher round is moved back to the integer register file for use during the final two XOR instructions.) In other embodiments, all keys may be stored entirely within one register file. In contrast to the 128-bit example, this code example reflects 24 rounds as well as application of the FL( ) and FLI( ) operations after the eighteenth round.

It is noted that this code represents merely one example of how the CAMELLIA_F, CAMELLIA_FL, and CAMELLIA_FLI instructions may be employed, and that numerous other applications using other variants of these instructions are possible and contemplated. For example, in other embodiments, these instructions may be implemented to use the integer register file instead of the floating-point register file. Further, these instructions may be implemented in any suitable ISA. Generically, instructions that implement at least one instance of the Camellia F( ) operation may be referred to as Camellia FO-operation instructions, regardless of whatever other operations such instructions might perform. Similarly, instructions that implement at least one instance of the Camellia FL( ) operation or the Camellia FLI( ), may respectively be referred to as Camellia FL( )-operation instructions or Camellia FLI( ), operation instructions, regardless of whatever other operations such instructions might perform.

In some embodiments of Camellia engine 325, the various Camellia-specific instructions may each require multiple execution cycles to execute. Given that many of the instructions depend on the result of the prior instruction, during processing of a single data block from a single thread, a new Camellia instruction may not be able to be issued every cycle. However, in some such embodiments, Camellia engine 325 may be configured to support pipelined execution, such that multiple threads or multiple different data blocks may be concurrently executing within Camellia engine 325, which may increase the overall utilization of Camellia engine 325. For example, several different threads may concurrently share Camellia engine 325, where a new CAMELLIA_F, CAMELLIA_FL, or CAMELLIA_FLI instruction from a different thread may be issued as often as every execution cycle.

Figure 9A:
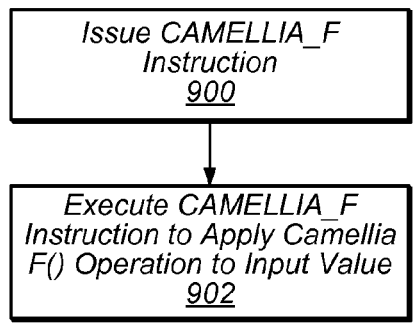
FIG. 9A is a flow diagram describing the operation of one embodiment of a processor configured to provide instruction-level support for the Camellia F( ) operation.

FIG. 9A indicates one embodiment of a method of operation of a processor configured to provide instruction-level support for the Camellia F( ) operation. Operation begins in block 900 where a CAMELLIA_F instruction, defined within the processor's ISA, is issued to a cryptographic unit for execution. For example, a programmer may specify the CAMELLIA_F instruction within an executable thread of code such that the instruction is fetched by instruction fetch unit 200 of processor 10, and ultimately issued by issue unit 230 to FGU 255 for execution.

In response to receiving the issued CAMELLIA_F instruction, the cryptographic unit executes the CAMELLIA_F instruction to apply the Camellia F( ) operation to the specified input value using specified keys (block 902). For example, Camellia engine 325 within FGU 255 may be configured to execute the CAMELLIA_F instruction as previously described, which may include performing an additional XOR operation on the result of the F( ) operation using a third specified operand. In various embodiments, executing the CAMELLIA_F instruction may include reading instruction operands from a register file, an operand bypass unit, or another operand source, as well as writing a result to working storage or to another destination.

Figure 9B:
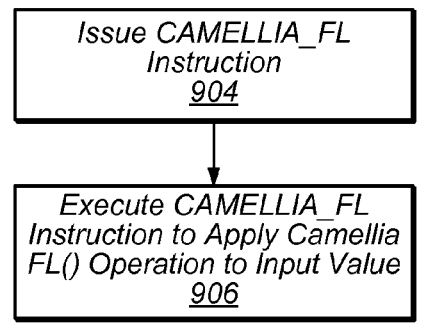
FIG. 9B is a flow diagram describing the operation of one embodiment of a processor configured to provide instruction-level support for the Camellia FL( ) operation.

FIG. 9B indicates one embodiment of a method of operation of a processor configured to provide instruction-level support for the Camellia FL( ) operation. Operation begins in block 904 where a CAMELLIA_FL_instruction, defined within the processor's ISA, is issued to a cryptographic unit for execution. For example, a programmer may specify the CAMELLIA_FL_instruction within an executable thread of code such that the instruction is fetched by instruction fetch unit 200 of processor 10, and ultimately issued by issue unit 230 to FGU 255 for execution.

In response to receiving the issued CAMELLIA_FL_instruction, the cryptographic unit executes the CAMELLIA_FL_instruction to apply the Camellia FL( ) operation to the specified input value (block 906). For example, Camellia engine 325 within FGU 255 may be configured to execute the CAMELLIA_FL_instruction as previously described. In various embodiments, executing the CAMELLIA_FL_instruction may include reading instruction operands from a register file, an operand bypass unit, or another operand source, as well as writing a result to working storage or to another destination.

Figure 9C:
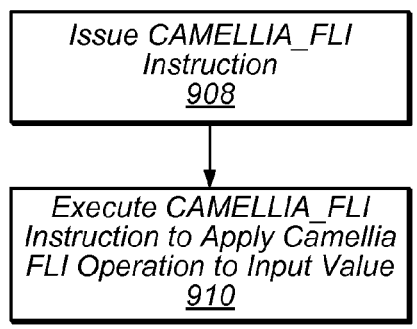
FIG. 9C is a flow diagram describing the operation of one embodiment of a processor configured to provide instruction-level support for the Camellia FLI( ) operation.

FIG. 9C indicates one embodiment of a method of operation of a processor configured to provide instruction-level support for the Camellia FLI( ), operation. Operation begins in block 908 where a CAMELLIA_FLI instruction, defined within the processor's ISA, is issued to a cryptographic unit for execution. For example, a programmer may specify the CAMELLIA_FLI instruction within an executable thread of code such that the instruction is fetched by instruction fetch unit 200 of processor 10, and ultimately issued by issue unit 230 to FGU 255 for execution.

In response to receiving the issued CAMELLIA_FLI instruction, the cryptographic unit executes the CAMELLIA_FLI instruction to apply the Camellia FLI( ), operation to the specified input value (block 910). For example, Camellia engine 325 within FGU 255 may be configured to execute the CAMELLIA_FLI instruction as previously described. In various embodiments, executing the CAMELLIA_FLI instruction may include reading instruction operands from a register file, an operand bypass unit, or another operand source, as well as writing a result to working storage or to another destination.

Instruction Support for the Advanced Encryption Standard (AES) Cipher

As shown in the embodiment of FIG. 3, SPU 300 includes an AES engine 310. In one embodiment, the AES engine 310 may be configured to execute instructions that implement various portions of a block cipher algorithm that is compliant with the AES algorithm, as defined by Federal Information Processing Standards Publication 197 (FIPS 197), dated Nov. 26, 2001 (also referred to herein as the "AES cipher"). These instructions may be defined within the ISA implemented by processor 10, such that processor 10 may be configured to provide specific instruction-level support for the AES cipher.

As described in greater detail below, in such an implementation, a user of processor 10 may be able to specify a smaller number of instructions to implement the AES cipher than would be required for an ISA that lacked AES instruction-level support. In turn, this may result in more compact code and/or faster cipher execution.

The following discussion will describe the general operation of the AES cipher including pseudocode of the various AES cipher algorithms. Examples of the AES instructions that AES engine 310 may execute to implement the AES cipher are then discussed, including code examples that implement those instructions.

AES Key Expansion and Cipher

Generally speaking, the AES cipher is a block cipher that performs encryption/decryption of a 128-bit data block using initial cipher keys having sizes of 128, 192 or 256 bits. The selected initial key may be supplied to the cipher as an argument along with the data block to be encrypted/decrypted. As described in greater detail below, the AES cipher uses a number of iterative loops or cipher rounds to encrypt or decrypt a data block. The AES cipher may use a unique 128-bit key for each cipher round following the application of the initial key. Thus, for initial AES cipher key lengths of 128, 192 and 256 bits requiring 10, 12 and 14 rounds, respectively, a total of 11, 13, or 15 128-bit keys (or 44, 52, or 60 32-bit keys) are required to provide a unique key per round following application of the initial key.

The AES cipher can be broken down into three sections: key expansion, encryption, and decryption. As mentioned above, the unique cipher keys for each round may be generated from the initial cipher key according to a key expansion algorithm. The set of keys resulting from the operation of the key expansion algorithm may be referred to as the expanded set of keys, and each member of the expanded set may correspond to a particular round of the cipher algorithm. (In some embodiments, the expanded set of keys may also include the initial cipher key.) One pseudocode representation of an AES key expansion algorithm is given below:

| | Input Keys Nk(words) | # of Rounds Nr | Total Expanded Keys Ne |
|---|---|---|---|
| AES 128 | 4 | 10 | 44 |
| AES 192 | 6 | 12 | 52 |
| AES 256 | 8 | 14 | 60 |

```
KeyExpansion (word key[(Nk−1):0], word w[(Ne−1),0])
   Begin
      For (i=0, i<Nk, i=i+1)
         Begin
            w[i] = key[i];
         End
      For (i=Nk, i<Ne, i=i+1)
         Begin
            temp = w[i−1];
            if ((i mod Nk) == 0)
               temp = SubWord(RotWord(temp)) XOR Rcon[i/Nk]
            else if ((Nk == 8) & ((i mod Nk) == 4))
               temp = SubWord(temp)
            end if
            w[i] = w[i−Nk] XOR temp
         End
   End
```

As shown in the above representation, Nr represents the number of rounds performed by the AES algorithm, and varies according to the size of the initial cipher key as described above. Nk represents the number of 32-bit words comprising the initial cipher key. For example, for 128-bit, 196-bit and 256-bit initial cipher keys, Nk equals 4, 6 and 8, respectively. Further Ne represents the total number of expanded keys. As shown, the number of expanded keys is dependent on the size of the initial cipher key. Thus, for 128-bit, 196-bit and 256-bit initial cipher keys, Ne equals 44, 52 and 60 expanded keys, respectively. The expanded set of cipher keys may sometimes be referred to as the key schedule. The pseudocode illustrating the AES cipher algorithm as given below, shows how the algorithm may progress through the expanded key set as rounds of the algorithm complete.

In the above pseudocode representation, SubWord( ) is a function that takes a four-byte input word and applies the SBOX substitution transformation function to each of the four bytes to produce an output word. RotWord( ) is a function that takes a word {a0,a1,a2,a3} as input, performs a cyclic byte permutation, and returns the word {a1,a2,a3,a0}. Rcon [i] "round constant word array" contains the values given by $[x^{(i-1)}, \{00\}, \{00\}, \{00\}]$, with $x^{(i-1)}$ being powers of x (x is denoted as {02}) in the field $GF(2^8)$. Note that i starts at 1, and not 0.

In this AES key expansion algorithm, the initial cipher key is copied into the first Nk 32-bit words of the expanded set, as illustrated by the first for loop. Subsequently, in most cases each 32-bit word of the expanded set is a logical exclusive-OR (XOR) function of the immediately previous word and the Nk-previous word. That is, word i of the expanded set is generally a function of word i−1 and word i−Nk.

As illustrated in the AES key expansion algorithm, for every Nk words (that is, for each word i of the expanded set for which i mod Nk=0), several transformations are applied to word i−1 prior to the XOR with word i−Nk. Specifically, the RotWord transformation may, in one embodiment, cyclically rotate the bytes of word i−1 left by one byte position. It is noted that in some embodiments, the RotWord transformation may be analogous to the ShiftRows transformation of the AES cipher algorithm for row 1 of the cipher state, as described below. Additionally, the SubWord transformation may, in one embodiment, comprise applying the SubBytes function of the AES cipher algorithm, as described above, to each byte of word i−1. Following the SubWord transformation, the resulting word is XORed with a round constant Rcon, which may vary according to the specific word i being generated. It is noted that in the illustrated embodiment, when Nk=8 (i.e., a 256-bit initial AES cipher key is being used), an additional SubWord transformation is specified for each word i of the expanded set for which i mod Nk=4.

As an example, executing the above pseudocode for an initial AES cipher key of 128 bits (Nk=4) may result in words w[0] through w[3] being assigned the corresponding words of the initial cipher key. Subsequent words of the expanded set may be determined as follows:

```
w[4] = w[0] xor SubWord(RotWord(w[3])) xor Rcon[1]
w[5] = w[1] xor w[4]
w[6] = w[2] xor w[5]
w[7] = w[3] xor w[6]
w[8] = w[4] xor SubWord(RotWord(w[7])) xor Rcon[2]
w[9] = w[5] xor w[8]
w[10] = w[6] xor w[9]
w[11] = w[7] xor w[10]
...
```

In this embodiment, generation of the expanded set of cipher keys is generally dependent upon the initial cipher key in a sequential fashion, where later-generated cipher keys have increasing dependency on earlier-generated cipher keys.

Figures 11, 12:
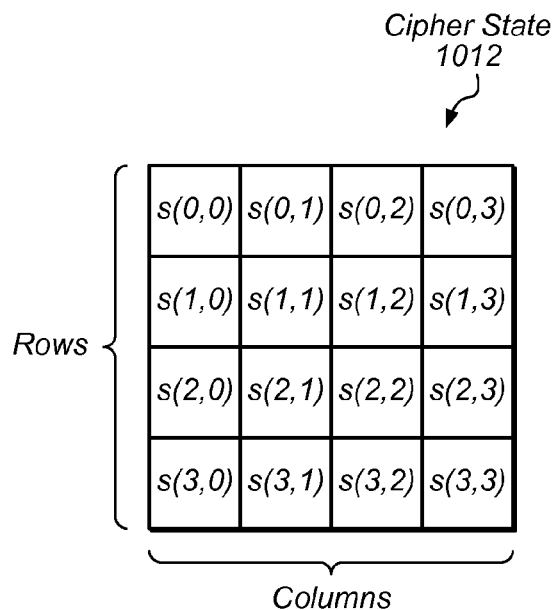
FIG. 11 is a diagram illustrating one embodiment of cipher state of the AES block cipher algorithm.
FIG. 12 is a diagram illustrating one embodiment of exemplary cipher pipeline stages processing fewer than all columns of the cipher state shown in FIG. 11 during execution of AES Encrypt Round instructions.

In the AES cipher, operations are performed on a two-dimensional array of bytes having a plurality of rows and columns. This two-dimensional array is referred to as the cipher state. One such arrangement is illustrated in FIG. 11, in which cipher state 1012 includes four rows and four columns. The intersection of each row and column may represent a byte of the cipher state, and each word in the illustrated embodiment is denoted as s(M,N) where M denotes a row number ranging from 0 to 3 and N denotes a column number, also ranging from 0 to 3. In the illustrated embodiment, the sixteen illustrated bytes of cipher state 1012 correspond to the 128-bit block size specified by one version of the AES cipher. The AES cipher implements four individual transformation functions on the data in the cipher state 1012. Those transformations include SubBytes, ShiftRows, MixColumns, and AddRoundKey. One pseudocode representation of a version of the AES cipher for encrypting a data block is given below:

```
Cipher (in[127:0], out[127:0], [31:0] kstate [((4*(Nr+1))−1):0])
   Begin
      state[127:0] = in[127:0];
      AddRoundKey(state, kstate[0] to kstate[3]);
      For round = 1 to (Nr−1)
         SubBytes(state);
         ShiftRows(state);
         MixColumns(state);
         AddRoundKey(state, kstate[4*round]
         to kstate[4*(round+1)− 1]);
      End       for loop
      SubBytes(state);
      ShiftRows(state);
      AddRoundKey(state, kstate[4*Nr] to kstate[4*(Nr+1) − 1]);
      out[127:0] = state[127:0];
   end
```

Following an initial step of adding a key to cipher state 1012, each round in the iterative loop of the above representation of the AES cipher includes applying the four functions or steps to cipher state 1012 described above. (Each of which may be generically referred to as a byte-substitution step, a row-shifting step, a column-mixing step, and an add-round-key step, respectively.) In one embodiment, the SubBytes (SB) function may include applying a particular transformation to each byte of cipher state 1012, which in one implementation of the AES cipher may include taking a multiplicative inverse of the byte as defined in the finite Galois field $GF(2^8)$ and applying an affine transformation to the result. The ShiftRows (SR) function may, in one embodiment, include cyclically shifting or rotating zero or more bytes of a given row of cipher state 1012 from a lower-numbered column to a higher-numbered column. For example, in one embodiment the SR function may leave row 0 of cipher state 1012 unmodified, shift byte s(1,0) to column 3 while shifting the remaining bytes of row 1 left one column, shift bytes s(2,0) and s(2,1) to columns 2 and 3, respectively, while shifting the remaining bytes of row 2 left two columns, and shift bytes s(3,0), s(3,1) and s(3,2) to columns 1, 2 and 3, respectively, while shifting the remaining byte of row 3 left three columns.

In one embodiment, the MixColumns (MC) function may include multiplying each column of cipher state 1012 by a fixed matrix, which may represent a polynomial multiplication in $GF(2^8)$. Finally, the AddRoundKey (ARK) function may, in one embodiment, include adding a cipher key appropriate to the particular round to each column of cipher state 1012. It is noted that in some embodiments, mathematical operations defined over field elements may differ in implementation from ordinary integer arithmetic. For example, addition of field elements may be implemented as an exclusive-OR (XOR) operation rather than an integer addition operation. More details about each of the AES functions described above may be found in the FIPS 197 publication referenced above.

It is noted that while the pseudocode example of the AES cipher given above illustrated the behavior of a cipher encryption operation, a cipher decryption operation may use inverse functions in a similar fashion. For example, a decryption round of the AES cipher may apply the inverses of the ShiftRows, SubBytes, AddRoundKey, and MixColumns functions (e.g., InvShiftRows, InvSubBytes, AddRoundKey and InvMixColumns) in that order. One pseudocode representation of a version of the AES cipher for decrypting a data block is given below:

```
InvCipher (in[127:0], out[127:0], [31:0] kstate [((4*(Nr+1))-1):0])
   Begin
      state[127:0] = in[127:0];
      AddRoundKey(state, kstate[4*round] to kstate[4*(round+1) - 1]);
      For round = (Nr-1) step -1 downto 1
         InvShiftRows(state);
         InvSubBytes(state);
         AddRoundKey(state, kstate[4*round] to kstate[4*(round+1)-1]);
         InvMixColumns(state);
      End
      InvShiftRows(state);
      InvSubBytes(state);
      AddRoundKey(state, kstate[0] to kstate[3]);
      out[127:0] = state[127:0];
   end
```

AES Engine Instruction Support

In some embodiments, the AES key expansion and cipher functionality described above may be implemented by standard arithmetic and logical instructions that may be provided by a processor's ISA. For example, the sbox substitution operations may be implemented as a sequence of conditional compare instructions, or as a lookup table in memory accessed via load instructions.

However, implementing the AES cipher using general-purpose ISA instructions may require numerous instructions as well as a substantial number of cycles to execute those instructions, diminishing cipher performance. In one embodiment, AES engine 310 may be configured to provide support for certain ISA instructions that are particular to the AES cipher, such that execution of individual ones of the AES-specific instructions results in AES engine 310 performing entire corresponding portions of the AES cipher. For example, as described further below, the AES engine 310 may support AES key expansion instructions and AES Round instructions for both encryption and decryption.

Figure 10:
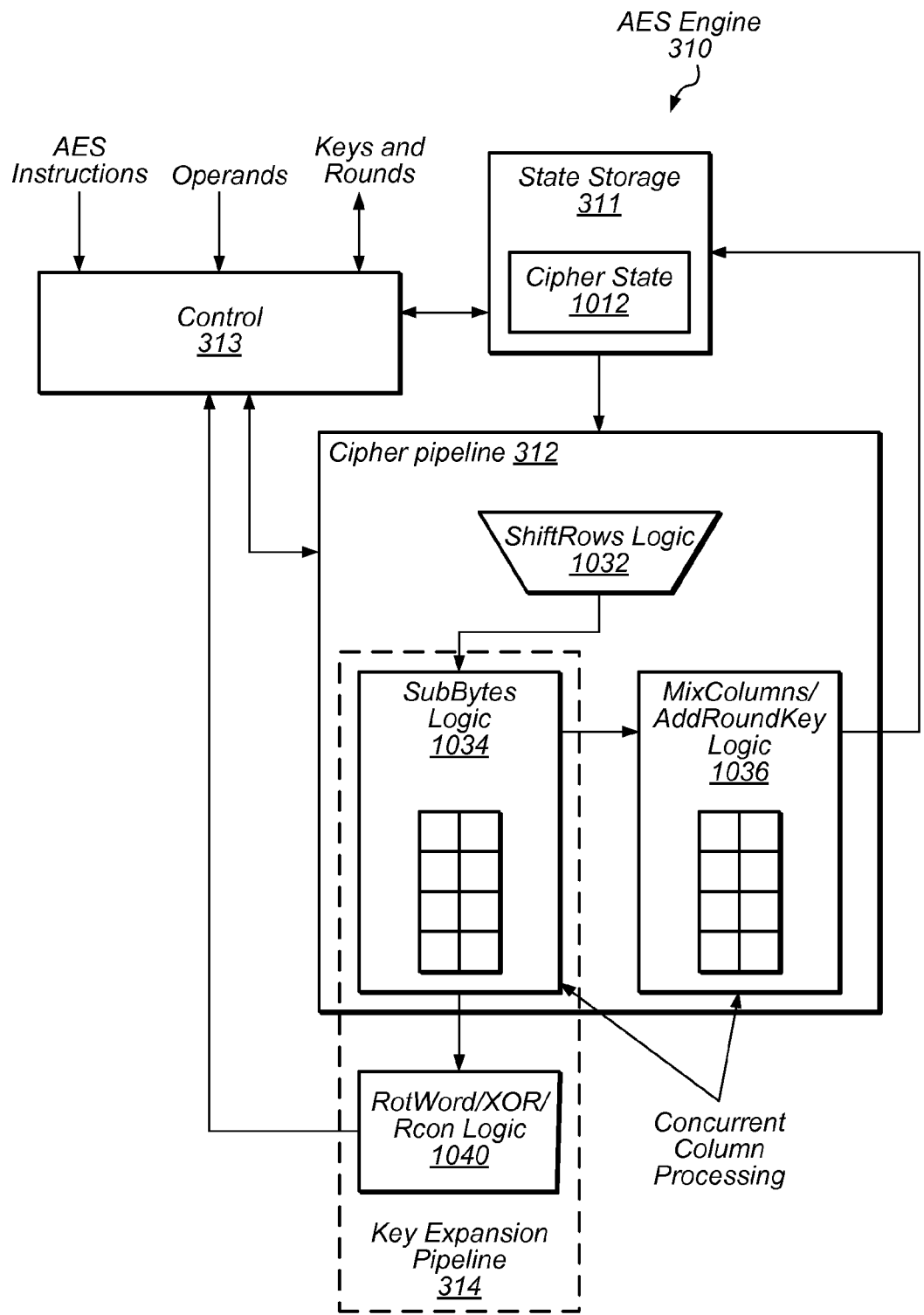
FIG. 10 is a block diagram of one embodiment of a cryptographic engine configured to execute instructions to implement the Advanced Encryption Standard (AES) block cipher algorithm.

One such embodiment of AES engine 310 is illustrated in FIG. 10. As shown, AES Engine 310 includes control logic 313 coupled to state storage 311 which is coupled to cipher pipeline 312 and key expansion pipeline 314. Cipher pipeline 312 includes ShiftRows (SR) logic 1032 coupled to SubBytes (SB) logic 1034, which is in turn coupled to MixColums/AddRoundKey (MC/ARK) logic 1036. Cipher pipeline 312 is also coupled to write output to state storage 311. Key expansion pipeline 314 includes the SB logic 1034 of the cipher pipeline 312 and the RotWord/XOR/Rcon (RXR) logic 1040.

In various embodiments, SPU 300 may also include additional logic not shown, such as additional cipher algorithm control logic, combinatorial logic, and/or logic configured to perform different types of operations. Collectively, the illustrated features of AES Engine 310 may be configured to implement the AES cipher as described above. It is noted that in some embodiments, SR logic 1032 may be included within state storage 311 or coupled between state storage 311 and cipher pipeline 312. Additionally, AES engine 310 may utilize the floating-point register file (FRF) and/or the integer register file (IRF) (e.g., working register files 260 of FIG. 2) for storing the expanded key set described in the key expansion pseudocode example above.

State storage 311 may be any type of structure suitable for storing the cipher state 1012, which is operated on by the AES cipher. For example, in various embodiments state storage 311 may be configured as a register file, a random access memory (RAM), a queue, or any other suitable data structure. In some embodiments, state storage 311 may provide storage for state in addition to cipher state 1012. For example, cipher state 1012 may include state (such as a data block) currently undergoing iterative processing by cipher pipeline 312. Additionally, in one embodiment, state storage 311 may provide additional storage for a next data block to be processed after processing of cipher state 1012 completes. After processing of current cipher state 1012 completes, a next data block may become the new value of cipher state 1012.

AES Engine Key Expansion Instruction Support

In one embodiment, key expansion pipeline 314, in combination with control logic 313, may be configured to execute AES key expansion instructions defined within the ISA of processor 10 and denoted with the following instruction mnemonics: AES_KEXPAND0, AES_KEXPAND1, and AES_KEXPAND2 (though any suitable mnemonics may be employed). These instructions may be referred to collectively in the following discussions as the AES_KEXPAND instructions, where appropriate. In various embodiments, the control logic 313 may directly decode the AES_KEXPAND instructions from opcode bits sent from upstream pipeline stages, or may receive already-decoded or partially-decoded signals indicative of the occurrence of AES_KEXPAND instructions. Control logic 313 may responsively provide corresponding control signals to the key expansion pipeline 314 to execute the AES_KEXPAND instructions.

In one embodiment, the AES_KEXPAND0 instruction generates two 32-bit keys using SubBytes, XOR, and an additional XOR to create the second key. The AES_KEXPAND1 instruction generates two 32-bit keys using RotWord, SubBytes, Rcon, XOR, XOR, and an additional XOR to create the second key. The AES_KEXPAND2 instruction generates two 32-bit keys using XOR and an additional XOR to create the second key.

In one embodiment, SB logic 1034 and RXR logic 1040 may be implemented as pipeline stages configured to implement corresponding steps of generating a member of the expanded key set according to the key expansion algorithm above. For example, SB logic 1034 may be configured to perform the SubBytes transformation that comprises the SubWord transformation illustrated in the AES key expansion algorithm pseudocode shown above. Further, RXR logic 1040 may be configured to conditionally perform the RotWord and XOR functions shown in the AES key expansion algorithm, along with selecting the appropriate Rcon constant, if necessary. It is noted that in other embodiments, key expansion pipeline 314 may be partitioned differently into different stages and/or elements, and may implement functions in addition to or distinct from the AES key expansion functions illustrated.

In the illustrated embodiment, SB logic 1034 is shared between key expansion pipeline 314 and cipher pipeline 312. Further, SPU 300 may be configured to operate in a key expansion mode of operation, during which a key expansion algorithm executes, as well as a cipher mode of operation, during which a cipher algorithm executes. For example, SPU 300 may be configured to generate the complete set of expanded keys to be used during encryption/decryption in the key expansion mode of operation prior to commencing cipher execution during the cipher mode of operation.

It is noted that although the AES key expansion pseudocode given above illustrates that the innermost RotWord transformation is performed prior to the SubWord transformation, an equivalent result may be obtained by performing these transformations in the opposite order, as described above with respect to the ShiftRows and SubBytes functions of the AES cipher algorithm. In various embodiments of key expansion pipeline 314, these steps may be implemented in either order. Additionally, it is noted that in general, one or more portions of key expansion pipeline 314 may be configured to perform cipher algorithm steps regardless of whether any stage of cipher pipeline 312 is configured to concurrently process all or fewer than all columns of cipher state 1012. That is, functional overlap and sharing may occur between key expansion pipeline 314 and cipher pipeline 312 in instances where cipher pipeline 312 concurrently processes all of cipher state 1012, in addition to instances where stages of cipher pipeline 312 concurrently process fewer than all columns of cipher state 1012.

One example of SPARC assembly language code that illustrates the use of the AES_KEXPAND instructions to expand a 128-bit key is as follows:

```
expand 128-bit key:
setx         key, %g1, %l4              !# Load 128-bit key
ldd          [%l4 + 0x000], %f0
ldd          [%l4 + 0x008], %f2
aes_kexpand1 %f0 , %f2 , 0, %f4         !# w[4] ,w[5]
       rs3_addr = 5'b00000 -> RCON = 32'h0100_0000
aes_kexpand2 %f2 , %f4 ,      %f6       !# w[6] ,w[7]
aes_kexpand1 %f4 , %f6 , 1, %f8         !# w[8] ,w[9]
       rs3_addr = 5'b00001 -> RCON = 32'h0200_0000
aes_kexpand2 %f6 , %f8 ,      %f10      !# w[10],w[11]
aes_kexpand1 %f8 , %f10, 2, %f12        !# w[12],w[13]
       rs3_addr = 5'b00010 -> RCON = 32'h0400_0000
aes_kexpand2 %f10, %f12,      %f14      !# w[14],w[15]
aes_kexpand1 %f12, %f14, 3, %f16        !# w[16],w[17]
       rs3_addr = 5'b00011 -> RCON = 32'h01400_0000
aes_kexpand2 %f14, %f16,      %f18      !# w[18],w[19]
aes_kexpand1 %f16, %f18, 4, %f20        !# w[20],w[21]
       rs3_addr = 5'b00100 -> RCON = 32'h1000_0000
aes_kexpand2 %f18, %f20,      %f22      !# w[22],w[23]
aes_kexpand1 %f20, %f22, 5, %f24        !# w[24],w[25]
       rs3_addr = 5'b00101 -> RCON = 32'h2000_0000
aes_kexpand2 %f22, %f24,      %f26      !# w[26],w[27]
aes_kexpand1 %f24, %f26, 6, %f28        !# w[28],w[29]
       rs3_addr = 5'b00110 -> RCON = 32'h4000_0000
aes_kexpand2 %f26, %f28,      %f30      !# w[30],w[31]
aes_kexpand1 %f28, %f30, 7, %f32        !# w[32],w[33]
       rs3_addr = 5'b00111 -> RCON = 32'h14000_0000
aes_kexpand2 %f30, %f32,      %f34      !# w[34],w[35]
aes_kexpand1 %f32, %f34, 8, %f36        !# w[36],w[37]
       rs3_addr = 5'b01000 -> RCON = 32'h1b00_0000
aes_kexpand2 %f34, %f36,      %f38      !# w[38],w[39]
aes_kexpand1 %f36, %f38, 9, %f40        !# w[40],w[41]
       rs3_addr = 5'b01001 -> RCON = 32'h3600_0000
aes_kexpand2 %f38, %f40,      %f42      !# w[42],w[43]
```

In this exemplary code sequence, the first two instructions load the initial 128-bit AES cipher key_into floating-point registers % f0 and % f2. The third operand of the AES_KEXPAND1 instruction is shown as a constant that is used to select the Rcon constant. In one embodiment, SB 434 and RXR 440 of key expansion pipeline 314 may be configured to execute the first AES_KEXPAND1 instruction to generate the fifth and sixth 32-bit expanded keys (e.g., w[4] and w[5]) and to store them in the floating-point register % f4. (Note: The first four 32-bit keys (e.g., w[0:3]) are stored in the floating-point register % f0 and % f2). Similarly, in one embodiment, SB 434 and RXR 440 of key expansion pipeline 314 may be configured to execute the first AES_KEXPAND2 instruction to generate the seventh and eighth 32-bit expanded keys (e.g., w[6] and w[7]) and to store them in the floating-point register % f6. To generate the remaining expended keys, key expansion pipeline 314 repetitively executes the AES_KEXPAND1 and AES_KEXPAND2 instructions as shown. It is noted that this code represents merely one example of how the AES_KEXPAND instructions may be employed, and that numerous other applications using other variants of the instructions are possible and contemplated. For example, in other embodiments, AES_KEXPAND instructions may be implemented to use the integer register file instead of the floating-point register file, or may be implemented to generate more than two keys per invocation of the AES_KEXPAND instructions. Further, the AES_KEXPAND instructions may be implemented in any suitable ISA.

It is noted that the above floating-point register notation % fn refers to the notation used in SPARC processors. More particularly, the floating-point registers may be referenced as 64-bit double-precision registers. For example, % f0 and % f1 are the even and odd single-precision halves of double-precision FP register % f0. Thus, the first four 32-bit keys are stored in the first two double-precision registers % f0 and % f2.

To support the expansion of the 192 and 256-bit AES cipher keys the key expansion pipeline 314 may be configured to execute different combinations of the AES_KEXPAND instructions similar to the execution shown in the 128-bit key expansion. The following exemplary SPARC assembly language code sequence illustrates the use of the AES_KEXPAND instructions to expand the 192-bit AES cipher key.

```
expand 192-bit key:
setx         key, %g1, %l4              !# Load 192-bit key
ldd          [%l4 + 0x000], %f0
ldd          [%l4 + 0x008], %f2
ldd          [%l4 + 0x010], %f4
aes_kexpand1 %f0 , %f4 , 0, %f6         !# w[6] ,w[7]
       rs3_addr = 5'b00000 -> RCON = 32'h0100_0000
aes_kexpand2 %f2 , %f6 ,      %f8       !# w[8] ,w[9]
aes_kexpand2 %f4 , %f8 ,      %f10      !# w[10],w[11]
aes_kexpand1 %f6 , %f10, 1, %f12        !# w[12],w[13]
       rs3_addr = 5'b00001 -> RCON = 32'h0200_0000
aes_kexpand2 %f8 , %f12,      %f14      !# w[14],w[15]
aes_kexpand2 %f10, %f14,      %f16      !# w[16],w[17]
aes_kexpand1 %f12, %f16, 2, %f18        !# w[18],w[19]
       rs3_addr = 5'b00010 -> RCON = 32'h0400_0000
aes_kexpand2 %f14, %f18,      %f20      !# w[20],w[21]
aes_kexpand2 %f16, %f20,      %f22      !# w[22],w[23]
aes_kexpand1 %f18, %f22, 3, %f24        !# w[24],w[25]
       rs3_addr = 5'b00011 -> RCON = 32'h01400_0000
aes_kexpand2 %f20, %f24,      %f26      !# w[26],w[27]
aes_kexpand2 %f22, %f26,      %f28      !# w[28],w[29]
aes_kexpand1 %f24, %f28, 4, %f30        !# w[30],w[31]
       rs3_addr = 5'b00100 -> RCON = 32'h1000_0000
aes_kexpand2 %f26, %f30,      %f32      !# w[32],w[33]
aes_kexpand2 %f28, %f32,      %f34      !# w[34],w[35]
aes_kexpand2 %f30, %f34, 5, %f36        !# w[36],w[37]
       rs3_addr = 5'b00101 -> RCON = 32'h2000_0000
aes_kexpand2 %f32, %f36,      %f38      !# w[38],w[39]
aes_kexpand2 %f34, %f38,      %f40      !# w[40],w[41]
aes_kexpand1 %f36, %f40, 6, %f42        !# w[42],w[43]
       rs3_addr = 5'b00110 -> RCON = 32'h4000_0000
```

-continued

```
aes_kexpand2    %f38, %f42,      %f44      !# w[44],w[45]
aes_kexpand2    %f40, %f44,      %f46      !# w[46],w[47]
aes_kexpand1    %f42, %f46, 7, %f48        !# w[48],w[49]
         rs3_addr = 5'b00111 -> RCON = 32'h14000_0000
aes_kexpand2    %f44, %f48,      %f50      !# w[50],w[51]
```

The following exemplary SPARC assembly language code sequences illustrate the use of the AES_KEXPAND instructions to expand the 256-bit AES cipher key for encryption and decryption, respectively.

```
expand encrypt 256-bit key:
!# Expanded keys in o0, o1, and F0 thru F54
     !# o0 and o1 are copied into f60 and f62 respectively for the key
expansion routine
setx          key, %g1, %l4         !# Load 256-bit key
ldx           [%l4 + 0x000], %o0    !# Orig.key==expanded keys
                                     0-3; must not be overwritten
ldx           [%l4 + 0x008], %o1
movxtod       %o0, %f60
movxtod       %o1, %f62
ldd           [%l4 + 0x010], %f0
ldd           [%l4 + 0x018], %f2
aes_kexpand1  %f60, %f2 , 0, %f4    !# w[8], w[9]
         rs3_addr = 5'b00000 -> RCON = 32'h0100_0000
aes_kexpand2  %f62, %f4,   %f6      !# w[10],w[11]
aes_kexpand0  %f0 , %f6,   %f8      !# w[12],w[13]
aes_kexpand2  %f2 , %f8,   %f10     !# w[14],w[15]
aes_kexpand1  %f4 , %f10, 1, %f12   !# w[16],w[17]
         rs3_addr = 5'b00001 -> RCON = 32'h0200_0000
aes_kexpand2  %f6, %f12,   %f14     !# w[18],w[19]
aes_kexpand0  %f8, %f14,   %f16     !# w[20],w[21]
aes_kexpand2  %f10, %f16,  %f18     !# w[22],w[23]
aes_kexpand1  %f12, %f18, 2, %f20   !# w[24],w[25]
         rs3_addr = 5'b00010 -> RCON = 32'h0400_0000
aes_kexpand2  %f14, %f20,  %f22     !# w[26],w[27]
aes_kexpand0  %f16, %f22,  %f24     !# w[28],w[29]
aes_kexpand2  %f18, %f24,  %f26     !# w[30],w[31]
aes_kexpand1  %f20, %f26, 3, %f28   !# w[32],w[33]
         rs3_addr = 5'b00011 -> RCON = 32'h01400_0000
aes_kexpand2  %f22, %f28,  %f30     !# w[34],w[35]
aes_kexpand0  %f24, %f30,  %f32     !# w[36],w[37]
aes_kexpand2  %f26, %f32,  %f34     !# w[38],w[39]
aes_kexpand1  %f28, %f34, 4, %f36   !# w[40],w[41]
         rs3_addr = 5'b00100 -> RCON = 32'h1000_0000
aes_kexpand2  %f30, %f36,  %f38     !# w[42],w[43]
aes_kexpand0  %f32, %f38,  %f40     !# w[44],w[45]
aes_kexpand2  %f34, %f40,  %f42     !# w[46],w[47]
aes_kexpand1  %f36, %f42, 5, %f44   !# w[48],w[49]
         rs3_addr = 5'b00101 -> RCON = 32'h2000_0000
aes_kexpand2  %f38, %f44,  %f46     !# w[50],w[51]
aes_kexpand0  %f40, %f46,  %f48     !# w[52],w[53]
aes_kexpand2  %f42, %f48,  %f50     !# w[54],w[55]
aes_kexpand1  %f44, %f50, 6, %f52   !# w[56],w[57]
         rs3_addr = 5'b00110 -> RCON = 32'h4000_0000
aes_kexpand2  %f46, %f52,  %f54     !# w[58],w[59]
expand decrypt 256-bit key:
setx          key, %g1, %l4         !# Load Orig. keys
ldd           [%l4 + 0x000], %f0
ldd           [%l4 + 0x008], %f2
ldd           [%l4 + 0x010], %f4
ldd           [%l4 + 0x018], %f6
aes_kexpand1  %f0, %f6 , 0, %f8     !# w[8], w[9]
         rs3_addr = 5'b00000 -> RCON = 32'h0100_0000
aes_kexpand2  %f2, %f8,    %f10     !# w[10],w[11]
aes_kexpand0  %f4 , %f10,  %f12     !# w[12],w[13]
aes_kexpand2  %f6 , %f12,  %f14     !# w[14],w[15]
aes_kexpand1  %f8 , %f14, 1, %f16   !# w[16],w[17]
         rs3_addr = 5'b00001 -> RCON = 32'h0200_0000
aes_kexpand2  %f10, %f16,  %f18     !# w[18],w[19]
aes_kexpand0  %f12, %f18,  %f20     !# w[20],w[21]
aes_kexpand2  %f14, %f20,  %f22     !# w[22],w[23]
aes_kexpand1  %f16, %f22, 2, %f24   !# w[24],w[25]
         rs3_addr = 5'b00010 -> RCON = 32'h0400_0000
aes_kexpand2  %f18, %f24,  %f26     !# w[26],w[27]
aes_kexpand0  %f20, %f26,  %f28     !# w[28],w[29]
aes_kexpand2  %f22, %f28,  %f30     !# w[30],w[31]
aes_kexpand1  %f24, %f30, 3, %f32   !# w[32],w[33]
         rs3_addr = 5'b00011 -> RCON = 32'h01400_0000
aes_kexpand2  %f26, %f32,  %f34     !# w[34],w[35]
aes_kexpand0  %f28, %f34,  %f36     !# w[36],w[37]
aes_kexpand2  %f30, %f36,  %f38     !# w[38],w[39]
aes_kexpand1  %f32, %f38, 4, %f40   !# w[40],w[41]
         rs3_addr = 5'b00100 -> RCON = 32'h1000_0000
aes_kexpand2  %f34, %f40,  %f42     !# w[42],w[43]
aes_kexpand0  %f36, %f42,  %f44     !# w[44],w[45]
aes_kexpand2  %f38, %f44,  %f46     !# w[46],w[47]
aes_kexpand1  %f40, %f46, 5, %f48   !# w[48],w[49]
         rs3_addr = 5'b00101 -> RCON = 32'h2000_0000
aes_kexpand2  %f42, %f48,  %f50     !# w[50],w[51]
aes_kexpand0  %f44, %f50,  %f52     !# w[52],w[53]
aes_kexpand2  %f46, %f52,  %f54     !# w[54],w[55]
aes_kexpand1  %f48, %f54, 6, %f56   !# w[56],w[57]
         rs3_addr = 5'b00110 -> RCON = 32'h4000_0000
aes_kexpand2  %f50, %f56,  %f58     !# w[58],w[59]
movdtox       %f56, %o0             !# expanded keys 56-59
                                     must not be overwritten
movdtox       %f58, %o1
```

In one embodiment, the nature of the AES encrypt/decrypt routine requires four registers to hold the current and next round data. Accordingly, in one embodiment, four expanded keys may be held in the IRF. To optimize performance, the four keys applied as "AddRoundKey" may be held in the IRF with "AddRoundKey" XOR executed in the EXU.

AES Engine Encryption/Decryption Instruction Support

In the illustrated embodiment, cipher pipeline 312 may be configured to execute AES Round instructions to retrieve and utilize cipher keys of the expanded key set from the appropriate register file during encryption/decryption rounds of the cipher algorithm. In one embodiment, cipher pipeline 312, in combination with control logic 313, may be configured to execute AES Round instructions defined within the ISA of processor 10 and denoted with the following instruction mnemonics: AES_EROUND01, AES_EROUND23, AES_EROUND01_LAST, AES_EROUND23_LAST, AES_DROUND01, AES_DROUND23, AES_DROUND01_LAST, and AES_DROUND23_LAST (though any suitable mnemonics may be employed). These instructions may be referred to collectively in the following discussions as the AES_ROUND instructions, where appropriate. In various embodiments, the control logic 313 may directly decode the AES_ROUND instructions from opcode bits sent from upstream pipeline stages, or may receive already-decoded or partially-decoded signals indicative of the occurrence of AES_ROUND instructions. Control logic 313 may responsively provide corresponding control signals to the cipher pipeline 312 to execute the AES_ROUND instructions.

More particularly, in one embodiment, the AES_EROUND01 instruction may encrypt columns 0 and 1 of the cipher state 1012 using SubBytes, ShiftRows, MixColumn, and AddRoundKey, while the AES_EROUND01_LAST instruction may encrypt columns 0 and 1 for the last round of the encryption. Similarly, the AES_EROUND23 instruction may encrypt columns 2 and 3 of the cipher state 1012, while the AES_EROUND23_LAST instruction may encrypt columns 2 and 3 for the last round of the encryption. In a likewise manner the AES_DROUND01 instruction may decrypt columns 0 and 1 of the cipher state 1012 using InvShiftRows, InvSubBytes, AddRoundKey, and InvMixColumn, while the AES_DROUND01_LAST instruction may decrypt columns 0 and 1 for the last round of the encryption. Similar to the encryption rounds, the AES_DROUND23 and AES_

DROUND23_LAST instructions may decrypt columns 2 and 3 or the cipher state, including the last round.

As described in greater detail below, in one embodiment, SR logic 1032, SB logic 1034, and MC/ARK logic 1036 may be implemented as pipeline stages configured to implement corresponding steps of encrypting and decrypting according to the AES cipher algorithm above. For example, SR logic 1032 may be configured as fixed or selectable circular shift logic, for example using multiplexers. SB logic 1034 may be configured to perform a byte substitution (e.g., SubBytes transformation) for bytes of cipher state 1012 as defined by the transformation specified by the AES cipher algorithm. Further, MC/ARK logic 1036 may be configured to perform the Mix Columns and Add Round Key transformation shown in the AES cipher algorithm. In the illustrated embodiment, the MC and ARK functions are combined within MC/ARK logic 1036. For example, the MC function may be implemented as a collection of XOR logic gates followed by an additional level of XOR logic to compute the ARK function. Additionally, control logic 313 may be configured to control the various pipeline stages and their interconnectivity such that execution of the AES algorithms may be pipelined over several stages, as described in greater detail below. It is noted that in other embodiments, cipher pipeline 312 may be partitioned differently into different stages and/or elements, and may implement functions in addition to or distinct from the AES cipher functions illustrated.

As described above, in some embodiments, cipher pipeline 312 may be configured to implement the appropriate inverse functions for decryption, either by reconfiguring encryption logic or providing separate logic.

In various embodiments, the rate at which cipher keys may be utilized by cipher pipeline 312 during a given round may depend on how cipher pipeline 312 is implemented. For example, depending on the specific implementation, one 32-bit word from the expanded key set may be applied to each column of cipher state 1012, or to fewer than all four columns concurrently during the AddRoundKey step described above. In embodiments where all 4 columns of cipher state 1012 concurrently undergo the AddRoundKey step, 4 32-bit words may be concurrently retrieved from the register file and utilized. In embodiments where fewer than all columns are concurrently processed, a correspondingly narrower datapath from the register files may be provided.

As noted above, the various pipeline stages implemented within cipher pipeline 312 may be configured to concurrently process fewer than all of the columns of cipher state 1012, thereby potentially reducing the area required to implement the AES cipher. More particularly, in the illustrated embodiment, SR logic 1032 may be configured to select and shift two of the columns of cipher state 1012, and to convey the two shifted columns to SB logic 1034. During a given execution cycle or time slot, SB logic 1034 and MC/ARK logic 1036 each may be configured to perform the appropriate byte substitution and to perform the MC/ARK functions, respectively, on two columns of cipher state 1012. During decryption, cipher pipeline 312 may concurrently process fewer than all columns of cipher state 1012 in a manner similar to that described above.

Accordingly, by configuring each pipeline stage to process two columns concurrently rather than all four columns of cipher state 1012, the corresponding area to implement the logic on an integrated circuit may be reduced by approximately half. More generally, for some embodiments of cipher pipeline 312, the implementation area required by a given pipeline stage may be proportional to the number of columns of cipher state 1012 the given pipeline stage is configured to concurrently process.

It is noted that the order of functions suggested by the AES pseudocode given above may not be ideal for area reduction using a datapath configured to concurrently process fewer than all columns of cipher state 1012. In the pseudocode, SubBytes is performed before ShiftRows. However, for the AES algorithm, a given output byte of the SubBytes function is dependent only on a single input byte, whereas a given output byte of the ShiftRows function is dependent upon potentially all of the bytes in a row of cipher state 1012. Consequently, if SubBytes is implemented prior to ShiftRows within cipher pipeline 312, it may be necessary to perform SubBytes on all columns of cipher state 1012 before ShiftRows begins. This may in turn require additional temporary storage in addition to cipher state 1012 in which columns of state on which SubBytes has already been performed may be held while remaining columns are processed. Such additional storage may partially negate the area benefit realized by implementing fewer columns. Additionally, delaying execution of ShiftRows until SubBytes has been performed on all of cipher state 1012 may lengthen the execution pipeline, increasing the latency of algorithm execution.

Because the SubBytes function, in AES, is an independent mapping of an input byte to an output byte, the result of performing SubBytes followed by ShiftRows on all columns of cipher state 1012 is equivalent to the result of performing ShiftRows followed by SubBytes, even though the intermediate results may differ. Since cipher state 1012 includes all columns of the cipher state, implementing ShiftRows (which may depend on multiple columns) prior to SubBytes (which does not) may avoid the need for temporary storage and possible pipeline delays described above. In the illustrated embodiment, SR logic 1032 may be configured to perform the ShiftRows function with respect to two output columns at a time, referring to all columns of cipher state 1012 as necessary for a given row. Subsequently, SB logic 1034 and MC/ARK logic 1036 may perform their steps of the AES algorithm on two columns at any given time. Accordingly, as described above, the AES_ROUND instructions may operate on either columns 0 and 1, or columns 2 and 3 concurrently.

The following exemplary SPARC assembly language code sequences illustrate the use of the AES_ROUND instructions for encryption. The following code sequence illustrates encrypting a 128-bit block of clear text using the expanded set of keys generated from a 128-bit AES cipher key.

```
AES-128 Encryption
           !# Expanded keys in F0 thru F42
setx          cleartext,%g1,    %l4      !# Load 128-bit
                                              cleartext
ldd           [%l4 + 0x000],    %f52
ldd           [%l4 + 0x008],    %f54
run_cipher:
fxor          %f0, %f52,        %f52     !# initial ARK
fxor          %f2 , %f54,       %f54
aes_eround01  %f4 , %f52, %f54, %f56     !# Round 1
aes_eround23  %f6 , %f52, %f54, %f58
aes_eround01  %f8 , %f56, %f58, %f52     !# Round 2
aes_eround23  %f10, %f56, %f58, %f54
aes_eround01  %f12, %f52, %f54, %f56     !# Round 3
aes_eround23  %f14, %f52, %f54, %f58
aes_eround01  %f16, %f56, %f58, %f52     !# Round 4
aes_eround23  %f18, %f56, %f58, %f54
aes_eround01  %f20, %f52, %f54, %f56     !# Round 5
aes_eround23  %f22, %f52, %f54, %f58
aes_eround01  %f24, %f56, %f58, %f52     !# Round 6
```

```
aes_eround23       %f26, %f56, %f58, %f54
aes_eround01       %f28, %f52, %f54, %f56   !# Round 7
aes_eround23       %f30, %f52, %f54, %f58
aes_eround01       %f32, %f56, %f58, %f52   !# Round 8
aes_eround23       %f34, %f56, %f58, %f54
aes_eround01       %f36, %f52, %f54, %f56   !# Round 9
aes_eround23       %f38, %f52, %f54, %f58
aes_eround01_last  %f40, %f56, %f58, %f52   !# Round 10
aes_eround23_last  %f42, %f56, %f58, %f54
```

The following exemplary SPARC assembly language code sequence illustrates the use of the AES_ROUND instructions to encrypt a 128-bit block of clear text using the expanded set of keys generated from a 192-bit AES cipher key.

```
AES-192 Encryption
           !# Expanded keys in F0 thru F50
    setx        cleartext,%g1,    %l4        !# Load 128-bit
                                                cleartext
    ldd         [%l4 + 0x000],    %f52
    ldd         [%l4 + 0x008],    %f54
run_cipher:
    fxor        %f0, %f52,        %f52       !# initial ARK
    fxor        %f2, %f54,        %f54
    aes_eround01   %f4,  %f52, %f54, %f56    !# Round 1
    aes_eround23   %f6 , %f52, %f54, %f58
    aes_eround01   %f8 , %f56, %f58, %f52    !# Round 2
    aes_eround23   %f10, %f56, %f58, %f54
    aes_eround01   %f12, %f52, %f54, %f56    !# Round 3
    aes_eround23   %f14, %f52, %f54, %f58
    aes_eround01   %f16, %f56, %f58, %f52    !# Round 4
    aes_eround23   %f18, %f56, %f58, %f54
    aes_eround01   %f20, %f52, %f54, %f56    !# Round 5
    aes_eround23   %f22, %f52, %f54, %f58
    aes_eround01   %f24, %f56, %f58, %f52    !# Round 6
    aes_eround23   %f26, %f56, %f58, %f54
    aes_eround01   %f28, %f52, %f54, %f56    !# Round 7
    aes_eround23   %f30, %f52, %f54, %f58
    aes_eround01   %f32, %f56, %f58, %f52    !# Round 8
    aes_eround23   %f34, %f56, %f58, %f54
    aes_eround01   %f36, %f52, %f54, %f56    !# Round 9
    aes_eround23   %f38, %f52, %f54, %f58
    aes_eround01   %f40, %f56, %f58, %f52    !# Round 10
    aes_eround23   %f42, %f56, %f58, %f54
    aes_eround01   %f44, %f52, %f54, %f56    !# Round 11
    aes_eround23   %f46, %f52, %f54, %f58
    aes_eround01_last  %f48, %f56, %f58, %f52  !# Round 12
    aes_eround23_last  %f50, %f56, %f58, %f54
```

The following exemplary SPARC assembly language code sequence illustrates the use of the AES_ROUND instructions to encrypt a 128-bit block of clear text using the expanded set of keys generated from a 256-bit AES cipher key.

```
AES-256 Encryption
           !# Expanded keys in o0, o1, and F0 thru F50
    setx        cleartext,%g1,    %l4        !# Load 128-bit
                                                cleartext
    ldd         [%l4 + 0x000],    %o2
    ldd         [%l4 + 0x008],    %o3
run_cipher:
    xor         %o0, %o2,         %o2        !# initial ARK
    xor         %o1, %o3,         %o3
    movxtod     %o2, %f56
    movxtod     %o3, %f58
    aes_eround01   %f0 , %f56, %f58, %f60    !# Round 1
    aes_eround23   %f2 , %f56, %f58, %f62
    aes_eround01   %f4 , %f60, %f62, %f56    !# Round 2
    aes_eround23   %f6 , %f60, %f62, %f58
    aes_eround01   %f8 , %f56, %f58, %f60    !# Round 3
    aes_eround23   %f10, %f56, %f58, %f62
    aes_eround01   %f12, %f60, %f62, %f56    !# Round 4
    aes_eround23   %f14, %f60, %f62, %f58
    aes_eround01   %f16, %f56, %f58, %f60    !# Round 5
    aes_eround23   %f18, %f56, %f58, %f62
    aes_eround01   %f20, %f60, %f62, %f56    !# Round 6
    aes_eround23   %f22, %f60, %f62, %f58
    aes_eround01   %f24, %f56, %f58, %f60    !# Round 7
    aes_eround23   %f26, %f56, %f58, %f62
    aes_eround01   %f28, %f60, %f62, %f56    !# Round 8
    aes_eround23   %f30, %f60, %f62, %f58
    aes_eround01   %f32, %f56, %f58, %f60    !# Round 9
    aes_eround23   %f34, %f56, %f58, %f62
    aes_eround01   %f36, %f60, %f62, %f56    !# Round 10
    aes_eround23   %f38, %f60, %f62, %f58
    aes_eround01   %f40, %f56, %f58, %f60    !# Round 11
    aes_eround23   %f42, %f56, %f58, %f62
    aes_eround01   %f44, %f60, %f62, %f56    !# Round 12
    aes_eround23   %f46, %f60, %f62, %f58
    aes_eround01   %f48, %f56, %f58, %f60    !# Round 13
    aes_eround23   %f50, %f56, %f58, %f62
    aes_eround01_last  %f52, %f60, %f62, %f56  !# Round 14
    aes_eround23_last  %f54, %f60, %f62, %f58
```

The following exemplary SPARC assembly language code sequences illustrate the use of the AES_ROUND instructions for decryption. The following code sequence illustrates decrypting a 128-bit block of cipher text using the expanded set of keys generated from a 128-bit AES cipher key.

```
AES-128 Decryption
           !# Expanded keys in F0 thru F42
    setx        ciphertext,%g1,   %l4        !# Load 128-bit
                                                ciphertext
    ldd         [%l4 + 0x000],    %f52
    ldd         [%l4 + 0x008],    %f54
run_cipher:
    fxor        %f42, %f54,       %f54       !# initial ARK
    fxor        %f40, %f52,       %f52
    aes_dround23   %f38, %f52, %f54, %f58    !# Round 1
    aes_dround01   %f36, %f52, %f54, %f56
    aes_dround23   %f34, %f56, %f58, %f54    !# Round 2
    aes_dround01   %f32, %f56, %f58, %f52
    aes_dround23   %f30, %f52, %f54, %f58    !# Round 3
    aes_dround01   %f28, %f52, %f54, %f56
    aes_dround23   %f26, %f56, %f58, %f54    !# Round 4
    aes_dround01   %f24, %f56, %f58, %f52
    aes_dround23   %f22, %f52, %f54, %f58    !# Round 5
    aes_dround01   %f20, %f52, %f54, %f56
    aes_dround23   %f18, %f56, %f58, %f54    !# Round 6
    aes_dround01   %f16, %f56, %f58, %f52
    aes_dround23   %f14, %f52, %f54, %f58    !# Round 7
    aes_dround01   %f12, %f52, %f54, %f56
    aes_dround23   %f10, %f56, %f58, %f54    !# Round 8
    aes_dround01   %f8 , %f56, %f58, %f52
    aes_dround23   %f6 , %f52, %f54, %f58    !# Round 9
    aes_dround01   %f4 , %f52, %f54, %f56
    aes_dround23_last  %f2 , %f56, %f58, %f54  !# Round 10
    aes_dround01_last  %f0 , %f56, %f58, %f52
```

The following exemplary SPARC assembly language code sequence illustrates the use of the AES_ROUND instructions to decrypt a 128-bit block of cipher text using the expanded set of keys generated from a 192-bit AES cipher key.

```
AES-192 Decryption
           !# Expanded keys in F0 thru F50
    setx        ciphertext,%g1,   %l4        !# Load 128-bit
                                                ciphertext
    ldd         [%l4 + 0x000],    %f52
    ldd         [%l4 + 0x008],    %f54
run_cipher:
```

-continued

```
fxor              %f50, %f54,   %f54        !# initial ARK
fxor              %f48, %f52,   %f52
aes_dround23      %f46, %f52, %f54, %f58    !# Round 1
aes_dround01      %f44, %f52, %f54, %f56
aes_dround23      %f42, %f56, %f58, %f54    !# Round 2
aes_dround01      %f40, %f56, %f58, %f52
aes_dround23      %f38, %f52, %f54, %f58    !# Round 3
aes_dround01      %f36, %f52, %f54, %f56
aes_dround23      %f34, %f56, %f58, %f54    !# Round 4
aes_dround01      %f32, %f56, %f58, %f52
aes_dround23      %f30, %f52, %f54, %f58    !# Round 5
aes_dround01      %f28, %f52, %f54, %f56
aes_dround23      %f26, %f56, %f58, %f54    !# Round 6
aes_dround01      %f24, %f56, %f58, %f52
aes_dround23      %f22, %f52, %f54, %f58    !# Round 7
aes_dround01      %f20, %f52, %f54, %f56
aes_dround23      %f18, %f56, %f58, %f54    !# Round 8
aes_dround01      %f16, %f56, %f58, %f52
aes_dround23      %f14, %f52, %f54, %f58    !# Round 9
aes_dround01      %f12, %f52, %f54, %f56
aes_dround23      %f10, %f56, %f58, %f54    !# Round 10
aes_dround01      %f8 , %f56, %f58, %f52
aes_dround23      %f6 , %f52, %f54, %f58    !# Round 11
aes_dround01      %f4 , %f52, %f54, %f56
aes_dround23_last %f2 , %f56, %f58, %f54    !# Round 12
aes_dround01_last %f0 , %f56, %f58, %f52
```

The following exemplary SPARC assembly language code sequence illustrates the use of the AES_ROUND instructions to decrypt a 128-bit block of cipher text using the expanded set of keys generated from a 256-bit AES cipher key.

```
AES-256 Decryption
       !# Expanded keys in o0, o1, and F0 thru F50
setx              ciphertext,%g1,  %l4      !# Load 128-bit
                                              ciphertext
ldd               [%l4 + 0x000],   %o2
ldd               [%l4 + 0x008],   %o3
run_cipher:
xor               %o0,  %o2,  %o2           !# initial ARK
xor               %o1,  %o3,  %o3
movxtod           %o2,  %f56
movxtod           %o3,  %f58
aes_dround23      %f54, %f56, %f58, %f62    !# Round 1
aes_dround01      %f52, %f56, %f58, %f60
aes_dround23      %f50, %f60, %f62, %f58    !# Round 2
aes_dround01      %f48, %f60, %f62, %f56
aes_dround23      %f46, %f56, %f58, %f62    !# Round 3
aes_dround01      %f44, %f56, %f58, %f60
aes_dround23      %f42, %f60, %f62, %f58    !# Round 4
aes_dround01      %f40, %f60, %f62, %f56
aes_dround23      %f38, %f56, %f58, %f62    !# Round 5
aes_dround01      %f36, %f56, %f58, %f60
aes_dround23      %f34, %f60, %f62, %f58    !# Round 6
aes_dround01      %f32, %f60, %f62, %f56
aes_dround23      %f30, %f56, %f58, %f62    !# Round 7
aes_dround01      %f28, %f56, %f58, %f60
aes_dround23      %f26, %f60, %f62, %f58    !# Round 8
aes_dround01      %f24, %f60, %f62, %f56
aes_dround23      %f22, %f56, %f58, %f62    !# Round 9
aes_dround01      %f20, %f56, %f58, %f60
aes_dround23      %f18, %f60, %f62, %f58    !# Round 10
aes_dround01      %f16, %f60, %f62, %f56
aes_dround23      %f14, %f56, %f58, %f62    !# Round 11
aes_dround01      %f12, %f56, %f58, %f60
aes_dround23      %f10, %f60, %f62, %f58    !# Round 12
aes_dround01      %f8 , %f60, %f62, %f56
aes_dround23      %f6 , %f56, %f58, %f62    !# Round 13
aes_dround01      %f4 , %f56, %f58, %f60
aes_dround23_last %f2 , %f60, %f62, %f58    !# Round 14
aes_dround01_last %f0 , %f60, %f62, %f56
```

Referring to FIG. 12, a pipeline diagram illustrating the execution of the AES_EROUND instruction by one embodiment of cipher pipeline 312 is shown. In the illustrated diagram, the cipher pipeline 312 is executing the AES_EROUND01 and AES_EROUND23 instructions as part of the iterative loop of the AES encryption algorithm. In this exemplary diagram, in each pipeline stage a single set of columns 0, 1 and 2, 3 are operated on followed by last round instructions. As shown, in stage 0 an AES_EROUND01 instruction enters the pipeline in cycle 1, and an AES_EROUND23 enters the pipeline in cycle 2. During cycle 2, an AES_EROUND01 instruction enters stage 1 of the pipeline and in cycle 3 an AES_EROUND23 enters stage 1 of the pipeline. Further in cycle 3, an AES_EROUND01 instruction enters stage 2 of the pipeline, and in cycle 4, an AES_EROUND23 enters stage 2 of the pipeline. It is noted that in other embodiments, the pipeline timing may be different. For example, other numbers of pipeline "bubbles" may be inserted between instruction pairs. Accordingly, where there is a single bubble shown in cycles 3, 4, and 5 of stages 0, 1, and 2, respectively, both cycles 3 and 4 of stage 0, and so on, may have bubbles.

In some embodiments, the area required by cipher pipeline 312 may be reduced still further. It is noted that in other embodiments, each stage of cipher pipeline 312 may be configured to concurrently process one column of cipher state 1012, instead of two. The details of configuration and operation of the illustrated embodiment are analogous to those of the embodiment of FIG. 10, with the exception that SR logic 1032 may select one column per cycle from cipher state 1012, and SB logic 1034 and MC/ARK logic 1036 may each process one column per cycle. In such an embodiment, a given round would take more cycles to complete than the two columns per cycle embodiment described above.

It is contemplated that in other embodiments, different numbers of columns may be implemented for concurrent execution within cipher pipeline 312. For example, if cipher state 1012 included six columns, different area vs. latency tradeoffs may be achieved by implementing one, two or three columns for concurrent execution within cipher pipeline 312. It is also possible to implement more than half, but fewer than all columns of cipher state 1012 for concurrent execution, although these solutions may be less than optimal tradeoffs of area vs. latency.

Figure 13A:
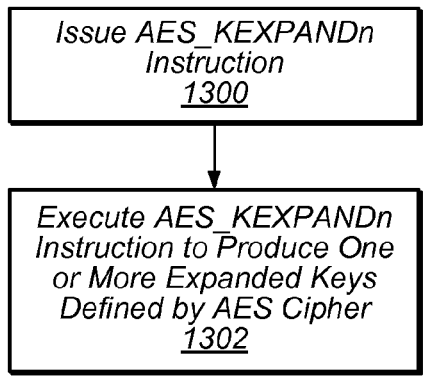
FIG. 13A is a flow diagram describing the operation of one embodiment of a processor configured to provide instruction-level support for AES key expansion.

Turning to FIG. 13A, a flow diagram illustrating the operation of one embodiment of a processor configured to provide instruction-level support for AES key expansion is shown. Operation begins in block 1300 where an AES_KEXPANDn instruction, defined within the processor's ISA, is issued to a cryptographic unit for execution. For example, in one embodiment, a programmer may specify one of three AES_KEXPANDn instructions (e.g., AES_KEXPAND0, AES_KEXPAND1, AES_KEXPAND2) within an executable thread of code such that the instruction is fetched by instruction fetch unit 200 of processor 10, and ultimately issued by issue unit 230 to FGU 255 for execution.

In response to receiving the issued AES_KEXPANDn instruction, the cryptographic unit executes the AES_KEXPANDn instruction to produce one or more of the expanded keys defined by the AES cipher (block 1302). More particularly, in one embodiment, AES engine 310 within FGU 255 may be configured to execute the AES_KEXPANDn instruction as previously described, which may include performing different types of functions depending on which AES_KEXPANDn instruction as specified by the instruction operands is executed. In various embodiments, executing the AES_KEXPANDn instruction may include reading instruction operands from a register file, an operand bypass unit, or another operand source, as well as writing a result to working storage or to another destination.

Figure 13B:
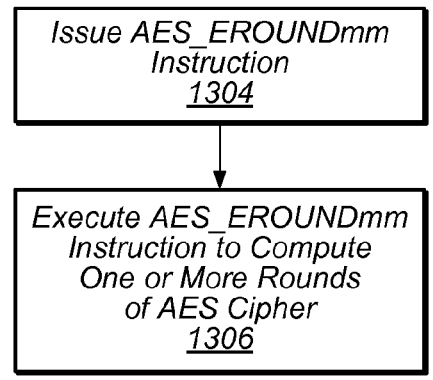
FIG. 13B is a flow diagram describing the operation of one embodiment of a processor configured to provide instruction-level support for AES encryption.

Referring to FIG. 13B, a flow diagram illustrating the operation of one embodiment of a processor configured to provide instruction-level support for the AES encryption operation is shown. Operation begins in block 1304 where an AES_EROUNDmm instruction, defined within the processor's ISA, is issued to a cryptographic unit for execution. For example, in one embodiment, a programmer may specify one of several AES_EROUNDmm instructions (e.g., AES_EROUND01, AES_EROUND23, AES_EROUND01_LAST, and AES_EROUND23_LAST) within an executable thread of code such that the instruction is fetched by instruction fetch unit 200 of processor 10, and ultimately issued by issue unit 230 to FGU 255 for execution.

In response to receiving the issued AES_EROUNDmm instruction, the cryptographic unit executes the AES_EROUNDmm instruction to apply the transformation operations to the specified input value (block 1306). For example, AES engine 310 within FGU 255 may be configured to execute the AES_EROUNDmm instructions as previously described to encrypt blocks of clear text. In various embodiments, executing the AES_EROUNDmm instructions may include reading instruction operands from a register file, an operand bypass unit, or another operand source, as well as writing a result to working storage or to another destination.

Figure 13C:
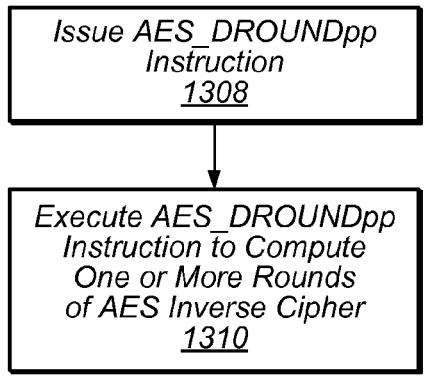
FIG. 13C is a flow diagram describing the operation of one embodiment of a processor configured to provide instruction-level support for AES decryption.

Referring to FIG. 13C, a flow diagram illustrating the operation of one embodiment of a processor configured to provide instruction-level support for the AES decryption operation is shown. Operation begins in block 1308 where an AES_DROUNDpp instruction, defined within the processor's ISA, is issued to a cryptographic unit for execution. For example, in one embodiment, a programmer may specify one of several AES_DROUNDpp instructions (e.g., AES_DROUND01, AES_DROUND23, AES_DROUND01_LAST, and AES_DROUND23_LAST) within an executable thread of code such that the instruction is fetched by instruction fetch unit 200 of processor 10, and ultimately issued by issue unit 230 to FGU 255 for execution.

In response to receiving the issued AES_DROUNDpp instruction, the cryptographic unit executes the AES_DROUNDpp instruction to apply the transformation operations to the specified input value (block 1310). For example, AES engine 310 within FGU 255 may be configured to execute the AES_DROUNDpp instructions as previously described to decrypt blocks of cipher text using, for example, inverse cipher functions. In various embodiments, executing the AES_DROUNDpp instructions may include reading instruction operands from a register file, an operand bypass unit, or another operand source, as well as writing a result to working storage or to another destination.

It is noted that the cipher algorithms described above may be implemented using a number of chaining modes. For example, various applications may call for various levels of message confidentiality and/or message integrity. Since block ciphers encrypt each block the same way with the same key, when multiple blocks will be encrypted using a single key, it may be possible to distinguish patterns in the encrypted data. One way to mitigate that is to use information from a previous block encryption to somehow change the new data block for the next encryption in a reproducible way. Accordingly, chaining modes may be used, which may use some combination of the plain text of a new block of data and the cipher text of a previous block. There are a number of well-known chaining modes such as cipher-block chaining (CBC), counter (CTR), cipher feedback (CFB), to name a few. Due to the large number of possible chaining modes that may be required by different applications, to maintain flexibility, in the embodiments of processor 10 described above, chaining modes may be handled external to the cryptographic unit in software.

Instruction Support for Cyclic Redundancy Check (CRC)

As shown in FIG. 3, in one embodiment, SPU 300 includes CRC engine 335 that is configured to execute one or more instructions used to perform a CRC operation. (When a functional unit is described as "executing" a particular instruction, this term refers to computing a result of the particular instruction; when a processor is described as "executing" a particular instruction, this term includes all actions that may be performed to effectuate the completion of the instruction, including fetch, decode, issue, as well as actually computing the result of the instruction.) As used herein, a "CRC operation" includes a division operation (in which the divisor may be referred to as the "generator polynomial" for the CRC operation being performed) that produces a remainder that is a "checksum value." As is known in the art, a checksum value (which, as described below, may either be an intermediate checksum value or a final checksum value) is a value that is usable to detect errors in a set of data. For example, if a set of data S is sent to processor 10 along with a CRC value C for data S, a CRC operation may be performed on S to produce a checksum value, which may then be compared with value C. If the checksum value is the same as C, S may be presumed to have no errors; conversely, if the checksum value is different from C, S is known to include one or more errors.

In one embodiment, CRC engine 335 is configured to support CRC-32C, which is a CRC algorithm in which the generator polynomial is 0x11EDC6F41. In other embodiments, CRC engine 335 may be configured to provide support for other CRC algorithms known in the art. The one or more instructions executable by CRC engine 335 are defined within the ISA implemented by processor 10, such that processor 10 is configured to provide specific instruction-level support for performing one or more CRC operations. As described in greater detail below, in such an implementation, a user of processor 10 may be able to specify a smaller number of instructions to perform a CRC algorithm than would be required for an ISA that lacked CRC instruction-level support. In turn, this instruction-level support may result in more compact code and/or faster execution.

In the following discussion, the general operation of CRC is first described. Embodiments of CRC engine 335 are then discussed, including code examples that include a CRC instruction supported by CRC engine 335.

CRC Checksum Value Generation

As noted above, a CRC is an algorithm that is used to check the integrity of data through the usage of a checksum value. CRC is used in a variety of applications ranging from networking systems (such as Ethernet) to storages systems (such as iSCSI). For example, CRC may be used to check the integrity of a transmitted packet of data to ensure that the packet is error free upon arrive at its destination. Additionally, CRC may be used to verify the integrity of data after being stored in a storage device.

In one embodiment, a CRC algorithm includes generating a checksum value from a message by applying a hash function to the message. (This hash function may be non-secure in some embodiments.) The integrity of the message can later be verified by applying the hash function to the message and comparing the newly-generated checksum value with the previously-generated checksum value (that may have been sent along with the message). If the two values match, then the message is likely error free. On the other hand, if the two values do not match, then the message has changed since the creation of the initial checksum value and thus includes one or more errors.

To generate a checksum value in one embodiment of a CRC, a message is divided by a generator polynomial using modulo 2 arithmetic, where the remainder of the division operation is the checksum value. Modulo 2 arithmetic differs from traditional arithmetic in that it is carry-less—e.g., 1+1=0, 0−1=1, etc. Thus, addition and subtraction operations become XOR operations. A non-limiting example of performing a CRC operation is presented below, in which the binary message 11010011101100 is divided by the binary generator polynomial 1011 to generate the checksum value 0101. (This example is a simplified one; the sizes of messages and generator polynomials are typically much larger).

```
              00011110001111
      1011|11010011101100
           1011
           01100
            1011
            01110
             1011
             01011
              1011
              00001101
                 1011
                 01101
                  1011
                  01100
                   1011
                   01110
                    1011
                    0101
```

Here, the remainder 0101 is calculated from the message 11010011101100 by performing division using XOR operations. This remainder may then be appended to the message upon being sent, thus permitting a check of the message by a receiver of the message. The quotient 00011110001111, however, is discarded and thus not used in the CRC algorithm.

Multiple techniques for optimizing this division operation have been developed to reduce the amount of needed storage and the computational complexity of performing the operation. In one approach, a combination of shift and XOR operations may be performed in which bits of an input message are shifted through a register and an XOR operation is performed between the contents of the register and the generator polynomial every time a one is shifted out. For example, the bits of the message 11010011101100 may be shifted from right to left through the 3-bit shift register according to the accompanying pseudo code.

Division pseudo code:

```
Load the register with zero bits.
While (more message bits)
  Begin
    Shift the register left by one bit, reading the next bit of the
  message into register bit position 0.
    If (a 1 bit popped out of the register during the shift)
      Register = Register XOR Poly.
  End
The register now contains the remainder.
```

In this example, each time a one shifts out of the left side of the 3-bit register, an XOR operation is performed between the portion of the message within the register and the three lower order bits of the generator polynomial. Thus, when a one is shifted out and the contents of the register are 101, an XOR is performed between 101 and 011. The result of the XOR operation is then stored in the register. Once the entire message has shifted through the register, the remaining value in the register is the remainder of the division operation—i.e., the checksum value.

There are many variations of CRC algorithms that are known in the art, such as CRC-24, CRC-32C, CRC-32-IEEE 802.3, CRC-32K, etc. CRC algorithms may use different generator polynomials—e.g., the generator polynomial 0x11EDC6F41 is used in CRC-32C, while the generator polynomial 0x04C11 DB7 is used in CRC-32-IEEE. CRC algorithms may modify the message before and/or after performing the division operation on the message by performing an XOR operation or padding a message with additional content. In CRC-32C, for example, an initial XOR operation is performed between the message and some initial value—e.g., FFFFFFFF (all 1's). CRC32-C then concludes by performing a final XOR between the remainder of the division operation and some final value—e.g., FFFFFFFF. Other variations of CRC-32C are possible.

CRC Engine Instruction Support

In some embodiments, CRC functionality described above may be implemented by standard arithmetic and logical instructions that may be provided by a processor's ISA. For example, the various functions performed to generate a CRC checksum value may be implemented through successive applications of XOR and shift instructions.

However, performing a CRC operation using general-purpose ISA instructions may require numerous instructions as well as a substantial number of cycles to execute those instructions, diminishing CRC performance. By contrast, in one embodiment, CRC engine 335 is configured to provide support for certain ISA instructions (that is, "architected instructions") that are particular to CRC, such that execution of individual ones of the CRC-specific instructions results in CRC engine 335 performing an entire CRC operation or portions of a CRC operation. Thus, for at least some embodiments of CRC engine 335, executing a CRC-specific instruction to perform a CRC operation may accomplish more of the work per instruction than in the case of using general-purpose ISA instructions to perform a CRC operation.

Figure 14A:
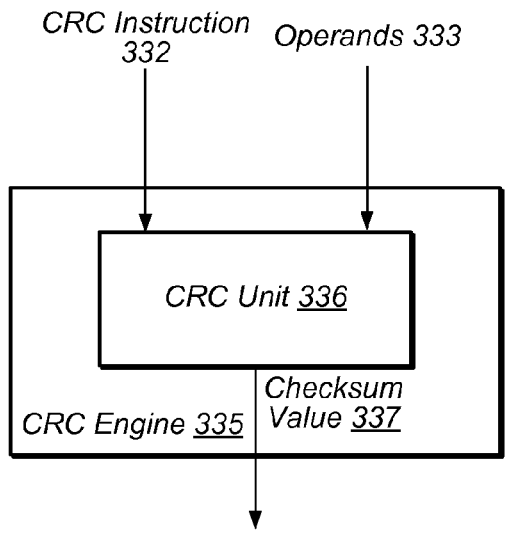
FIG. 14A is a block diagram of one embodiment of a cryptographic engine configured to execute one or more instructions to perform a cyclic redundancy check (CRC).

One such embodiment of CRC engine 335 is illustrated in FIG. 14A, where CRC engine 335 is shown to include a CRC unit 336. In one embodiment, CRC unit 336 is configured to execute a CRC instruction defined within the ISA of processor 10, where the CRC instruction is executable to perform a CRC operation on a set of data that produces a checksum value. In one embodiment, CRC unit 336 is configured to perform a CRC operation in accordance with the CRC-32C algorithm. In other embodiments, CRC unit 336 is configured to perform a CRC operation in accordance with other CRC algorithms known in the art, such as CRC-32-IEEE 802.3, CRC-32K, etc.

In one embodiment, CRC unit 336 is configured to receive control data 332 and one or more operands 333 and to output checksum value 337. In one embodiment, control data 332 may be an opcode value that allows CRC unit 336 to directly decode the CRC instruction from opcode bits sent from upstream pipeline stages. In another embodiment, control data 332 may be an already-decoded or partially-decoded signal indicative of the occurrence of a CRC instruction. Similarly, CRC unit 336 may receive various types of operands 333. For example, operands 333 may include an initialization vector operand that specifies an initial value to be used in performing a CRC operation, as well as a data operand for a set of data on which the CRC operation is to be performed. In some instances, operands 333 may include additional operands, such as an operand that identifies the generator polynomial to be used. In some embodiments, the CRC instruction supported by unit 336 may specify source operands by identifying one or more architectural registers (e.g., floating-point or integer registers) storing source operands. For example, a CRC instruction supported by unit 336 using the mnemonic crc32c may be in the form crc32c % f0, % f2, % f4, where % f0 is a floating-point register storing the initialization vector, % f2 is a floating-point register storing the set of data to be operated upon, and % f4 is a floating-point register used to store the result (i.e., the generated checksum value 337). In one possible instruction sequence, the generated checksum value 337 is stored in the same register that initially stored the initialization vector or the set of data. Note that operands 333 may also include, in some instances, one or more immediate values. For example, in one embodiment CRC unit 336 may support a CRC instruction, which includes a 13-bit immediate operand.

Figure 14B:
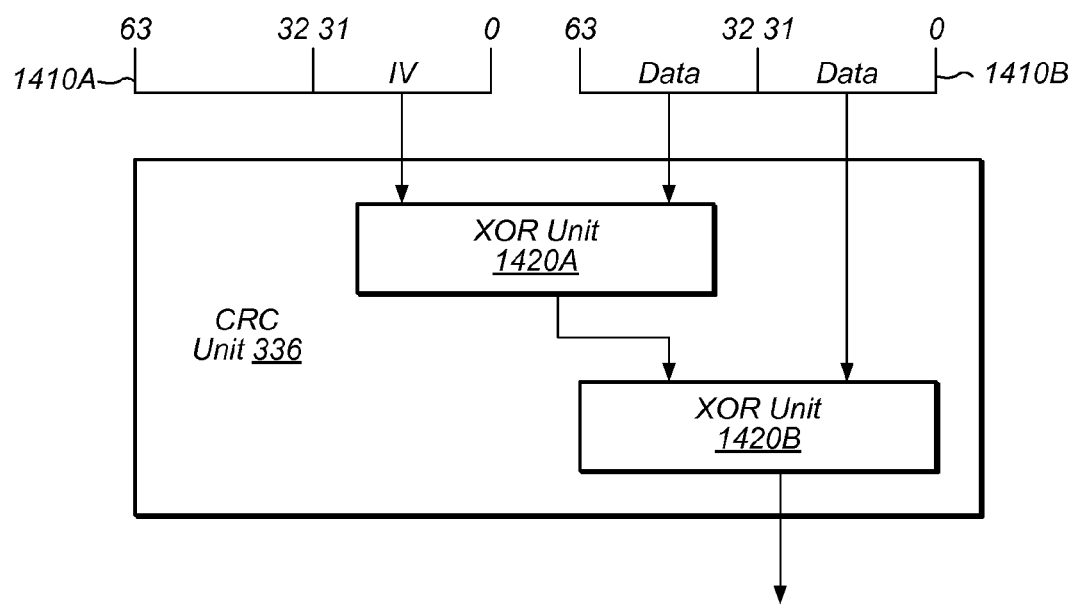
FIG. 14B is a block diagram of one embodiment of a CRC unit.

FIG. 14B illustrates one embodiment of a CRC unit 336 that includes XOR units 1420A and 1420B. In the illustrated embodiment, CRC unit 336 is configured to perform a CRC operation by performing a first and second set of XOR operations using XOR units 1420A and 1420B. As shown, XOR unit 1420A receives an initialization vector (IV), which, in this embodiment, is stored in the low-order bits 31-0 of register 1410A. Unit 1420A also receives the high-order bits of register 1410B, and is configured to perform, in this embodiment, a first set of bit-wise XOR operations on the two sets of incoming 32-bit data, outputting a 32-bit XOR value to XOR unit 1420B. Unit 1420B is configured to perform a second set of bit-wise XOR operations on the output of unit 1420A and the low-order bits stored in register 1410B. In one embodiment, XOR units 1420 are configured to perform the sets XOR operations in accordance with the exemplary code sequence presented below:

```
//////////////////////////////////////////////////////////
//File: CRC32_D32.v
//Date: Tue Feb 26 02:50:08 2002
//
//Copyright (C) 1999 Easics NV.
//This source file may be used and distributed without restriction
//provided that this copyright statement is not removed from the file
//and that any derivative work contains the original copyright notice
//and the associated disclaimer.
//
//THIS SOURCE FILE IS PROVIDED "AS IS" AND WITHOUT ANY EXPRESS
//OR IMPLIED WARRANTIES, INCLUDING, WITHOUT LIMITATION, THE IMPLIED
//WARRANTIES OF MERCHANTIBILITY AND FITNESS FOR A PARTICULAR PURPOSE.
//
//Purpose: Verilog module containing a synthesizable CRC function       //*
polynomial: p(0 to 32) := "100000101111011000111011011110001"   //*
data width: 32
//
//Info: jand@easics.be (Jan Decaluwe)
//http://www.easics.com
//////////////////////////////////////////////////////////
module CRC32_D32;
// polynomial: p(0 to 32) := "100000101111011000111011011110001"
// data width: 32
// convention: the first serial data bit is D[31]
function [31:0] nextCRC32_D32;
input [31:0] Data;
input [31:0] CRC;
reg [31:0] D;
reg [31:0] C;
reg [31:0] NewCRC;
begin
D = Data;
C = CRC;
NewCRC[0] = D[31] ^ D[30] ^ D[28] ^ D[27] ^ D[26] ^ D[25] ^ D[23] ^
   D[21] ^ D[18] ^ D[17] ^ D[16] ^ D[12] ^ D[9] ^ D[8] ^
   D[7] ^ D[6] ^ D[5] ^ D[4] ^ D[0] ^ C[0] ^ C[4] ^ C[5] ^
   C[6] ^ C[7] ^ C[8] ^ C[9] ^ C[12] ^ C[16] ^ C[17] ^
   C[18] ^ C[21] ^ C[23] ^ C[25] ^ C[26] ^ C[27] ^ C[28] ^
   C[30] ^ C[31];
NewCRC[1] = D[31] ^ D[29] ^ D[28] ^ D[27] ^ D[26] ^ D[24] ^ D[22] ^
   D[19] ^ D[18] ^ D[17] ^ D[13] ^ D[10] ^ D[9] ^ D[8] ^
   D[7] ^ D[6] ^ D[5] ^ D[1] ^ C[1] ^ C[5] ^ C[6] ^ C[7] ^
   C[8] ^ C[9] ^ C[10] ^ C[13] ^ C[17] ^ C[18] ^ C[19] ^
   C[22] ^ C[24] ^ C[26] ^ C[27] ^ C[28] ^ C[29] ^ C[31];
NewCRC[2] = D[30] ^ D[29] ^ D[28] ^ D[27] ^ D[25] ^ D[23] ^ D[20] ^
   D[19] ^ D[18] ^ D[14] ^ D[11] ^ D[10] ^ D[9] ^ D[8] ^
   D[7] ^ D[6] ^ D[2] ^ C[2] ^ C[6] ^ C[7] ^ C[8] ^ C[9] ^
   C[10] ^ C[11] ^ C[14] ^ C[18] ^ C[19] ^ C[20] ^ C[23] ^
   C[25] ^ C[27] ^ C[28] ^ C[29] ^ C[30];
NewCRC[3] = D[31] ^ D[30] ^ D[29] ^ D[28] ^ D[26] ^ D[24] ^ D[21] ^
   D[20] ^ D[19] ^ D[15] ^ D[12] ^ D[11] ^ D[10] ^ D[9] ^
   D[8] ^ D[7] ^ D[3] ^ C[3] ^ C[7] ^ C[8] ^ C[9] ^ C[10] ^
   C[11] ^ C[12] ^ C[15] ^ C[19] ^ C[20] ^ C[21] ^ C[24] ^
   C[26] ^ C[28] ^ C[29] ^ C[30] ^ C[31];
```

NewCRC[4] = D[31] ^ D[30] ^ D[29] ^ D[27] ^ D[25] ^ D[22] ^ D[21] ^
D[20] ^ D[16] ^ D[13] ^ D[12] ^ D[11] ^ D[10] ^ D[9] ^
D[8] ^ D[4] ^ C[4] ^ C[8] ^ C[9] ^ C[10] ^ C[11] ^
C[12] ^ C[13] ^ C[16] ^ C[20] ^ C[21] ^ C[22] ^ C[25] ^
C[27] ^ C[29] ^ C[30] ^ C[31];
NewCRC[5] = D[31] ^ D[30] ^ D[28] ^ D[26] ^ D[23] ^ D[22] ^ D[21] ^
D[17] ^ D[14] ^ D[13] ^ D[12] ^ D[11] ^ D[10] ^ D[9] ^
D[5] ^ C[5] ^ C[9] ^ C[10] ^ C[11] ^ C[12] ^ C[13] ^
C[14] ^ C[17] ^ C[21] ^ C[22] ^ C[23] ^ C[26] ^ C[28] ^
C[30] ^ C[31];
NewCRC[6] = D[30] ^ D[29] ^ D[28] ^ D[26] ^ D[25] ^ D[24] ^ D[22] ^
D[21] ^ D[17] ^ D[16] ^ D[15] ^ D[14] ^ D[13] ^ D[11] ^
D[10] ^ D[9] ^ D[8] ^ D[7] ^ D[5] ^ D[4] ^ D[0] ^ C[0] ^
C[4] ^ C[5] ^ C[7] ^ C[8] ^ C[9] ^ C[10] ^ C[11] ^
C[13] ^ C[14] ^ C[15] ^ C[16] ^ C[17] ^ C[21] ^ C[22] ^
C[24] ^ C[25] ^ C[26] ^ C[28] ^ C[29] ^ C[30];
NewCRC[7] = D[31] ^ D[30] ^ D[29] ^ D[27] ^ D[26] ^ D[25] ^ D[23] ^
D[22] ^ D[18] ^ D[17] ^ D[16] ^ D[15] ^ D[14] ^ D[12] ^
D[11] ^ D[10] ^ D[9] ^ D[8] ^ D[6] ^ D[5] ^ D[1] ^
C[1] ^ C[5] ^ C[6] ^ C[8] ^ C[9] ^ C[10] ^ C[11] ^
C[12] ^ C[14] ^ C[15] ^ C[16] ^ C[17] ^ C[18] ^ C[22] ^
C[23] ^ C[25] ^ C[26] ^ C[27] ^ C[29] ^ C[30] ^ C[31];
NewCRC[8] = D[25] ^ D[24] ^ D[21] ^ D[19] ^ D[15] ^ D[13] ^ D[11] ^
D[10] ^ D[8] ^ D[5] ^ D[4] ^ D[2] ^ D[0] ^ C[0] ^ C[2] ^
C[4] ^ C[5] ^ C[8] ^ C[10] ^ C[11] ^ C[13] ^ C[15] ^
C[19] ^ C[21] ^ C[24] ^ C[25];
NewCRC[9] = D[31] ^ D[30] ^ D[28] ^ D[27] ^ D[23] ^ D[22] ^ D[21] ^
D[20] ^ D[18] ^ D[17] ^ D[14] ^ D[11] ^ D[8] ^ D[7] ^
D[4] ^ D[3] ^ D[1] ^ D[0] ^ C[0] ^ C[1] ^ C[3] ^ C[4] ^
C[7] ^ C[8] ^ C[11] ^ C[14] ^ C[17] ^ C[18] ^ C[20] ^
C[21] ^ C[22] ^ C[23] ^ C[27] ^ C[28] ^ C[30] ^ C[31];
NewCRC[10] = D[30] ^ D[29] ^ D[27] ^ D[26] ^ D[25] ^ D[24] ^
D[22] ^ D[19] ^ D[17] ^ D[16] ^ D[15] ^ D[7] ^ D[6] ^ D[2] ^
D[1] ^ D[0] ^ C[0] ^ C[1] ^ C[2] ^ C[6] ^ C[7] ^ C[15] ^
C[16] ^ C[17] ^ C[19] ^ C[22] ^ C[24] ^ C[25] ^ C[26] ^
C[27] ^ C[29] ^ C[30];
NewCRC[11] = D[21] ^ D[20] ^ D[12] ^ D[9] ^ D[6] ^ D[5] ^ D[4] ^
D[3] ^ D[2] ^ D[1] ^ D[0] ^ C[0] ^ C[1] ^ C[2] ^ C[3] ^
C[4] ^ C[5] ^ C[6] ^ C[9] ^ C[12] ^ C[20] ^ C[21];
NewCRC[12] = D[22] ^ D[21] ^ D[13] ^ D[10] ^ D[7] ^ D[6] ^ D[5] ^
D[4] ^ D[3] ^ D[2] ^ D[1] ^ C[1] ^ C[2] ^ C[3] ^ C[4] ^
C[5] ^ C[6] ^ C[7] ^ C[10] ^ C[13] ^ C[21] ^ C[22];
NewCRC[13] = D[31] ^ D[30] ^ D[28] ^ D[27] ^ D[26] ^ D[25] ^
D[22] ^ D[21] ^ D[18] ^ D[17] ^ D[16] ^ D[14] ^ D[12] ^ D[11] ^
D[9] ^ D[3] ^ D[2] ^ D[0] ^ C[0] ^ C[2] ^ C[3] ^ C[9] ^
C[11] ^ C[12] ^ C[14] ^ C[16] ^ C[17] ^ C[18] ^ C[21] ^
C[22] ^ C[25] ^ C[26] ^ C[27] ^ C[28] ^ C[30] ^ C[31];
NewCRC[14] = D[30] ^ D[29] ^ D[25] ^ D[22] ^ D[21] ^ D[19] ^
D[16] ^ D[15] ^ D[13] ^ D[10] ^ D[9] ^ D[8] ^ D[7] ^ D[6] ^
D[5] ^ D[3] ^ D[1] ^ D[0] ^ C[0] ^ C[1] ^ C[3] ^ C[5] ^
C[6] ^ C[7] ^ C[8] ^ C[9] ^ C[10] ^ C[13] ^ C[15] ^
C[16] ^ C[19] ^ C[21] ^ C[22] ^ C[25] ^ C[29] ^ C[30];
NewCRC[15] = D[31] ^ D[30] ^ D[26] ^ D[23] ^ D[22] ^ D[20] ^
D[17] ^ D[16] ^ D[14] ^ D[11] ^ D[10] ^ D[9] ^ D[8] ^ D[7] ^
D[6] ^ D[4] ^ D[2] ^ D[1] ^ C[1] ^ C[2] ^ C[4] ^ C[6] ^
C[7] ^ C[8] ^ C[9] ^ C[10] ^ C[11] ^ C[14] ^ C[16] ^
C[17] ^ C[20] ^ C[22] ^ C[23] ^ C[26] ^ C[30] ^ C[31];
NewCRC[16] = D[31] ^ D[27] ^ D[24] ^ D[23] ^ D[21] ^ D[18] ^
D[17] ^ D[15] ^ D[12] ^ D[11] ^ D[10] ^ D[9] ^ D[8] ^ D[7] ^
D[5] ^ D[3] ^ D[2] ^ C[2] ^ C[3] ^ C[5] ^ C[7] ^ C[8] ^
C[9] ^ C[10] ^ C[11] ^ C[12] ^ C[15] ^ C[17] ^ C[18] ^
C[21] ^ C[23] ^ C[24] ^ C[27] ^ C[31];
NewCRC[17] = D[28] ^ D[25] ^ D[24] ^ D[22] ^ D[19] ^ D[18] ^
D[16] ^ D[13] ^ D[12] ^ D[11] ^ D[10] ^ D[9] ^ D[8] ^ D[6] ^
D[4] ^ D[3] ^ C[3] ^ C[4] ^ C[6] ^ C[8] ^ C[9] ^ C[10] ^
C[11] ^ C[12] ^ C[13] ^ C[16] ^ C[18] ^ C[19] ^ C[22] ^
C[24] ^ C[25] ^ C[28];
NewCRC[18] = D[31] ^ D[30] ^ D[29] ^ D[28] ^ D[27] ^ D[21] ^
D[20] ^ D[19] ^ D[18] ^ D[16] ^ D[14] ^ D[13] ^ D[11] ^ D[10] ^
D[8] ^ D[6] ^ D[0] ^ C[0] ^ C[6] ^ C[8] ^ C[10] ^ C[11] ^
C[13] ^ C[14] ^ C[16] ^ C[18] ^ C[19] ^ C[20] ^ C[21] ^
C[27] ^ C[28] ^ C[29] ^ C[30] ^ C[31];
NewCRC[19] = D[29] ^ D[27] ^ D[26] ^ D[25] ^ D[23] ^ D[22] ^
D[20] ^ D[19] ^ D[18] ^ D[16] ^ D[15] ^ D[14] ^ D[11] ^ D[8] ^
D[6] ^ D[5] ^ D[4] ^ D[1] ^ D[0] ^ C[0] ^ C[1] ^ C[4] ^
C[5] ^ C[6] ^ C[8] ^ C[11] ^ C[14] ^ C[15] ^ C[16] ^
C[18] ^ C[19] ^ C[20] ^ C[22] ^ C[23] ^ C[25] ^ C[26] ^
C[27] ^ C[29];

-continued

```
NewCRC[20] = D[31] ^ D[25] ^ D[24] ^ D[20] ^ D[19] ^ D[18] ^
  D[15] ^ D[8] ^ D[4] ^ D[2] ^ D[1] ^ D[0] ^ C[0] ^ C[1] ^ C[2] ^
  C[4] ^ C[8] ^ C[15] ^ C[18] ^ C[19] ^ C[20] ^ C[24] ^
  C[25] ^ C[31];
NewCRC[21] = D[26] ^ D[25] ^ D[21] ^ D[20] ^ D[19] ^ D[16] ^ D[9] ^
  D[5] ^ D[3] ^ D[2] ^ D[1] ^ C[1] ^ C[2] ^ C[3] ^ C[5] ^
  C[9] ^ C[16] ^ C[19] ^ C[20] ^ C[21] ^ C[25] ^ C[26];
NewCRC[22] = D[31] ^ D[30] ^ D[28] ^ D[25] ^ D[23] ^ D[22] ^
  D[20] ^ D[18] ^ D[16] ^ D[12] ^ D[10] ^ D[9] ^ D[8] ^ D[7] ^
  D[5] ^ D[3] ^ D[2] ^ D[0] ^ C[0] ^ C[2] ^ C[3] ^ C[5] ^
  C[7] ^ C[8] ^ C[9] ^ C[10] ^ C[12] ^ C[16] ^ C[18] ^
  C[20] ^ C[22] ^ C[23] ^ C[25] ^ C[28] ^ C[30] ^ C[31];
NewCRC[23] = D[30] ^ D[29] ^ D[28] ^ D[27] ^ D[25] ^ D[24] ^
  D[19] ^ D[18] ^ D[16] ^ D[13] ^ D[12] ^ D[11] ^ D[10] ^ D[7] ^
  D[5] ^ D[3] ^ D[1] ^ D[0] ^ C[0] ^ C[1] ^ C[3] ^ C[5] ^
  C[7] ^ C[10] ^ C[11] ^ C[12] ^ C[13] ^ C[16] ^ C[18] ^
  C[19] ^ C[24] ^ C[25] ^ C[27] ^ C[28] ^ C[29] ^ C[30];
NewCRC[24] = D[31] ^ D[30] ^ D[29] ^ D[28] ^ D[26] ^ D[25] ^
  D[20] ^ D[19] ^ D[17] ^ D[14] ^ D[13] ^ D[12] ^ D[11] ^ D[8] ^
  D[6] ^ D[4] ^ D[2] ^ D[1] ^ C[1] ^ C[2] ^ C[4] ^ C[6] ^
  C[8] ^ C[11] ^ C[12] ^ C[13] ^ C[14] ^ C[17] ^ C[19] ^
  C[20] ^ C[25] ^ C[26] ^ C[28] ^ C[29] ^ C[30] ^ C[31];
NewCRC[25] = D[29] ^ D[28] ^ D[25] ^ D[23] ^ D[20] ^ D[17] ^
  D[16] ^ D[15] ^ D[14] ^ D[13] ^ D[8] ^ D[6] ^ D[4] ^ D[3] ^
  D[2] ^ D[0] ^ C[0] ^ C[2] ^ C[3] ^ C[4] ^ C[6] ^ C[8] ^
  C[13] ^ C[14] ^ C[15] ^ C[16] ^ C[17] ^ C[20] ^ C[23] ^
  C[25] ^ C[28] ^ C[29];
NewCRC[26] = D[31] ^ D[29] ^ D[28] ^ D[27] ^ D[25] ^ D[24] ^
  D[23] ^ D[15] ^ D[14] ^ D[12] ^ D[8] ^ D[6] ^ D[3] ^ D[1] ^
  D[0] ^ C[0] ^ C[1] ^ C[3] ^ C[6] ^ C[8] ^ C[12] ^ C[14] ^
  C[15] ^ C[23] ^ C[24] ^ C[25] ^ C[27] ^ C[28] ^ C[29] ^
  C[31];
NewCRC[27] = D[31] ^ D[29] ^ D[27] ^ D[24] ^ D[23] ^ D[21] ^
  D[18] ^ D[17] ^ D[15] ^ D[13] ^ D[12] ^ D[8] ^ D[6] ^ D[5] ^
  D[2] ^ D[1] ^ D[0] ^ C[0] ^ C[1] ^ C[2] ^ C[5] ^ C[6] ^
  C[8] ^ C[12] ^ C[13] ^ C[15] ^ C[17] ^ C[18] ^ C[21] ^
  C[23] ^ C[24] ^ C[27] ^ C[29] ^ C[31];
NewCRC[28] = D[31] ^ D[27] ^ D[26] ^ D[24] ^ D[23] ^ D[22] ^
  D[21] ^ D[19] ^ D[17] ^ D[14] ^ D[13] ^ D[12] ^ D[8] ^ D[5] ^
  D[4] ^ D[3] ^ D[2] ^ D[1] ^ D[0] ^ C[0] ^ C[1] ^ C[2] ^
  C[3] ^ C[4] ^ C[5] ^ C[8] ^ C[12] ^ C[13] ^ C[14] ^
  C[17] ^ C[19] ^ C[21] ^ C[22] ^ C[23] ^ C[24] ^ C[26] ^
  C[27] ^ C[31];
NewCRC[29] = D[28] ^ D[27] ^ D[25] ^ D[24] ^ D[23] ^ D[22] ^
  D[20] ^ D[18] ^ D[15] ^ D[14] ^ D[13] ^ D[9] ^ D[6] ^ D[5] ^
  D[4] ^ D[3] ^ D[2] ^ D[1] ^ C[1] ^ C[2] ^ C[3] ^ C[4] ^
  C[5] ^ C[6] ^ C[9] ^ C[13] ^ C[14] ^ C[15] ^ C[18] ^
  C[20] ^ C[22] ^ C[23] ^ C[24] ^ C[25] ^ C[27] ^ C[28];
NewCRC[30] = D[29] ^ D[28] ^ D[26] ^ D[25] ^ D[24] ^ D[23] ^
  D[21] ^ D[19] ^ D[16] ^ D[15] ^ D[14] ^ D[10] ^ D[7] ^ D[6] ^
  D[5] ^ D[4] ^ D[3] ^ D[2] ^ C[2] ^ C[3] ^ C[4] ^ C[5] ^
  C[6] ^ C[7] ^ C[10] ^ C[14] ^ C[15] ^ C[16] ^ C[19] ^
  C[21] ^ C[23] ^ C[24] ^ C[25] ^ C[26] ^ C[28] ^ C[29];
NewCRC[31] = D[30] ^ D[29] ^ D[27] ^ D[26] ^ D[25] ^ D[24] ^
  D[22] ^ D[20] ^ D[17] ^ D[16] ^ D[15] ^ D[11] ^ D[8] ^ D[7] ^
  D[6] ^ D[5] ^ D[4] ^ D[3] ^ C[3] ^ C[4] ^ C[5] ^ C[6] ^
  C[7] ^ C[8] ^ C[11] ^ C[15] ^ C[16] ^ C[17] ^ C[20] ^
  C[22] ^ C[24] ^ C[25] ^ C[26] ^ C[27] ^ C[29] ^ C[30];
nextCRC32_D32 = NewCRC;
end
endfunction
```

CRC unit 336 may, of course, employ any of a variety of techniques that are known in the art to generate a checksum value. In various embodiments, CRC unit 336 may support different size operands and include more (or less) XOR units 1420. For example, in some embodiments, an initialization vector may be stored in the high order bits of register 1410A (as opposed to the low order bits as shown).

In some embodiments, CRC unit 336 is configured to execute a CRC instruction for sets of data having predetermined sizes due to the configuration of processor 10. For example, in one embodiment, CRC unit 336 is configured to execute a CRC instruction on a set of data that is four to eight bytes in length. Additionally, in some embodiments, processor 10 is configured to perform a CRC operation on a set of data that is significantly larger than registers of processor 10 (e.g., 256 bytes). Such a CRC operation may be performed, in one embodiment, by executing multiple CRC instructions supported by unit 336, where the checksum value 337 of the last CRC instruction is the checksum value 337 for the entire set of data. This process of executing multiple CRC instructions for a large set of data is described in below in conjunction with FIGS. 16A-C.

In various embodiments, CRC unit 336 includes multiple pipeline stages for concurrently executing portions of multiple CRC instructions. For example, in some embodiments, XOR units 1420 correspond to different pipeline stages such that a first instance of the CRC instruction may be executing in XOR unit 1420A while a second instance of the CRC instruction is executing in XOR unit 1420B. In some embodiments, CRC unit 336 may also be configured to support pipelined execution of multiple threads, which may increase the overall utilization of CRC unit 336. For example, several different threads may concurrently share CRC unit 336, where a new CRC instruction from a different thread may be issued as often as every execution cycle. In some embodiments, CRC engine 335 includes a plurality of CRC units 336 to execute multiple instances of CRC instructions in parallel.

Execution of a CRC instruction supported by CRC unit 336 is described further in conjunction with FIG. 15.

FIG. 15 is one embodiment of a method of operation of a processor configured to provide instruction-level support for performing a CRC operation. Operation begins in block 1500 where a CRC instruction, defined within the processor's ISA, is issued, causing the instruction to be sent to a cryptographic unit (e.g., FGU 255 having CRC unit 336) for execution. For example, a programmer may specify the CRC instruction within an executable thread of code such that the instruction is fetched (e.g., by instruction fetch unit 200), and subsequently issued by a control unit (e.g., issue unit 230) for execution.

In response to receiving the issued CRC instruction, the cryptographic unit (using CRC unit 336) computes a result of the CRC instruction to perform a CRC operation on a set of data to produce a checksum value (block 1502). As noted above, in some embodiments, CRC unit 336 may be configured to compute a result of the CRC instruction to generate a checksum value using the generator polynomial 0x11EDC6F41. In various embodiments, computing the result of the CRC instruction may include reading instruction operands from a register file, an operand bypass unit, or another operand source, as well as writing a result to working storage or some other suitable destination.

As noted above, CRC unit 336 may execute multiple CRC instructions on portions of a set of data in order to generate a checksum value for a lengthy set of data. In various embodiments, processor 10 may perform different methods (described in FIGS. 16A-16C) depending on the length of the set of data. In one embodiment, processor 10 may perform a method described in FIG. 16A if the length of the set data is evenly divisible by (i.e., a multiple of) the maximum length of data on which the CRC instruction supported by CRC unit 336 can operate. Stated another way, if CRC unit 336 of processor 10 can perform a CRC instruction on a maximum length of 8 bytes (such an 8-byte value may be stored in register 1410B discussed above, in one embodiment) and a set of data has a length m bytes, processor 10 may perform the method similar to that described in FIG. 16A when (m mod 8) is 0. Processor 10 may execute different methods (examples of which are described in FIGS. 16B and 16C) if the length of a set of data is not evenly divisible by the maximum byte length supported by CRC unit 336.

Turning now to FIG. 16A, one embodiment of a method 1600 for generating a checksum value from a set of data is shown. In one embodiment, processor 10 may compute the results of instructions to perform method 1600 if the length of a set data being operated upon is evenly divisible by the maximum length on which the CRC instruction supported by CRC unit 336 can operate. In some embodiments of method 1600, blocks 1610 and 1614 may not be performed.

In block 1610, processor 10, in one embodiment, computes the result of an instruction that causes the storing of an initialization vector in a register of the processor for use by an initial CRC instruction of a set of CRC instructions—i.e., a CRC instruction that is first within the set in program order. In one embodiment, the executed instruction specifies an initialization vector (IV) of all ones—e.g., initial IV=32'hffffffff. Different initialization vectors may be used in other embodiments.

In block 1612, processor 10, in one embodiment, performs one or more CRC instructions to perform one or more CRC operations on one or more portions of a set of data. In some embodiments, processor 10 may perform an initial CRC instruction to generate a first checksum value from a first portion of the set of data using the initialization vector specified in block 1610. Processor 10 may then perform a second CRC instruction to generate a second checksum value by using as inputs a second portion of the set of data and the checksum value generated by the first CRC instruction (which becomes, in effect, the initialization vector for the second CRC operation). The second checksum value may be considered to be a checksum for both of the first and second portions of the set of data, since the second checksum value is generated from the second portion and the checksum value generated from the first portion of the set of data. Processor 10 may continue performing CRC instructions for the remaining portions of the set of data, where performing a last one of the dependent CRC instructions produces a final checksum value representative of the entire set of data. In various embodiments, processor 10 may perform the one or more CRC operations using the generator polynomial 0x11EDC6F41.

In block 1614, processor 10, in one embodiment, performs an instruction that includes an XOR of some value (an initialization vector of all 1's) and the final generated checksum value that was computed in block 1612, where the result of the XOR is used as the generated checksum value for the entire set of data. In some embodiments, processor 10 may perform an XOR operation between a vector consisting of ones (e.g., initial IV=32'hffffffff) by performing an instruction that causes an inversion of the contents of the register that stores the final checksum value generated in block 1612.

One example of SPARC assembly language code that implements one embodiment of the method of FIG. 16A is as follows:

```
Let data = {B31,B30,B29...B1,B0} where B# is one byte and B31 is the
most significant byte
Let f2 = {B31,B30,B29,B28,B27,B26,B25,B24}
Let f4 = {B23,B22,B21,B20,B19,B18,B17,B16}
Let f6 = {B15,B14,B13,B12,B11,B10,B9, B8}
Let f8 = {B7, B6, B5, B4, B3, B2, B1, B0}
fone    %f0   !# set initial IV = 32'hffffffff
crc32c  %f0, %f2, %f0
crc32c  %f0, %f4, %f0
crc32c  %f0, %f6, %f0
crc32c  %f0, %f8, %f0
fnot1   %f0, %f0  !# final inversion
```

In this exemplary code, a set of data consisting of the bytes B31-B0 is divided into four portions that are stored in the floating point registers f2, f4, f6, and f8. The exemplary code begins with the instruction fone % f0, which loads an initialization vector of 32'hffffffff into the floating point register f0.

The code proceeds with four instances of the CRC instruction crc32c. The first CRC instruction (crc32c % f0, % f2, % f0) is performed by CRC unit 336 to effectuate a first CRC operation on the bytes B31-B24 stored in f2, where the first CRC operation uses the initialization vector stored in f0 and stores the generated checksum value in f0. The second CRC instruction (crc32c % f0, % f4, % f0) is performed to effectuate a second CRC operation on the bytes B23-B16 stored in f4 using the initialization vector in f0 (which is the first generated checksum), where the second generated checksum value is stored back into f0. The third CRC instruction (crc32c % f0, % f6, % f0) is performed to effectuate a third CRC operation on the bytes B15-B8 stored in f6 using the initialization vector in f0 (which is the second generated checksum), where the third generated checksum value is stored back into f0. The fourth CRC instruction (crc32c % f0, % f8, % f0) is performed to effectuate a fourth CRC operation on the bytes B7-B0 stored in f8 using the initialization vector in f0 (which is the third generated checksum). The final generate checksum value is stored in f0.

The exemplary code concludes with the instruction fnot1 % f0, % f0, which is performed to invert the final generated checksum value. In some embodiments, this inverted checksum value is the generated checksum value for the entire set of data.

It is noted that this code represents merely one example of how a CRC instruction may be employed, and that numerous other applications using other variants of the CRC instruction are possible and are contemplated. For example, in other embodiments, the CRC instruction supported by CRC unit 336 may be implemented to use the integer register file instead of the floating-point register file. Further, the CRC instruction may be implemented in any suitable ISA.

As noted above, the method of FIG. 16A may be performed when the length of the set of data being operated upon is evenly divisible by the maximum supported length for a set of data on which the CRC instruction supported by CRC unit 336 can operate. In one embodiment, this, "max_length" is 8 bytes. If, however, the length of the set of data is not evenly divisible by max_length, the method of FIG. 16B may be performed if m bits may be appended to the set of data to make the set of data evenly divisible by max_length, without m exceeding a specified value (in one embodiment, without m exceeding 32 bits).

Turning now to FIG. 16B, one embodiment of a method 1618 for generating a checksum value from a set of data is shown. As described above, in one embodiment, processor 10 performs instructions to effectuate method 1618 if bits can be appended to the set of data such that length of the set of data becomes a multiple of the maximum length supported by a CRC instruction (max_length) without the length of appended bits exceeding the maximum number of bytes on which XOR unit 1420 can operate (max_bytes). For example, if the length of the set of data is m bytes, max_length for a CRC operation is 8 bytes, and XOR units 1420 support a maximum of a 4-byte data operand (i.e., max_bytes=4), method 1618 is performed when n bytes can be appended to the message, such that n<4 and (m+n mod 8)=0. In other words, in this instance, up to 3 bytes (or, in some embodiments, up to 31 bits) can be appended to a message to make the message a multiple of the maximum supported length of 8 bytes. In some embodiments of method 1618, blocks 1620 and 1626 are not performed. Blocks may also be performed in a different order than shown—e.g., block 1622 may be performed earlier (or concurrently with) block 1620.

In block 1620, processor 10, in one embodiment, performs an instruction that causes the storing of an initialization vector in a register of the processor for use by an initial CRC instruction. For example, in one embodiment, processor 10 may perform the instruction fone % f0 to place the initialization vector 32'hffffffff into the floating-point register % f0. In various embodiments, block 1620 may be performed in a similar manner as block 1610.

In block 1622, processor 10, in one embodiment, performs one or more instructions to pad a portion of the set of data. In some embodiments in which the maximum supported byte length for a CRC instruction is max_length and the maximum supported operand size of an XOR unit 1420 is max_bytes, the one or more instructions may be executable to append up to, but not including, max_bytes to a portion of the set of data until the number of bytes in the padded set of data is n, where (n mod max_length) equals 0. In other words, the one or more instructions may be executable to append up to max_bytes-1 bytes to a message.

In block 1624, processor 10, in one embodiment, performs one or more CRC instructions to effectuate one or more CRC operations on one or more portions of a set of data, where the last CRC instruction produces a final checksum value. In some embodiments, processor 10 may perform the one or more CRC operations using the generator polynomial 0x11EDC6F41. In various embodiments, block 1624 may be performed in a similar manner as block 1612.

In block 1626, processor 10, in one embodiment, performs an instruction that effectuates an XOR operation of an initialization vector and the final checksum value computed in block 1624. For example, in one embodiment, processor 10 performs the instruction fnot1 % f0, % f0 to invert the contents of the register storing the final checksum value. In various embodiments, block 1624 may be performed in a similar manner as block 1612.

As noted above, the method of FIG. 16A may be performed when the length of the set of data being operated upon is evenly divisible by the maximum supported length for a set of data. The method of FIG. 16B may be performed when bytes can be appended to a set of data to make it a multiple of the maximum supported length for a CRC instruction (max_length) such that the number of appended bytes is less than the maximum supported operand size for an XOR unit 1420 (max_bytes). If, however, the number of appended bytes necessary to make (n mod max_length)=0 is greater than or equal to max_bytes, the method of FIG. 16C, in one embodiment, may be performed. For example, if the length of the set of data is m bytes, max_length is 8 bytes, and max_bytes is 4 bytes, the method of FIG. 16C may be performed when (m mod 8)<=4, because 4 or more bytes would have to be appended to the set of data to make m a multiple of 8.

Turning now to FIG. 16C, one embodiment of a method 1628 for generating a checksum value for a set of data is shown. In some embodiments of method 1628, blocks 1630 and 1636 may not be performed.

In block 1630, processor 10, in one embodiment, performs an instruction that causes the storing of an initialization vector in a register of the processor for use by an initially-performed CRC instruction. For example, in one embodiment, processor 10 may perform the instruction fone % f0 to place the initialization vector 32'hffffffff into the register % f0. In various embodiments, block 1630 may be performed in a similar manner as blocks 1610 and 1620.

In block 1632, processor 10, in one embodiment, performs one or more CRC instructions to generate an intermediate checksum value from an initial portion of the set of data, where the intermediate checksum value is generated by performing one or more CRC operations on subportions of the initial portion of the set of data. For example, in one embodiment, if a set of data has a length of 34 bytes, which consists of four 8-byte subportions and a 2-byte subportion, processor 10 may execute four CRC instructions for each of the 8-byte subportions, where the intermediate checksum value is the result of the fourth CRC instruction.

In block 1634, processor 10, in one embodiment, performs one or more non-CRC instructions (i.e., instructions that do not employ functionality of CRC unit 336) to generate a final checksum value for the remaining portion of the set of data using the intermediate checksum value generated in block

1632. Continuing with the example in the preceding paragraph, processor 10 may perform one or more non-CRC instructions to complete the computation of the final checksum value, including by accounting for the remaining 2-byte portion of the 34-byte set of data.

In block 1636, processor 10, in one embodiment, performs an instruction that effectuates an XOR operation of the initialization vector and the final checksum value generated in block 1634. For example, in one embodiment, processor 10 may perform the instruction fnot1 % f0, % f0 to invert the contents of the register storing the final checksum value. In various embodiments, block 1636 may be performed in a similar manner as blocks 1614 or 1626.

Exemplary System Embodiment

Figure 17:
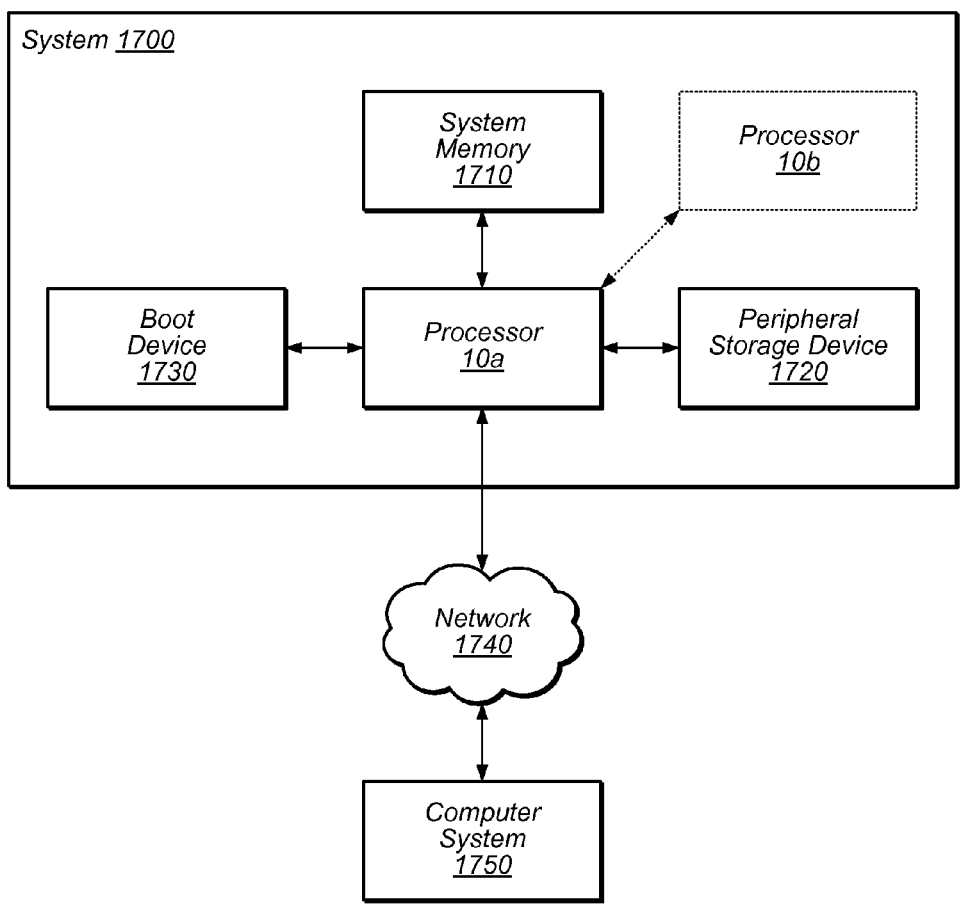
FIG. 17 is a block diagram illustrating one embodiment of a system including a multithreaded processor.

As described above, in some embodiments, processor 10 of FIG. 1 may be configured to interface with a number of external devices. One embodiment of a system including processor 10 is illustrated in FIG. 17. In the illustrated embodiment, system 1700 includes an instance of processor 10, shown as processor 10a, that is coupled to a system memory 1710, a peripheral storage device 1720 and a boot device 1730. System 1700 is coupled to a network 1740, which is in turn coupled to another computer system 1750. In some embodiments, system 1700 may include more than one instance of the devices shown. In various embodiments, system 1700 may be configured as a rack-mountable server system, a standalone system, or in any other suitable form factor. In some embodiments, system 1700 may be configured as a client system rather than a server system.

In some embodiments, system 1700 may be configured as a multiprocessor system, in which processor 10a may optionally be coupled to one or more other instances of processor 10, shown in FIG. 17 as processor 10b. For example, processors 10a-b may be coupled to communicate via their respective coherent processor interfaces 160.

In various embodiments, system memory 1710 may comprise any suitable type of system memory as described above, such as FB-DIMM, DDR/DDR2/DDR3/DDR4 SDRAM, or RDRAM®, for example. System memory 1710 may include multiple discrete banks of memory controlled by discrete memory interfaces in embodiments of processor 10 that provide multiple memory interfaces 130. Also, in some embodiments, system memory 1710 may include multiple different types of memory.

Peripheral storage device 1720, in various embodiments, may include support for magnetic, optical, or solid-state storage media such as hard drives, optical disks, nonvolatile RAM devices, etc. In some embodiments, peripheral storage device 1720 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 1720 may be coupled to processor 10 via peripheral interface(s) 150 of FIG. 1.

As described previously, in one embodiment boot device 1730 may include a device such as an FPGA or ASIC configured to coordinate initialization and boot of processor 10, such as from a power-on reset state. Additionally, in some embodiments boot device 1730 may include a secondary computer system configured to allow access to administrative functions such as debug or test modes of processor 10.

Network 1740 may include any suitable devices, media and/or protocol for interconnecting computer systems, such as wired or wireless Ethernet, for example. In various embodiments, network 1740 may include local area networks (LANs), wide area networks (WANs), telecommunication networks, or other suitable types of networks. In some embodiments, computer system 1750 may be similar to or identical in configuration to illustrated system 1700, whereas in other embodiments, computer system 1750 may be substantially differently configured. For example, computer system 1750 may be a server system, a processor-based client system, a stateless "thin" client system, a mobile device, etc. In some embodiments, processor 10 may be configured to communicate with network 1740 via network interface(s) 160 of FIG. 1.

It is noted that the above exemplary assembly language code sequences use the setx instruction. However, the setx instruction is defined within the SPARC ISA as a synthetic instruction. As described in section G.3 of the SPARC Architecture Manual Version 9, synthetic instructions may be provided in a SPARC assembler for the convenience of assembly language programmers, and they do generate instructions. The synthetic instructions map to actual instructions.

Various embodiments of algorithms (described above) may include storing instructions and/or data implemented in accordance with the foregoing description in an article of manufacture such as a computer-readable storage medium, including various portions of system memory 1710 and/or peripheral storage device 1720. Certain embodiments of these computer-readable storage media (which are tangible and non-transitory) may store instructions and/or data that are computer executable to perform actions in accordance with the present disclosure. Generally speaking, such an article of manufacture may include storage media or memory media such as magnetic (e.g., disk) or optical media (e.g., CD, DVD, and related technologies, etc.). The article of manufacture may be either volatile or nonvolatile memory. For example, the article of manufacture may be (without limitation) SDRAM, DDR SDRAM, RDRAM, SRAM, flash memory, and of various types of ROM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
   a control unit configured to issue instructions for execution, wherein the instructions are programmer-selectable from a defined instruction set architecture (ISA); and
   a cryptographic unit configured to receive instructions issued by the control unit, wherein the received instructions include a first instance of a cyclic redundancy check (CRC) instruction defined within the ISA, wherein the cryptographic unit is configured to perform a first CRC operation on a set of data in response to receiving the first instance of the CRC instruction, wherein the first CRC operation uses a generator polynomial to produce a checksum value from the set of data;
   wherein the cryptographic unit includes a first exclusive-or (XOR) unit and a second XOR unit, wherein the first XOR unit is configured to perform a first set of XOR operations between an initialization vector and a first portion of the set of data, and wherein the second XOR unit is configured to perform a second set of XOR operations between an output of the first XOR unit and a second portion of the set of data.

2. The processor of claim 1, wherein the cryptographic unit is configured to generate the checksum value using the generator polynomial 0x11EDC6F41.

3. The processor of claim 1, wherein the first instance of the CRC instruction specifies: the initialization vector to be used in performing the first CRC operation; the set of data; and a storage location in which to store the checksum value produced by the first CRC operation.

4. The processor of claim 3, further comprising:
a first floating-point register configured to store the initialization vector; and
a second floating-point register configured to store the first and second portions of the set of data such that the first portion corresponds to a higher-order set of bits and the second portion corresponds to a lower-order set of bits; and
wherein the storage location is the first floating-point register.

5. The processor of claim 3, wherein the cryptographic unit is configured to receive a second instance of the CRC instruction that is subsequent to the first instance of the CRC instruction in program order, wherein the cryptographic unit is configured to perform a second CRC operation using an initialization vector specified by the second instance of the CRC instruction in response to receiving the second instance of the CRC instruction.

6. The processor of claim 5, wherein the initialization vector specified by the second instance of the CRC instruction is the checksum value produced by the first CRC operation and stored in the first floating-point register.

7. The processor of claim 1, wherein during each one of a plurality of consecutive execution cycles, the cryptographic unit is configured to receive a newly-issued instance of the CRC instruction, wherein each of the newly-issued instances of the CRC instruction is assigned to a different thread than the thread to which the first instance of the CRC instruction is assigned.

8. A method, comprising:
a control unit of a processor issuing instructions for execution, wherein the instructions are within an instruction set architecture (ISA) for the processor, wherein the ISA includes a cyclic redundancy check (CRC) instruction that is executable to perform a CRC operation on at least a portion of a message using a generator polynomial;
a cryptographic unit of the processor receiving one or more instructions for execution, including a first instance of the cyclic redundancy check (CRC) instruction defined within the ISA; and
the cryptographic unit executing the first instance of the CRC instruction, wherein said executing includes:
performing a first set of exclusive-or (XOR) operations at a first XOR unit within the cryptographic unit, wherein the first set of XOR operations are performed between an initialization vector and a first portion of the message; and
performing a second set of XOR operations at a second XOR unit within the cryptographic unit, wherein the second set of XOR are performed between a result of the first set of XOR operations and a second portion of the message to generate a corresponding checksum value of a CRC operation.

9. The method of claim 8, wherein the generator polynomial is 0x11EDC6F41.

10. The method of claim 8, further comprising:
the processor executing one or more instructions to append one or more bits to at least a portion of the message.

11. The method of claim 10, further comprising:
prior to appending the one or more bits, the processor executing one or more instructions to determine a length m of the message;
wherein the processor executing one or more instructions to append one or more bits to the at least a portion of the message is performed in response to determining that (m mod n) is within a predetermined range, wherein n is a maximum number of bits on which the CRC instruction can operate.

12. The method of claim 8, wherein the message is of length m, and wherein the method further comprises:
in response to the length m being within a predetermined range:
the cryptographic unit executing one or more CRC instructions to generate an intermediate checksum value, wherein the one or more CRC instructions include the first instance of the CRC instruction; and
the processor executing one or more additional instructions to generate a final checksum value using the intermediate checksum value, wherein the one or more additional instructions do not include an instance of the CRC instruction.

13. The method of claim 8, wherein the one or more instructions for execution include at least two instances of the CRC instruction, wherein each of the at least two instances of the CRC instruction specifies an initialization vector to be used during execution of that instance of the CRC instruction;
wherein each of the at least two instances of the CRC instruction further specifies at least a portion of the message and a location in which a checksum value produced by execution of that instance of the CRC instruction is to be stored.

14. The method of claim 13, further comprising the processor executing a first instruction that causes an initialization vector to be stored in a floating-point register of the processor, and wherein an initial one of the at least two instances of the CRC instruction includes an identifier that specifies the floating-point register.

15. The method of claim 14, further comprising the processor executing a second instructions that inverts a resultant checksum produced by a final one of the at least two instances of the CRC instruction.

* * * * *

UNITED STATES PATENT AND TRADEMARK OFFICE
CERTIFICATE OF CORRECTION

PATENT NO. : 8,417,961 B2  
APPLICATION NO. : 12/725243  
DATED : April 9, 2013  
INVENTOR(S) : Olson et al.

It is certified that error appears in the above-identified patent and that said Letters Patent is hereby corrected as shown below:

In the Specification

In column 6, line 63, delete "(PC1" and insert -- (PCI --, therefor.

In column 7, line 4, delete "PC1" and insert -- PCI --, therefor.

In column 12, line 37, after "checking" insert -- . --.

In column 12, line 42, after "checking" insert -- . --.

In column 25, line 45, delete "expand key:" and insert -- expand_key: --, therefor.

In column 31, line 39, delete "$f_j(\ )$" and insert -- $f_i(\ )$ --, therefor.

In column 32, line 40, delete "KIi,j," and insert -- KIi,j, --, therefor.

In column 32, line 42, delete "KIi,j,2." and insert -- KIi,j,2. --, therefor.

In column 33, line 34, delete "KIi}" and insert -- KIi} --, therefor.

In column 34, line 55, delete "KASUMIL_FL_XOR" and insert -- KASUMI_FL_XOR --, therefor.

In column 34, line 56, delete "KASUMIL_FL_XOR" and insert -- KASUMI_FL_XOR --, therefor.

In column 34, line 66, delete "KASUMIL_FL_XOR" and insert -- KASUMI_FL_XOR --, therefor.

In column 35, line 7, delete "KASUMIL_FL_XOR" and insert -- KASUMI_FL_XOR --, therefor.

In column 35, line 12, delete "KASUMIL_FL_XOR" and insert -- KASUMI_FL_XOR --, therefor.

In column 35, line 16, delete "KASUMIL_FL_XOR" and insert -- KASUMI_FL_XOR --, therefor.

In column 35, line 30, delete "KASUMIL_FI_FI" and insert -- KASUMI_FL_FI --, therefor.

In column 35, line 36, delete "KIi,2." and insert -- KIi,2. --, therefor.

In column 35, line 46, delete "KASUMIL_FL_XOR" and insert -- KASUMI_FL_XOR --, therefor.

In column 36, line 5, delete "KASUMIL_FI_XOR" and insert -- KASUMI_FI_XOR --, therefor.

In column 36, line 11, delete "KASUMIL_FI_XOR" and insert -- KASUMI_FI_XOR --, therefor.

In column 36, line 17, delete "KASUMIL_FI_XOR" and insert -- KASUMI_FI_XOR --, therefor.

In column 36, line 19, delete "KASUMIL_FL_XOR" and insert -- KASUM_FL_XOR --, therefor.

Signed and Sealed this  
Sixth Day of August, 2013

Teresa Stanek Rea  
*Acting Director of the United States Patent and Trademark Office*

In column 36, line 20, delete "KASUMIL_FI_XOR" and insert -- KASUMI_FI_XOR --, therefor.
In column 36, line 27, delete "KASUMIL_FL_XOR" and insert -- KASUMI_FL_XOR --, therefor.
In column 36, line 28, delete "KASUMIL_FI_XOR" and insert -- KASUMI_FI_XOR --, therefor.
In column 36, line 47, delete "KASUMIL_FI" and insert -- KASUMI_FI --, therefor.
In column 36, line 55, delete "KASUMIL_FI" and insert -- KASUMI_FI --, therefor.
In column 36, line 58, delete "KASUMIL_FL_XOR," and insert -- KASUMI_FL_XOR, --, therefor.
In column 36, line 58-59, delete "KASUMIL_FL_FI," and insert -- KASUMI_FI_FI, --, therefor.
In column 36, line 59, delete "KASUMIL_FI_XOR" and insert -- KASUMI_FI_XOR --, therefor.
In column 37, line 39, delete "KASUMIL_FL_XOR" and insert -- KASUMI_FL_XOR --, therefor.
In column 37, line 43, delete "KASUMIL_FL_XOR" and insert -- KASUMI_FL_XOR --, therefor.
In column 37, line 46, delete "KASUMIL_FL_XOR" and insert -- KASUMI_FL_XOR --, therefor.
In column 37, line 48, delete "KASUMIL_FI_FI" and insert -- KASUMI_FI_FI --, therefor.
In column 37, line 53, delete "KASUMIL_FI_XOR" and insert -- KASUMI_FI_XOR --, therefor.
In column 37, line 54, delete "KASUMIL_FI_FI" and insert -- KASUMI_FI_FI --, therefor.
In column 37, line 64, delete "KASUMIL_FI_XOR" and insert -- KASUMI_FI_XOR --, therefor.
In column 38, line 37, delete "KASUMIL_FL_XOR," and insert -- KASUMI_FL_XOR, --, therefor.
In column 38, line 37, delete "KASUMIL_FI_FI," and insert -- KASUMI_FI_FI, --, therefor.
In column 38, line 57, delete "KASUMIL_FL_XOR," and insert -- KASUMI_FL_XOR, --, therefor.
In column 38, line 57, delete "KASUMIL_FI_FI," and insert -- KASUMI_FI_FI, --, therefor.
In column 38, line 63, delete "KASUMIL_FL_XOR" and insert -- KASUMI_FL_XOR --, therefor.
In column 38, line 66, delete "KASUMIL_FL_XOR" and insert -- KASUMI_FL_XOR --, therefor.
In column 39, line 3, delete "KASUMIL_FL_XOR" and insert -- KASUMI_FL_XOR --, therefor.
In column 39, line 4-5, delete "KASUMIL_FL_XOR" and insert -- KASUMI_FL_XOR --, therefor.
In column 39, line 8, delete "KASUMIL_FL_XOR" and insert -- KASUMI_FL_XOR --, therefor.
In column 39, line 12, delete "KASUMIL_FL_XOR" and insert -- KASUMI_FL_XOR --, therefor.
In column 39, line 19, delete "KASUMIL_FI_FI" and insert -- KASUMI_FI_FI --, therefor.
In column 39, line 22, delete "KASUMIL_FI_FI" and insert -- KASUMI_FI_FI --, therefor.
In column 39, line 26, delete "KASUMIL_FI_FI" and insert -- KASUMI_FI_FI --, therefor.
In column 39, line 27-28, delete "KASUMIL_FI_FI" and insert -- KASUMI_FI_FI --, therefor.
In column 39, line 31, delete "KASUMIL_FI_FI" and insert -- KASUMI_FI_FI --, therefor.
In column 39, line 34, delete "KASUMIL_FI_FI" and insert -- KASUMI_FI_FI --, therefor.
In column 39, line 41, delete "KASUMIL_FI_XOR" and insert -- KASUMI_FI_XOR --, therefor.
In column 39, line 44, delete "KASUMIL_FI_XOR" and insert -- KASUMI_FI_XOR --, therefor.
In column 39, line 48, delete "KASUMIL_FI_XOR" and insert -- KASUMI_FI_XOR --, therefor.
In column 39, line 49-50, delete "KASUMIL_FI_XOR" and insert -- KASUMI_FI_XOR --, therefor.

CERTIFICATE OF CORRECTION (continued)
U.S. Pat. No. 8,417,961 B2

In column 39, line 53, delete "KASUMIL_FI_XOR" and insert -- KASUMI_FI_XOR --, therefor.

In column 39, line 58, delete "KASUMIL_FI_XOR" and insert -- KASUMI_FI_XOR --, therefor.

In column 44, line 14, delete "FLI( )," and insert -- FLI( ) --, therefor.

In column 46, line 1, delete "FL_instruction" and insert -- FL instruction --, therefor.

In column 46, line 4, delete "FL_instruction." and insert -- FL instruction. --, therefor.

In column 46, line 5, delete "FL_instruction," and insert -- FL instruction, --, therefor.

In column 46, line 16, delete "FLI( )," and insert -- FLI( ) --, therefor.

In column 47, line 28, delete "FLI( )," and insert -- FLI( ) --, therefor.

In column 47, line 32, after "CAMELLIA_F" insert -- , --.

In column 48, line 37, delete "FLI( )," and insert -- FLI( ) --, therefor.

In column 48, line 39, delete "FLI( )," and insert -- FLI( ) --, therefor.

In column 49, line 17, delete "FL_instruction," and insert -- FL instruction, --, therefor.

In column 49, line 20, delete "FL_instruction" and insert -- FL instruction --, therefor.

In column 49, line 25, delete "FL_instruction," and insert -- FL instruction, --, therefor.

In column 49, line 26, delete "FL_instruction" and insert -- FL instruction --, therefor.

In column 49, line 29, delete "FL_instruction" and insert -- FL instruction --, therefor.

In column 49, line 31, delete "FL_instruction" and insert -- FL instruction --, therefor.

In column 49, line 37, delete "FLI( )," and insert -- FLI( ) --, therefor.

In column 49, line 47, delete "FLI( )," and insert -- FLI( ) --, therefor.

In column 55, line 63, delete "key_into" and insert -- key into --, therefor.

In column 68, line 12, delete "0x04C11 DB7" and insert -- 0x04C11DB7 --, therefor.